United States Patent
Sugimoto et al.

(10) Patent No.: US 9,916,248 B2
(45) Date of Patent: Mar. 13, 2018

(54) STORAGE DEVICE AND METHOD FOR CONTROLLING STORAGE DEVICE WITH COMPRESSED AND UNCOMPRESSED VOLUMES AND STORING COMPRESSED DATA IN CACHE

(71) Applicant: Hitachi, Ltd., Tokyo (JP)

(72) Inventors: Sadahiro Sugimoto, Tokyo (JP); Akira Yamamoto, Tokyo (JP); Kazuei Hironaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 233 days.

(21) Appl. No.: 14/770,567

(22) PCT Filed: Dec. 12, 2013

(86) PCT No.: PCT/JP2013/083322
§ 371 (c)(1),
(2) Date: Aug. 26, 2015

(87) PCT Pub. No.: WO2015/087424
PCT Pub. Date: Jun. 18, 2015

(65) Prior Publication Data
US 2016/0004642 A1 Jan. 7, 2016

(51) Int. Cl.
*G06F 12/0864* (2016.01)
*G06F 3/06* (2006.01)
(Continued)

(52) U.S. Cl.
CPC ............ *G06F 12/0864* (2013.01); *G06F 3/06* (2013.01); *G06F 11/1096* (2013.01);
(Continued)

(58) Field of Classification Search
CPC .... G06F 12/0864; G06F 11/1096; G06F 3/06; G06F 12/16; G06F 2212/1044;
(Continued)

(56) References Cited

U.S. PATENT DOCUMENTS 7,162,584 B2 1/2007 Adl-Tabatabai et al.
9,311,002 B1 * 4/2016 Scott ..................... G06F 3/0638
(Continued)

FOREIGN PATENT DOCUMENTS

CN 1902603 A 1/2007
JP 2004-013373 A 1/2004
(Continued)

OTHER PUBLICATIONS

Mayur Shetty, IBM Systems and Technology Group ISV Enablement, "IBM Storwize V7000 Real-time Compression vols. with Oracle 11g R2 databases" Demonstrating IBM Storwize V7000 advanced storage efficiency for Oracle databases , Jul. 2012.*
(Continued)

*Primary Examiner* — Rocio Del Mar Perez-Velez
(74) *Attorney, Agent, or Firm* — Mattingly & Malur, PC

(57) ABSTRACT

The storage device of the present invention provides a decompression VOL having no corresponding relationship (mapping) with a final storage media to a superior device, and receives accesses from the superior device to the decompression VOL. Then, data written into the decompression VOL is compressed on-line in a cache memory, and the compressed data is mapped to a compression VOL which is a volume mapped to a final storage media. At the same time, by maintaining and managing a mapping information between an area in the decompression VOL where data has been written and a location in the compression VOL to which compressed data of the relevant data is mapped, when a read request is received from a superior device regarding the decompression VOL, the storage device converts a location information in the decompression VOL designated by the read request to a location information of the final storage media.

12 Claims, 35 Drawing Sheets

(51) Int. Cl.
*G06F 12/16* (2006.01)
*G06F 11/10* (2006.01)
*G06F 12/0804* (2016.01)
*G06F 12/0868* (2016.01)
*G06F 12/0871* (2016.01)

(52) U.S. Cl.
CPC ...... *G06F 12/0804* (2013.01); *G06F 12/0868* (2013.01); *G06F 12/0871* (2013.01); *G06F 12/16* (2013.01); *G06F 2212/1032* (2013.01); *G06F 2212/1044* (2013.01); *G06F 2212/262* (2013.01); *G06F 2212/283* (2013.01); *G06F 2212/312* (2013.01); *G06F 2212/401* (2013.01)

(58) Field of Classification Search
CPC ......... G06F 2212/283; G06F 2212/401; G06F 2212/1032
See application file for complete search history.

(56) References Cited

U.S. PATENT DOCUMENTS

2003/0217206 A1* 11/2003 Poo ...................... G06F 3/0607
710/68
2007/0174536 A1 7/2007 Nakagawa et al.
2009/0106492 A1 4/2009 Muto et al.
2009/0144496 A1 6/2009 Kawaguchi
2011/0219153 A1* 9/2011 Amit ...................... G06F 13/12
710/68
2015/0058576 A1* 2/2015 Galbraith ............ G06F 12/0886
711/133

FOREIGN PATENT DOCUMENTS

JP 2007-199891 A 8/2007
JP 2009-104236 A 5/2009

OTHER PUBLICATIONS

Thanos Makatos, et al., "ZBD: Using Transparent Compression at the Block Level to Increase Storage Space Efficiency", Foundation for Research and Technology—Hellas (FORTH), 2010.*
International Search Report and Written Opinion of PCT/JP2013/083322.

* cited by examiner

Fig. 13

| Port# 501 | LUN 502 | VVOL# 503 | Size 504 |
|---|---|---|---|
| 0<br>(3e243174 aaaaaaaa) | 0 | 0 | 500GB |
|  | 1 | 1 | 300GB |
|  | 2 | 2 |  |
| 1<br>(3e243174 bbbbbbbb) | 0 | 0x1000 | 300GB |
|  |  | 0x1001 |  |
|  |  |  |  |
|  | ... | ... | ... |

| LDEV# 551 | PDEV# 552 | RAID level 553 | Size 554 |
|---|---|---|---|
| 0 | 0,1,2,3 | 5 | 500GB |
| 1 | 4,5,6,7 | 4 | 1000GB |
| 2 | 0x10,0x11,<br>0x12,0x13,<br>0x14,0x15,<br>0x16,0x17 | 6 | 2000GB |
| ... | ... | ... | ... |
|  |  |  |  |

| VVOL# | LDEV# | Last write location |
|---|---|---|
| 0 | 0x125 | 0x00002000 |
| ... | ... | ... |

| VVOL# | LBA | LDEV# | LBA |
|---|---|---|---|
| 0 | 0 | 0x125 | 0x8512 |
|  |  | 0x125 | 0x8513 |
|  |  | 0x125 | 0x8514 |
| 0 | 0x08 | 0x125 | 0x8530 |
|  |  | 0x125 | 0x8800 |
| 0 | 0x10 | 0x125 | 0x8515 |
|  | ... | ... | ... |
| 1 | 0 | 0x126 | 0 |
|  | ... | ... | ... |

Decompression VOL      Compression VOL

Fig. 30

| HVOL# | Size |
|---|---|
| 0x0 | 1TB |
| 0x1 | 500GB |
| ... | ... |

Fig. 31

| HVOL# | P-ID | LDEV# | Slot # |
|---|---|---|---|
| 0 | Page 0 | 0x125 | 0 |
| 0 | Page 1 | 0x125 | 4 |
| 0 | Page 2 | NULL | NULL |
| ... | ... | ... | ... |

Fig. 35

| VVOL# | P-ID | HVOL# | P-ID | Last write location |
|---|---|---|---|---|
| 0 | Page 0 | 0 | Page 0 | 0x00002000 |
| | Page 1 | 0 | Page 1 | .... |
| | Page 2 | 0 | Page 2 | .... |
| | | ... | ... | ... |

STORAGE DEVICE AND METHOD FOR CONTROLLING STORAGE DEVICE WITH COMPRESSED AND UNCOMPRESSED VOLUMES AND STORING COMPRESSED DATA IN CACHE

TECHNICAL FIELD

The present invention relates to a storage device for compressing and storing data, and a method for controlling the same.

BACKGROUND ART

Along with the advancement of IT and the spreading of the Internet, amount of data handled by computer systems in companies and the like are continuing to increase. On the other hand, there are high needs to cut down costs related to the IT system, and there are demands for a high-performance and inexpensive system.

In a storage device, storage media used in the storage device occupy a large portion of the cost. Therefore, an important problem is to cut down the costs of the storage media. In addition to a method of adopting inexpensive (low bit cost) storage media, a method of compressing stored data to enable a greater amount of data to be stored in a storage media can be adopted to cut down the costs of the storage media. When data is stored in a compressed state to the storage media of the storage device, it is important from the viewpoint of user-friendliness that host computers and applications accessing the storage device are not conscious of the fact that data is stored in a compressed state, that is, data compression is performed transparently. It is also practically important to prevent deterioration of the access performance as much as possible. For example, Patent Literature 1 discloses a system for accessing necessary data, where data (uncompressed data) is divided into a plurality of units and compressed per unit, the respective compressed units are stored in an LU (Logical Unit), and only the necessary unit is read without reading the whole LU when reading data.

CITATION LIST

Patent Literature

[PTL 1] US Patent Application Publication No. 2011/0219153

SUMMARY OF INVENTION

Technical Problem

In a configuration where compressed data is stored in the final storage media, as a result of compressing the update data, the compressed data size of the relevant update data may be greater than or smaller than the size of the compressed data before update. Therefore, the compressed data of the data after update cannot be simply overwritten to the area where compressed data of data before update has been stored. In the art disclosed in Patent Literature 1, during update of data, a process to temporarily read the data before update, decompress the data, and overwrite the update data to the decompressed data is performed. Further, if the size of the compressed data after update becomes greater than the size of the compressed data before update, a process is performed to store a partial data that could not be stored in the area where the compressed data before update had been stored by searching an unused storage area. Therefore, processing overhead during update of data is high.

The object of the present invention is to improve the processing performance of the storage device storing the compressed data.

Solution to Problem

In the storage device according to the preferred embodiment of the present invention, a decompression VOL having no direct corresponding relationship (mapping) with the final storage media is provided to the superior device, and the superior device is made to access the decompression VOL. Then, the data written to the decompression VOL is compressed online in a cache memory, and the compressed data is stored in a volume (compression VOL) directly mapped to the final storage media. Further, by maintaining a mapping information between an area of the decompression VOL (where uncompressed data is stored) and an area of the compression VOL (where compressed data is stored), even when a read request to the decompression VOL arrives from the superior device, the location information in the decompression VOL designated by the read request is converted to location information in the final storage media (storage media mapped to the compression VOL) based on the mapping information, and compressed data is read from the final storage media. Then, the compressed data is decompressed in the cache memory and transferred to the superior device.

Further, the present invention characterizes in compressing data and generating a RAID parity for the compressed data after compression in the cache memory operated as a cache device of the storage device.

Advantageous Effects of Invention

According to the present invention, in the storage device, when compressing the write data received from the server and storing in the HDD, the data written to the decompression VOL is compressed online in a cache memory, and the compressed data is stored in a volume (compression VOL) directly mapped to the final storage media by appending data, so that there is no need to perform a complex process during data update. Further, by maintaining a mapping information between an area of the decompression VOL (where uncompressed data is stored) and an area of the compression VOL (where compressed data is stored), even when a read request to a decompression VOL arrives from the superior device, the location information in the decompression VOL designated by the read request can be converted to a location information of the final storage media (storage media mapped to the compression VOL) based on the mapping information, and compressed data is read from the final storage media, so that an access performance equivalent to accessing a normal volume (that does not compress data during storage) can be achieved.

BRIEF DESCRIPTION OF DRAWINGS

FIG. 13 is a view showing a content of a decompression VOL management table.

FIG. 14 is a view showing a content of a compression VOL management table.

FIG. 17 is a view showing a content of a volume mapping table.

FIG. 18 is a view showing a content of an address mapping table.

FIG. 30 is a view showing a content of an HVOL management information.

FIG. 31 is a view showing a content of a page mapping table.

FIG. 35 is a view showing a content of a volume mapping table according to Modified Example 2 of the present invention.

DESCRIPTION OF EMBODIMENTS

The preferred embodiments of the present invention will be described with reference to the drawings. The present invention is not restricted to the preferred embodiments described below. A NAND-type flash memory (hereinafter referred to as FM) is taken as an example of a semiconductor recording element for description, but the present invention is not restricted to FMs, and targets all nonvolatile memories. In the present embodiment, an example is illustrated where data compression is by a dedicated hardware circuit, but the present invention is not restricted to this embodiment, and data can be compressed via a data compression arithmetic processing via a general purpose processor. Further according to the present embodiment, an embodiment is illustrated where a parity (redundant data) is calculated via a dedicated hardware circuit, but the present invention is not restricted to such embodiment, and a RAID parity can be generated via a parity generation arithmetic processing by a general purpose processor.

Figure 1:
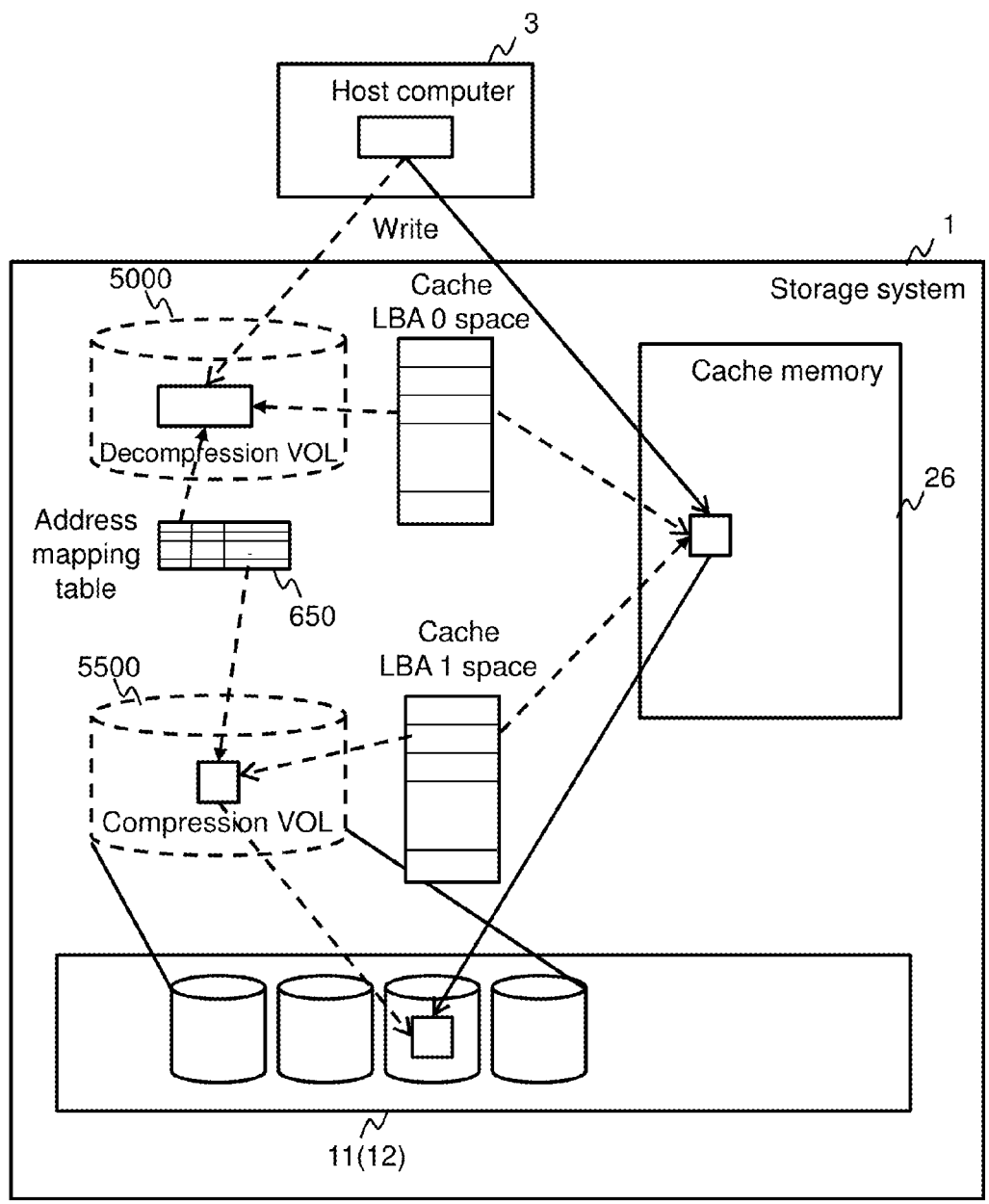
FIG. 1 is a conceptual diagram of an operation of a storage device according to the present invention.

At first, an outline of the present invention will be described with reference to FIG. 1. In a storage device 1 of the present invention, data written from a host computer 3 is compressed and stored in an SSD (Solid State Drive) 11 or an HDD (Hard Disk Drive) 12 which are final storage media, but since the data size after compression differs depending on the contents of data, it is difficult to determine a unique data storage location. Therefore, the storage device 1 creates and manages two types of logical volumes. A first type of logical volume is a logical volume provided to the host computer 3, and recognized from the host computer 3 as if uncompressed data is stored in the relevant logical volume. The second type of logical volume is a logical volume not recognized from the host computer 3, and the relevant logical volume is used when a storage controller 10 stores the compressed data to a final storage media (SSD 11 or HDD 12). Hereafter, the first logical volume is referred to as "decompression VOL", and the second logical volume is referred to as "compression VOL".

The decompression VOL ("decompression VOL 5000" in FIG. 1) is merely for providing a logical (virtual) storage area to the host computer 3, and there is no physical storage area (storage area of SSD 11 or HDD 12 which is the final storage media) corresponding to respective addresses in the decompression VOL. On the other hand, the compression VOL ("compression VOL 5500" in FIG. 1) is a volume whose respective storage areas (in the compression VOL) have a one-to-one correspondence with the storage areas of the SSD 11 or the HDD 12 being the final storage media. The storage device 1 according to the present invention manages a plurality of (such as four) final storage media as one RAID group, and the respective storage areas of said one RAID group is associated with the respective storage areas of the compression VOL.

When a data write request and write data are transmitted from the host computer 3 to the decompression VOL, the write data is stored in a cache memory 26. The cache memory 26 of the present invention has a compression function, wherein when storing the write data into the cache memory 26, it stores the same in a compressed state. When reading (outputting) the compressed data in the cache memory 26, it can read the data in a decompressed state via the compression function, so that the data stored in a compressed state will not be visible to (recognized by) the host computer 3.

Since the object of the present invention is to store the data in a compressed state in the final storage media, the compressed data stored in the cache memory 26 is written in the still-compressed state to the final storage media. According to the storage device 1 of the present invention, a configuration is adopted where update data is not written to the same area as the area in which data before update had been stored, but is appended to a final storage media 11 (12). Further, a volume (compression VOL 5500) that differs from the decompression VOL is prepared for storing and managing the compressed data is prepared, and a process is performed to migrate the data written to the decompression VOL (the actual data is stored only in a cache 26) artificially to the compression VOL 5500.

There is no fixed corresponding relationship between the areas of the decompression VOL and the areas of the compression VOL, so that when data is migrated from the decompression VOL to the compression VOL, the data storage location in the compression VOL is determined dynamically. As one example, when data a, b, c, d and e are written randomly in the decompression VOL, the storage device 1 performs a process to migrate (map) the data written in the decompression VOL to the area in the compression VOL, and at that time, the data a, b, c, d and e are mapped from the head of the compression VOL so that they are appended to the compression VOL, so that there is no need to read the data before update during the RAID parity generation process performed prior to writing data to the final storage media. The storage location of each data written to the decompression VOL in the compression VOL is managed via an inter-volume mapping table 650. After data a, b, c, d and e (the compressed data thereof) has been mapped to the compression VOL, redundant data (parity) is generated by RAID technique based on these data, wherein the data (compressed data) and the parity are written to the final storage media configuring the compression VOL.

In a general storage device that stores data without compressing the same, when a data update request and an update data to a volume is received, the relevant update data is overwritten and stored in an area where the data before update of the relevant update data has been stored. However, in a configuration where the compressed data is stored in the final storage media, as a result of compressing the update data, the compressed data size of the relevant update data may become greater than the size of the compressed data before update. Therefore, the processing when overwriting the final storage media becomes complicated, and the processing performance is deteriorated.

The storage device according to the preferred embodiment of the present invention provides a decompression VOL having no direct corresponding relationship (mapping) with the final storage media to a superior device such as a host computer, and causes the superior device to access the decompression VOL. Processing overhead during data update is prevented from occurring by performing online compression of the data written to the decompression VOL in a cache memory, and storing the compressed data to the compression VOL directly mapped to the final storage media in the form of additional writing. Further, by maintaining a mapping information between the areas of the decompression VOL in which uncompressed data is stored and the areas of the compression VOL in which compress data is stored, even when a read request regarding a decompression VOL is received from the superior device, the location information in the decompression VOL designated by the read request is converted to the location information of the compression VOL based on the mapping information, the compressed data is read from the compression VOL (final storage media), and the compressed data is decompressed in the cache memory before being transferred to the superior device, so as to enable the response time to be shortened.

The details will be described later, but by adopting a thin provisioning technique to the compression VOL, it becomes possible to enhance capacity efficiency and realize an inexpensive system.

The details will be described later, but by considering the data arrangement in the decompression VOL and migrating data to the compression VOL, a sequential access performance can be enhanced.

<Embodiment>

Figure 2:
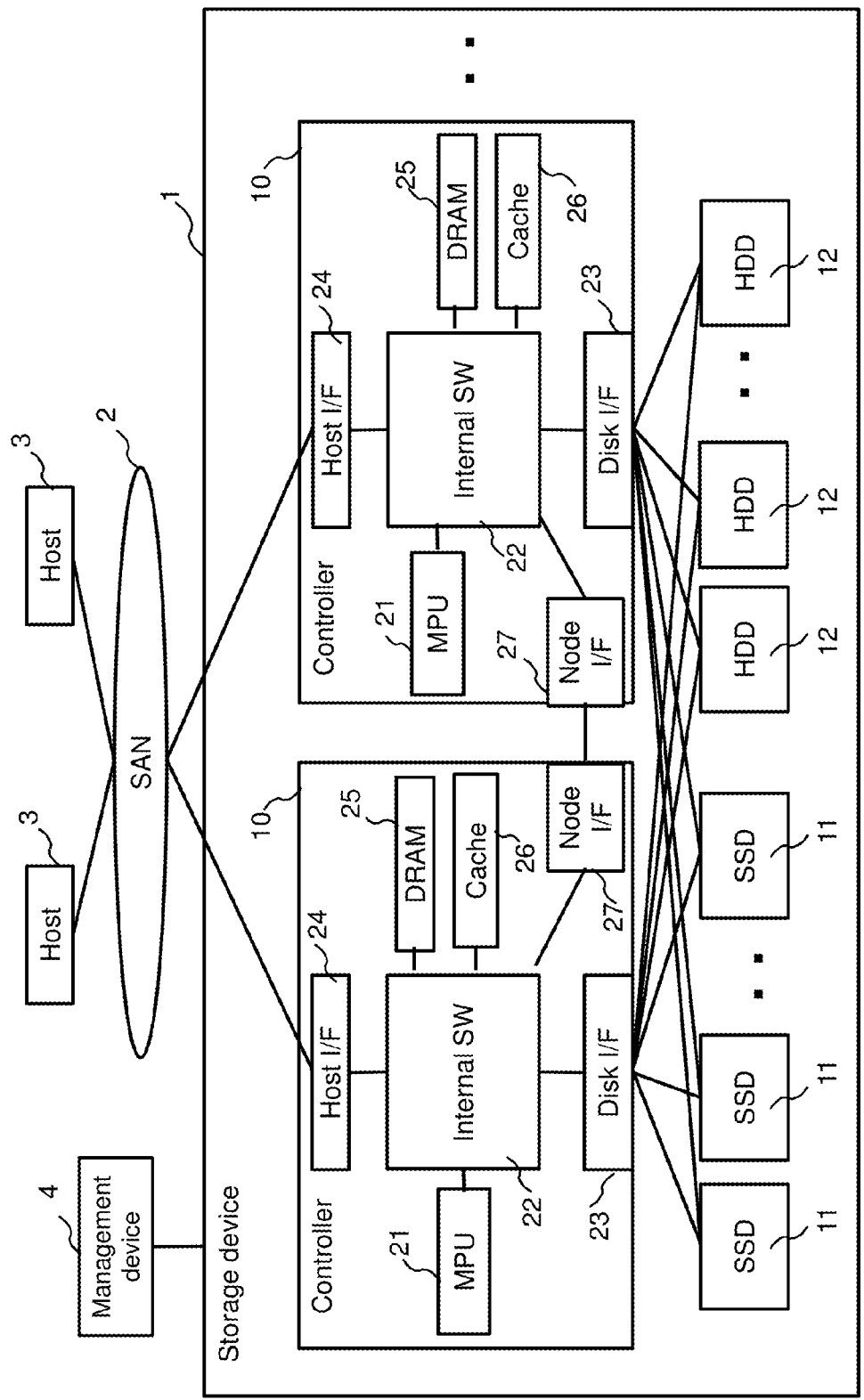
FIG. 2 is a view showing a configuration of a storage device (storage system) according to the present invention.

FIG. 2 is a view showing a configuration of a storage device (storage system) according to a preferred embodiment of the present invention.

The storage device 1 is equipped with one or more storage controllers 10 (hereinafter also abbreviated as "controller 10"). Each controller 10 is equipped with a host interface (referred to as "Host I/F" in the drawing) 24 for connecting to a host computer (superior device) 3 and a disk interface (referred to as "Disk I/F" in the drawing) 23 for connecting a recording media. A device corresponding to protocols such as FC (Fibre Channel), iSCSI (internet Small Computer System Interface), FCoE (Fibre Channel over Ethernet) and the like are used as the host interface 24, and a device corresponding to various protocols such as FC, SAS (Serial Attached SCSI), SATA (Serial Advanced Technology Attachment), PCI (Peripheral Component Interconnect)—Express and the like are used as the disk interface 107. In the following description, the host interface 24 may also be referred to as "port 24". Further, the storage controller 10 is equipped with hardware resources such as a processor (denoted as "MPU" in the drawing) 21 and a DRAM 25, and under the control of the processor 21, outputs a read/write request to a final storage media such as the SSD 11 or the HDD 12 in response to a read/write request from the host computer 3. Moreover, it has a cache memory 26 installed therein, and the cache memory 26 is enabled to be controlled by the processor 21 via an internal switch (denoted as "internal SW" in the drawing) 22. Further, it is equipped with a node I/F 27 for mutually communicating data and control information between the storage controllers 10.

The storage device 1 is connected to a management device 4 via a network. Ethernet (Registered Trademark) and the like is used as a transmission medium of this network. Although not shown in FIG. 2 for the sake of simplification, this network is connected to each storage controller 10 in the storage device 1. This network can also be connected via a same network as the SAN 2.

The management device 4 is a computer equipped with hardware resources such as a processor, a memory, a network interface, a local input/output device and so on, and software resources such as a management program. A management program is operated in the management device 4, and by executing the relevant management program, the management device 4 acquires information from the storage device 1, and provides a GUI for management operation to a system administrator. The system administrator uses this GUI for management operation to perform operations such as creating volumes in the storage device 1 or monitoring the storage device 1.

A plurality of (such as 16) SSDs 11 and HDDs 12 exist in the storage device 1, which are connected via the disk interface 23 to the plurality of storage controllers 10 existing similarly within the storage device. The SSD 11 and the HDD 12 store data transmitted according to a write request from the storage controller 10, take out the stored data and transfer it to the storage controller 10 according to a read request. At this time, the disk interface 107 designates the read/write location of data via a logical block address (Logical Block Address; hereinafter referred to as "LBA"). Further, the storage device 1 manages the plurality of SSDs 11 and HDDs 12 as a RAID group in a unit of a given number of devices (such as 4, 8, 16 and so on), and according to the configuration, recovery of data is enabled even if one (or two) disks in the RAID group fails.

A host computer (superior device) 3 is equipped with hardware resources such as a processor, a memory, a network interface, a local input/output device and the like, and software resources such as a device driver, an operating system (OS), an application program and the like. Thereby, the host computer 3 performs communication with a storage device 1 and read/write requests of data by executing various programs under the control of the processor. Further, it acquires management information such as the status of use or the status of operation of the storage device 1 by executing the various programs under the control of the processor. Further, it is possible to designate or change the management unit of the recording device, the method for controlling the recording device or setting of data compression.

Next, an internal configuration of the cache memory 26 will be described with reference to FIG. 3.

The cache memory 26 according to the preferred embodiment of the present invention uses a flash memory as storage media. The cache memory 26 is equipped with an FM controller (FM CTL) 410 and a plurality of (such as 32) FMs 420.

The FM controller 410 has, in the interior thereof, a processor 415, a RAM 413, a data compression/decompression unit 418, a parity generation unit 419, a data buffer 416, an I/O interface (I/F) 411, an FM interface 417, and a switch 414 for performing mutual data transfer.

The I/O interface 411 connects to the internal switch 22 that the storage controller 10 within the storage device 1 has, and is connected via the switch 414 to various components of the flash controller 410. The I/O interface 411 is for receiving various commands to the cache memory 26 from the processor 21 of the storage controller 10 within the storage device 1, or for performing data transfer.

The processor 415 connects to various components of the FM controller 410 via the switch 414, and controls the whole FM controller 410 based on the programs and management information stored in the RAM 413. The data buffer 416 is used for temporarily storing data in midway of a data transfer process within the flash controller 410.

An FM interface (I/F) 417 connects to the FM 420 via a plurality of (such as 16) buses. A plurality of (such as 2) FMs 420 are connected to each bus.

The data compression/decompression unit 418 has a function to process a lossless compression algorithm. A data compression/decompression unit 418 compresses data arriving from the I/O interface 411 and written to the FM 420, or decompresses the data transmitted from the FM 420 to the I/O interface 411, based on the instruction from the processor 415. The data compression/decompression unit can be implemented as a logical circuit, or a similar function can be realized by having a compression/decompression program processed by a processor.

The parity generation unit 419 has a function to generate parity, which is redundant data required in a RAID technique, and specifically, it has functions to calculate XOR used in RAID 5, RAID 6 etc., to generate Reed-Solomon code used in RAID 6 and to generate diagonal parity used for EVENODD method.

The switch 414, the disk interface 411, the processor 415, the data buffer 416, the FM interface 417, the data compression/decompression unit 418 and the parity generation unit 419 described above can be configured within a single semiconductor element as an ASIC (Application Specific Integrated Circuit) or a FPGA (Field Programmable Gate Array), or can adopt a configuration where a plurality of individual dedicated ICs (Integrated Circuits) are mutually connected.

A volatile memory such as a DRAM can be adopted as the RAM 413. The RAM 413 stores management information of the FM 420 used within the cache memory 26, a transfer list including transfer control information used by each DMA, and so on. Further, a configuration can also be adopted where a portion or all of the roles of the data buffer 416 storing data is included in the RAM 413, and using the RAM 413 for data storage.

Figure 3:
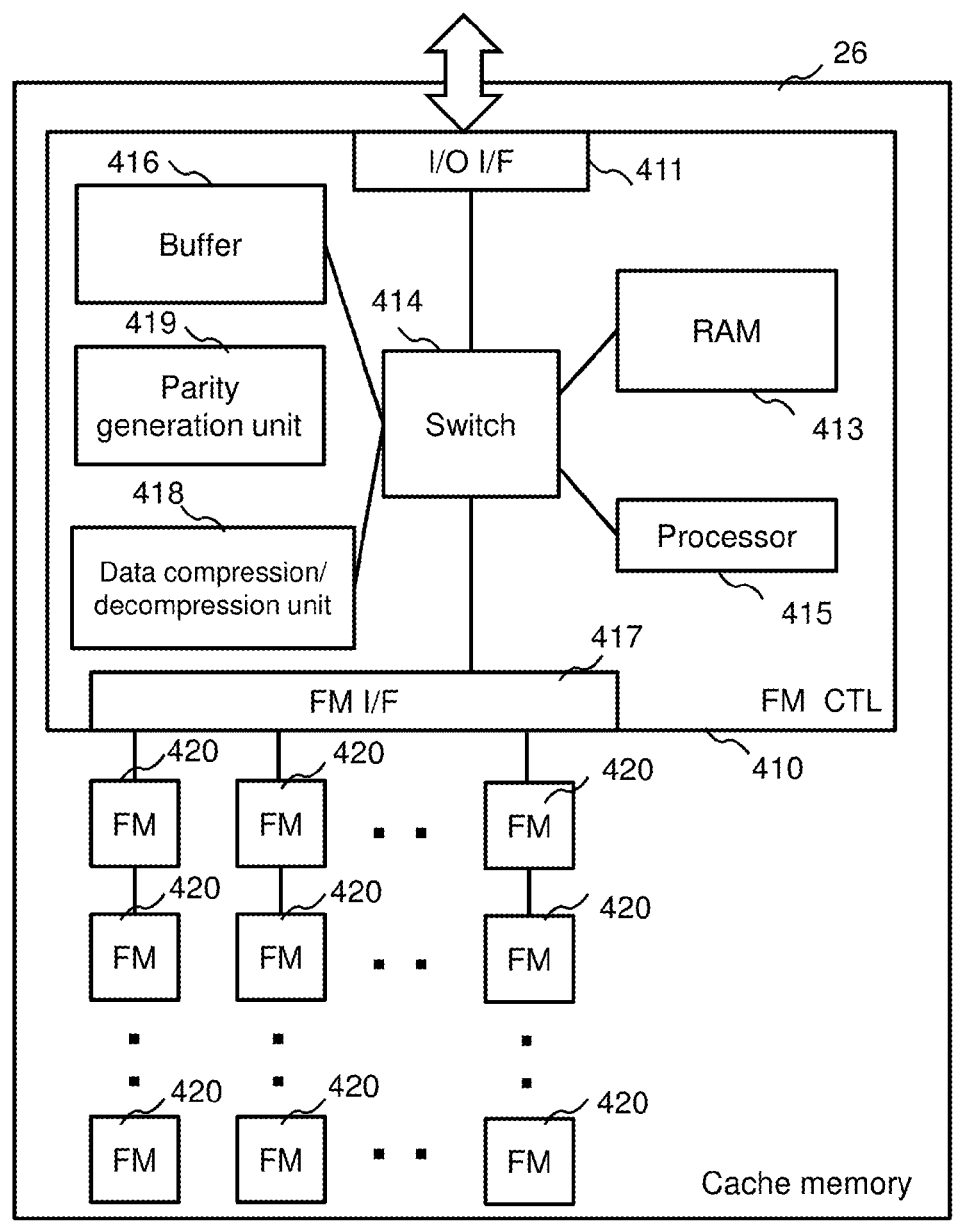
FIG. 3 is a view showing an internal configuration of a cache memory.

In the present embodiment, as shown in FIG. 3, the cache memory 26 including a flash memory is described, but the storage media to be included in the cache memory 26 is not restricted to flash memories. It can be a Phase Change RAM or a Resistance RAM. Further, a portion or all of the FM 420 can be a volatile RAM (DRAM or the like).

Next, we will describe a storage space that the cache memory 26 according to the present embodiment provides to the storage controller 10.

The cache memory 26 according to the present embodiment provides a logical storage space to (the processor 21 of) the storage controller 10 to which it is connected. What is meant by "providing a storage space" is that addresses are assigned to the respective storage areas which are accessed by the storage controller 10, and by having the processor 21 of the storage controller 10 to which the cache memory 26 is connected issue an access request (command) designating the relevant address, the data stored in the area specified by the relevant address is set to a state where reference and update is enabled. The processor 415 of the cache memory 26 manages the physical storage area composed of the FM 420 by mapping the physical storage area uniquely to a one-dimensional address space used only within the cache memory 26. Hereafter, an address space for designating a physical area (physical address space) used only within the cache memory 26 is called PBA (Physical Block Address) space, and a location (address) of each physical storage area (sector; in the present embodiment, one sector corresponds to 512 bytes) within the PBA space is referred to as PBA (Physical Block Address).

The conventional storage device such as the SSD provides one storage space to a superior device (host computer and the like) to which the storage device is connected. On the other hand, the cache memory 26 according to the present embodiment is characterized by providing two logical storage spaces to the storage controller 10 to which the cache memory 26 is connected. This relationship between these two logical storage spaces and the PBA space will be described with reference to FIG. 4.

The cache memory 26 provides two logical storage spaces, an LBA 0 space 701 and an LBA 1 space 702. Hereinafter, the address assigned to the respective storage areas in the LBA 0 space 701 is called "LBA 0" or "LBA 0 address", and the address assigned to the respective storage areas in the LBA 1 space 702 are referred to as "LBA 1" or "LBA 1 address". Moreover, according to the preferred embodiment of the present invention, the size of the LBA 0 space 701 and the size of the LBA 1 space 702 are respectively equal to or smaller than the size of the PBA space, but even when the size of the LBA 0 space 701 is greater than the size of the PBA space, the present invention is effective. The LBA 0 space 701 is a logical area for having the compressed data recorded in the physical storage area accessed as uncompressed data by the processor 21 of the storage controller 10. When the processor 21 issues a write request to the cache memory 26 with designating an address (LBA 0) in the LBA 0 space 701, the cache memory 26 acquires the write data from the storage controller 10, compresses it via the data compression/decompression unit 418, stores it in the physical storage area in the FM 420 designated by the PBA dynamically selected by the cache memory 26, and maps the LBA 0 with the PBA. Further, when the processor 21 issues a read request to the cache memory 26 designating LBA 0, the cache memory 26 acquires data (compressed data) from the physical storage area of the FM 420 specified with the PBA mapped to LBA 0, decompresses it via the data compression/decompression unit 418, and transfers the decompressed data as read data to the storage controller 10. The conversion between LBA 0 and PBA is achieved by maintaining the management information of the mapping between LBA 0 and PBA in the RAM 413, and using the same.

The LBA 1 space 702 is a logical area for having the storage controller 10 access the compressed data stored in the physical storage area composed of the FM 420 as compressed data (without decompression). When the processor 21 issues a write request to the cache memory 26 designating LBA 1, the cache memory 26 acquires data (compressed write data) from the storage controller 10, stores data in the storage area of the FM designated by the PBA dynamically selected by the cache memory 26, and maps the LBA 1 with the PBA. Further, when the processor 21 issues a read request designating LBA 1, the cache memory 26 acquires data (compressed data) from the physical storage area of the FM 420 designated by the PBA mapped to the LBA 1, and transfers the data (compressed data) as read data to the storage controller 10. Incidentally, the conversion between LBA 1 and PBA is also achieved by retaining the management information of the mapping between LBA 1 and PBA in the RAM 413, and using the same.

Figure 4:
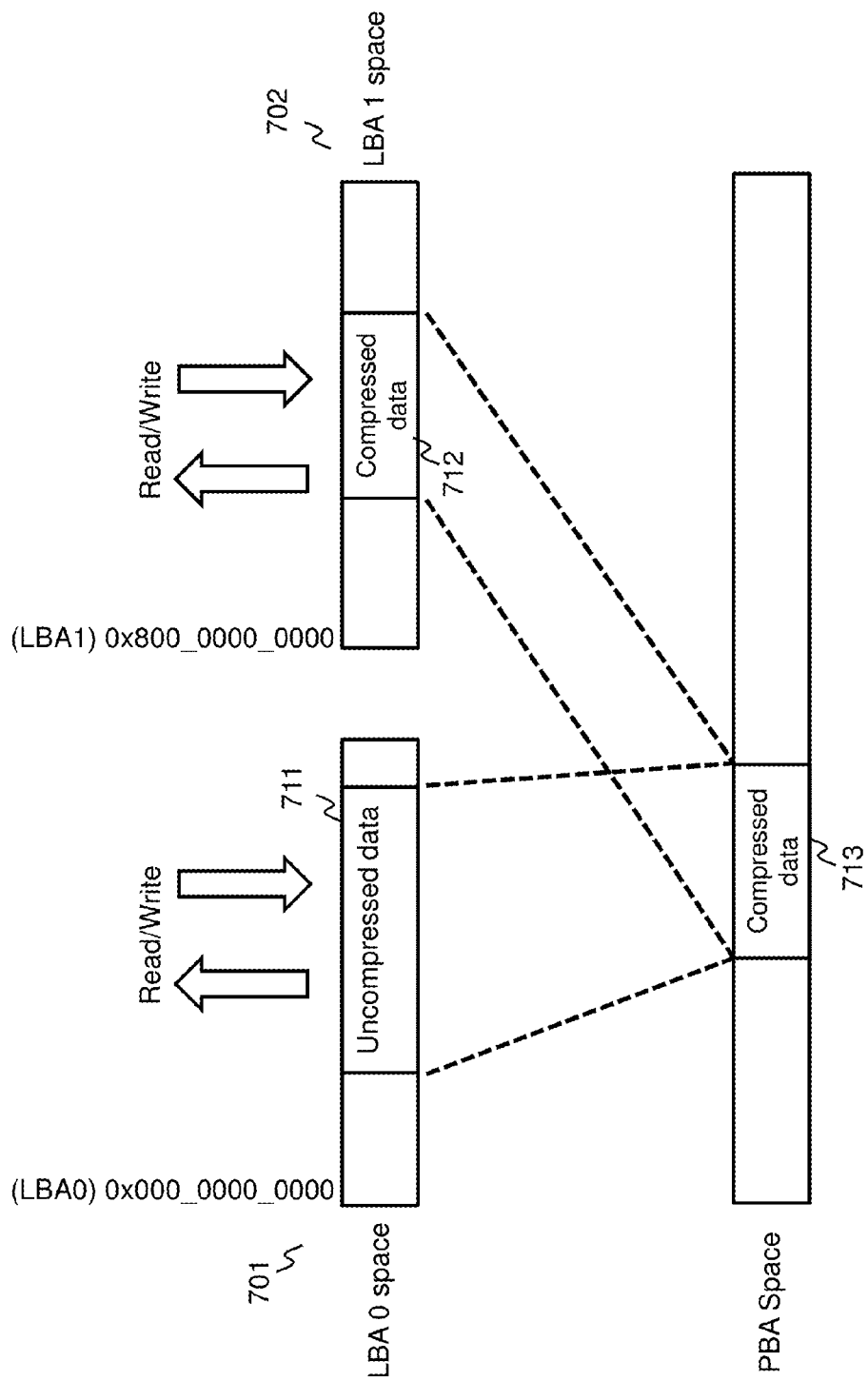
FIG. 4 is a view showing a concept of mapping between logical areas LBA 0 and LBA 1 that a cache memory of the present embodiment provides to a storage controller and physical area PBA.

Further, as shown in FIG. 4, the PBA space showing the physical storage area where compressed data 713 is stored may be mapped simultaneously to both an area in the LBA 0 space and an area in the LBA 1 space. For example, the decompressed data of the compressed data 713 is mapped as uncompressed data 711, and non-decompressed data of compressed data 713 is mapped as compressed data 712. This mapping is performed based on an instruction from the storage controller 10. For example, when the processor 21 writes data to the cache memory 26 with designating LBA 0 (supposing that LBA 0 is 0x00000001000), the relevant data is compressed by the data compression/decompression unit 418 within the cache memory 26, and the compressed data is placed in the PBA space dynamically selected by the cache memory 26 (specifically, a non-written page among a plurality of pages of the FM 420), and the data is managed in the state being mapped to address 0x00000001000 in the LBA 0 space. Thereafter, when the processor 21 issues a request to the cache memory 26 to map the data mapped to 0x00000001000 to the address in the LBA 1 space (supposing that it is 0x80000000010), this data is also mapped to LBA 1 space. And when the processor 21 issues a request (command) to the cache memory 26 to read the data of LBA 1 address 0x80000000010, the processor 21 can read the data that it has written to the LBA 0 address 0x00000001000 in the compressed state.

According to the cache memory 26 of the present embodiment, the uncompressed data subjected to a write instruction from the processor 21 of the storage controller 10 is compressed in 4-KB units. For example, if there is a write request of 8-KB data (uncompressed data) having LBA 0 space address (0x000_0000_0000) as the start address from the processor 21, compressed data is generated by compressing the 4-KB data of (LBA 0 space) address range 0x000_0000_0000 through 0x000_0000_0007 as a unit, and thereafter, compressed data is generated by compressing the 4-KB data of address range 0x000_0000_0008 through 0x000_0000_000F as a unit, wherein the respective compressed data is written to the physical storage area of the FM 420. However, the present invention is not restricted to the example where data is compressed in 4-KB units, and the present invention is also effective in a configuration where data is compressed in other units.

Furthermore, the size of the generated compressed data is restricted to a size of multiples of 512 bytes (one sector), and to a size not exceeding the size of the uncompressed data. In other words, by compressing a 4-KB data, the minimum size will be 512 bytes and the maximum size will be 4 KB.

Thereafter, a command used by the cache memory 26 to which the present invention is applied will be described. According to the cache memory 26 of the present embodiment, if a command is received from the processor 21 of the storage controller 10, it analyzes the contents of the received command and performs a predetermined process, and after completing the process, returns a response (response information) to the storage controller 10. The command includes an set of information required for the cache memory 26 to perform the predetermined process, and for example, if the command is a write command instructing to write data to the cache memory 26, the command includes information showing that the command is a write command and the information required to execute the write processing (such as the write location and data length of the write data). The cache memory 26 supports multiple types of commands, but at first, we will describe the information common to the respective commands.

Figure 5:
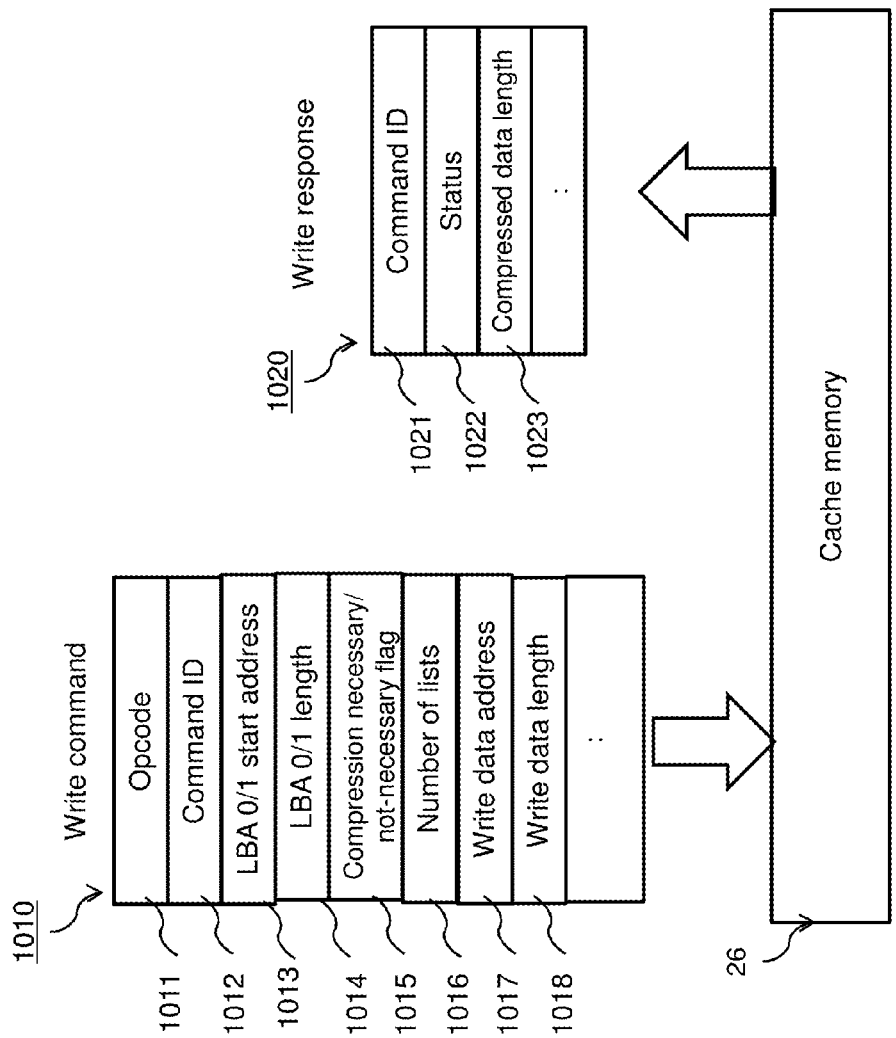
FIG. 5 is a view illustrating a write command and a response information to the write command supported by a cache memory 26 according to the present embodiment.

Each command includes, as common information, information of operation code (Opcode) and command ID at the head thereof. Then, after the command ID, information specific to each command (parameter) is added to form a single command. For example, FIG. 5 shows a view of a format of a write command of the cache memory 26 according to the present embodiment and a format of the response information corresponding to the write command, where element (field) 1011 in FIG. 5 is the Opcode, and element 1012 is the command ID. The respective information of element 1013 and thereafter are parameters specific to the write command. Further, as response information being returned after completing the processing of each command, a command ID and status are information included commonly in all response information, and information specific to the respective response information may be added after the status.

An operation code (Opcode) is information for notifying the command type to the cache memory 26, and by referring to this information, the cache memory 26 having acquired the command recognizes the notified command type. For example, it is determined that the Opcode is 0x01 for the write command and the Opcode is 0x02 for the read command.

A command ID is a field storing an ID specific to a command, and a designated ID is assigned to this field in the response information of the command to have the storage controller 10 recognize which command the response information corresponds to. The storage controller 10 generates an ID capable of uniquely identifying a command when creating a command, creates a command storing this ID in the command ID field, and transmits the command to the cache memory 26. Then, in the cache memory 26, when a process corresponding to the received command is completed, it includes the command ID of the relevant command in the response information and returns the same to the storage controller 10. When receiving this response information, the storage controller 10 acquires the ID included in the response information to recognize completion of the relevant command. Further, status (element 1022 of FIG. 5) included in the response information is a field storing information showing whether the processing of the command has been completed normally or not. If the processing of the command has not been completed normally (error), a number capable of identifying the cause of the error or the like is stored in the status.

(1) Write Command

FIG. 5 shows a write command and a response information related to the write command of the cache memory 26 according to the present embodiment. An LBA 0 write command 2010 of the cache memory 26 according to the present embodiment is composed of, as command information, an operation code 1011, a command ID 1012, an LBA 0/1 start address 1013, an LBA 0/1 length 1014, a compression necessary/not-necessary flag 1015, and a write data address 1016. The present embodiment illustrates an example of a command composed of the above information, but it can also include information in addition to the above. For example, an information related to a DIF (Data Integrity Field) and the like can be added to the command.

The LBA 0/1 start address 1013 is a field designating a head address of the write destination logical space. The LBA 0 space according to the preferred embodiment of the present invention is the space in the range from address 0x000_0000_0000 to 0x07F_FFFF_FFFF, and the LBA 1 space is determined to be the space after address 0x800_0000_0000, so that if an address of the range from 0x000_0000_0000 to 0x07F_FFFF_FFFF is stored in the LBA 0/1 start address 1013 of the write command, the cache memory 26 recognizes that the address of the LBA 0 space has been designated, and if an address of 0x800_0000_0000 or later is designated, it recognizes that the address of LBA 1 space has been designated. However, a method other than the method described above can be adopted as the method for recognizing the address space of whether LBA 0 space or LBA 1 space has been designated as the address. For example, a method can be adopted to identify the LBA 0 space and the LBA 1 space according to the contents of the Opcode 1011.

The LBA 0/1 length 1014 is a field designating the range (length) of storage destination LBA 0 or LBA 1 starting from the LBA 0/1 start address 1013, and a length designated by the number of sectors is stored. The cache memory 26 performs a process to map the PBA area storing the write data to the LBA 0/1 area of the range specified by the aforementioned LBA 0/1 start address 1013 and LBA 0/1 length 1014.

The compression necessary/not-necessary flag 1015 is a field designating whether compression of write target data designated by this command is necessary or not. According to the storage device 1 of the present embodiment, if the processor 21 clearly states that compression is unnecessary, this compression necessary/not-necessary flag 1015 will not be used to issue a write command designating the LBA 1 address. However, when the storage controller 10 creates a write command, when it is recognized in advance that that the size reduction effect by data compression cannot be expected for the write target data arriving from the host computer 3 (such as when it is already recognized that the data is compressed via image compression and the like), it is possible to notify the cache memory 26 that compression is unnecessary by setting the value of this flag ON (store "1"). When this flag is ON, the cache memory 26 has a function not to execute compression.

A write data address 1017 and a write data length 1018 are fields respectively storing a head address of the current storage location (in the embodiment of the present invention, the address in the DRAM 25) of the write target data designated by this command, and storing a length of the data. When write target data is stored in a contiguous region in the DRAM 25, only one set of the write data address 1017 and the write data length 1018 is stored in the write command, and at that time, "1" is stored in the number of lists 1016. On the other hand, when write target data is stored in a plurality of areas within the DRAM 25 in a discrete manner, a plurality of sets of write data address 1017 and write data length 1018 are stored in the write command, and the number of the set of the write data address 1017 and the write data length 1018 being stored is stored in the number of lists 1016. The cache memory 26 acquires the write data by acquiring the data from the area in the DRAM 25 instructed in this field whose area is the size stored in the LBA 0/1 length (1014). A different format other than the format where multiple sets of write data address 1017 and write data length 1018 are stored in the write command can be adopted. For example, an example where a pointer information of a list storing a plurality of addresses (a set of write data address 1017 and write data length 1018) (address storing a list (such as address within the DRAM 25)) is stored in the write command, and the cache memory 26 refers to the relevant pointer information to acquire the write data address 1017 and the write data length 1018, is possible.

A write response information 1020 is composed of a command ID 1021, a status 1022, and a compressed data length 1023. The command ID 1021 and the status 1022 are response information common to the respective commands, so that descriptions thereof are omitted. The compressed data length 1023 is a field for storing a data length after compression of the written data. By acquiring this field, the storage controller 10 can get the data size after compression of the written data. Further, in the present embodiment, when the write destination (LBA 0/1 start address 1013) is LBA 1, compressed data is recorded, so that the present field becomes invalid.

Further, a PBA may or may not be mapped to the area of the LBA 0 space (or LBA 1 space) designated by the LBA 0/1 start address 1013 and the LBA 0/1 length 1014 of the write command. If a PBA is not mapped, the cache memory 26 newly maps a PBA, and thereafter, writes data to the area designated by the relevant PBA. When a PBA is mapped, the area designated by the mapped PBA is managed as an unused area, a new PBA is mapped, and data is written to the area designated by the relevant PBA. This is because the storage media of the cache memory 26 according to the embodiment of the present invention adopts a flash memory, and in principle, overwrite of the flash memory is basically impossible (when performing overwrite, a process must be performed to first erase the block in which data is written). Then, when the number of areas managed as unused areas becomes equal to or greater than a predetermined number (or if writable pages become insufficient), a so-called garbage collection is performed in the cache memory 26 to create unwritten pages. However, since these processes are similar to the processes performed in a conventional storage device using well-known flash memories, detailed descriptions thereof are omitted in the present embodiment. The important point is that the storage controller 10 (processor 21) of the embodiment of the present invention does not recognize (not need to recognize) that the storage area is managed by an address space called PBA in the cache memory 26, and in the area of the LBA 0 space (or LBA 1 space) designated by the LBA 0/1 start address 1013 and the LBA 0/1 length 1014 of the write command, in appearance, overwrite designating the LBA 0 or LBA 1 is possible regardless of whether the PBA is mapped or not mapped.

(2) Read Command

Figure 6:
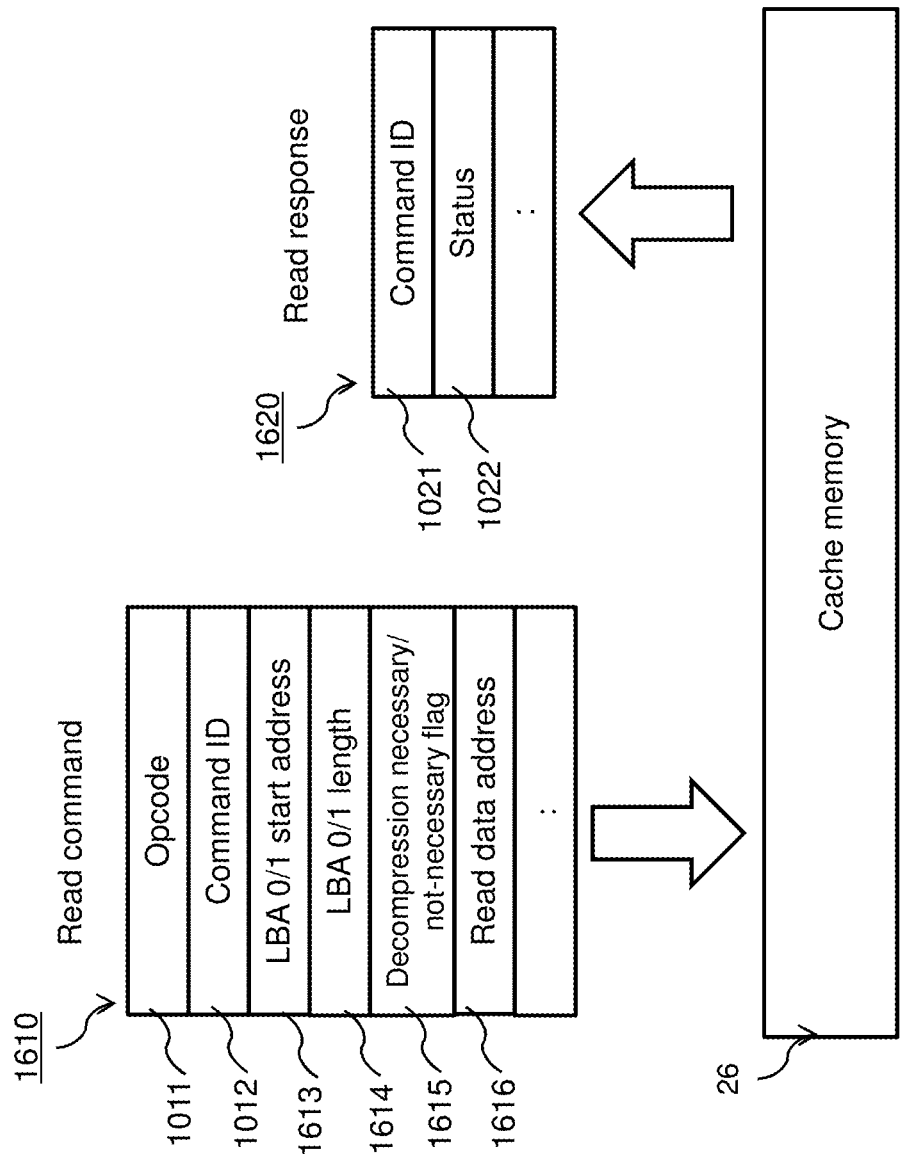
FIG. 6 is a view showing a read command and a response information to the read command supported by the cache memory 26 according to the present embodiment.

FIG. 6 is a view showing a read command and a response information to the read command supported by the cache memory 26 according to the present embodiment. A read command 1610 of the cache memory 26 according to the present embodiment is composed of, as command information, an operation code 1011, a command ID 1012, an LBA 0/1 start address 1613, an LBA 0/1 length 1614, a decompression necessary/not-necessary flag 1615, and a read data address 1616. In the present embodiment, the example of a command based on the above information is illustrated, but additional information other than the above can also be included. The command ID 1012 is the same contents as the aforementioned LBA 0 write command, so that description thereof is omitted.

The operation code 1011 is a field for notifying the command type to the cache memory 26, and the cache memory 26 having acquired the command recognizes that the command notified by this field is a read command.

The LBA 0/1 start address 1613 is a field designating the head address of a read destination logical space. The LBA 0/1 length 1614 is a field designating the range of storage destination LBA 0 or LBA 1 starting from the LBA 0/1 start address 1613. The cache memory 26 performs a read process by acquiring data from the PBA mapped to the area in the LBA 0 space or the LBA 1 space of the range shown by the aforementioned LBA 0 or LBA 1 start address 1613 and the LBA 0/1 length 1614, and transferring the acquired data to the storage controller 10 (by decompressing the data if necessary).

The decompression necessary/not-necessary flag 1615 is a field designating whether decompression of read target data designated by this command is necessary or not. When the storage device creates a read command, it controls this flag to notify the cache memory 26 that decompression is not necessary. Incidentally, this field is not necessarily included in the read command. In the case of the cache memory 26 in the present embodiment, when performing read by designating LBA 1, decompression of acquired data will not be performed, so that the decompression necessary/not-necessary flag 1615 is not necessary. However, as another embodiment, when the cache memory 26 receives a read command designating LBA 1, data read can be performed by decompressing data when the decompression necessary/not-necessary flag 1615 is OFF (0), and not decompressing data when the decompression necessary/not-necessary flag 1615 is ON (1).

A head address of the area where the read target data is outputted (for example, the address within the DRAM 25) is designated as the read data address 1616. From the area of the address designated by the read data address 1616, contiguous data of a length designated by the LBA 0/1 length 1614 is stored as the read data. Similar to the write command, an example where a plurality of sets of the read data address 1616 and data length are designated as the parameter of the read command and data is output to the areas in a discrete manner is possible.

A read response 1620 only includes information common to the response information of other commands (the command ID 1021 and the status 1022), so that the description thereof is omitted. A configuration can be adopted where additional information other than the common information is included in the read response 1620.

(3) Full-Stripe Parity Generation Command

Figure 7:
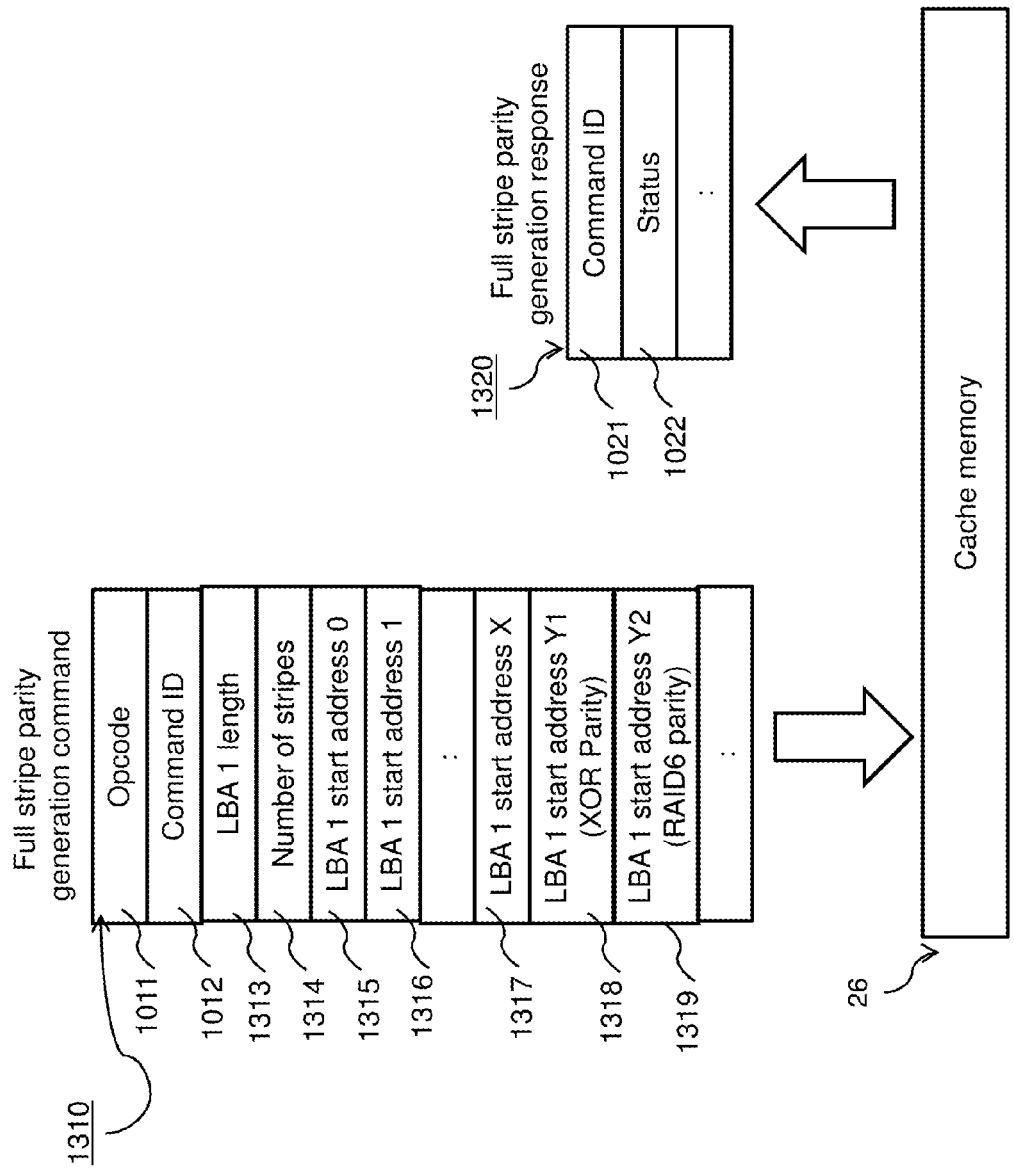
FIG. 7 is a full-stripe parity generation command and a response information to the full-stripe parity generation command supported by the cache memory 26 according to the present embodiment.

There are mainly two methods for generating parity in a RAID technique. One is a method for generating parity by calculating parity data such as XOR using all data necessary for generating parity, and this method is called "full-stripe parity generation method" in the present specification. The other method is a method for generating parity corresponding to update data (parity after update) by calculating XOR of the data before update stored in the storage media and parity before update corresponding to the data before update, in addition to the relevant update data, when update data is written to a group of storage media constituting a RAID configuration, and this method is called "update parity generation method" in the present specification. FIG. 7 is a view showing a full-stripe parity generation command and a response information to the full-stripe parity generation command supported by the cache memory 26 according to the present embodiment. The full-stripe parity generation command 1310 of the cache memory 26 according to the present embodiment is composed of, as command information, an operation code 1011, a command ID 1012, an LBA 1 length 1313, a number of stripes 1314, an LBA 1 start address 0 to X (1315 to 1317), an LBA 1 start address (for XOR parity) 1318, and an LBA 1 start address (for RAID 6 parity) 1319. In the present embodiment, an example of a command including the above information is illustrated, but addition information other than the above can be included.

The cache memory 26 recognizes based on the contents of the field of Opcode 1011 that the command received from the storage controller 10 is a full-stripe parity generation command. Further, the type of the parity to be generated differs depending on the RAID level. Therefore, the cache memory 26 according to the present embodiment changes the parity to be generated, depending on the contents of the Opcode 1011. For example, when one of 0x11, 0x12 or 0x13 is designated as the Opcode, a full-stripe parity generation is performed, but when 0x11 is designated as the Opcode, one parity used for RAID 4 and RAID 5 (XOR data) is generated, when 0x12 is designated as the Opcode, two parities (so-called P parity and Q parity) used for RAID 6 (using a Reed-Solomon code) are generated, and when 0x13 is designated as the Opcode, two parities (horizontal parity and diagonal parity) used for RAID 6 (so-called EVENODD method, Row-Diagonal parity method) are generated.

The LBA 1 length 1313 is a field designating a length of the parity being generated or the length of the parity generation source data (in RAID parity, the lengths of the parity and the parity generation source data are the same). The number of stripes 1314 designates the number of data used for generating parities. For example, when parities are generated for six data, six is stored in the number of stripes 1314.

LBA 1 start addresses 1315 through 1317 are fields designating the start address of LBA 1 to which the parity generation source data is mapped. The number of these fields coincides with the number designated in the number of stripes 1314 (if the command that the number of these fields and the number of stripes 1314 doesn't coincide is issued, the cache memory 26 returns an error). For example, in a configuration where two parities are created for six data, (RAID 6 configuration of 6D+2P), six LBA 1 start addresses are designated.

An LBA 1 start address Y1 (for XOR parity) 1318 is a field for designating the storage destination of the RAID parity (XOR parity) being generated. The generated parity (parity in RAID 5, or P parity or horizontal parity in RAID 6) is stored in the area from this start address to the range designated by the LBA 1 length 1313.

An LBA 1 start address (for RAID 6) 1319 is a field for designating the storage destination of the generated parity for RAID 6. The parity for RAID 6 is, as mentioned earlier, a Q parity of the Reed-Solomon code or a diagonal parity in an EVENODD method. In the present invention, the generated parity is stored in the area from the LBA 1 start address (for RAID 6) 1319 to the area designated by the LBA 1 length 1313. Of course, when a parity generation command for RAID 5 is designated as the Opcode (such as when 0x11 is designated), designation of the LBA 1 start address (for RAID 6) 1319 is not necessary.

When the cache memory 26 of the present embodiment receives a full-stripe parity generation command, a plurality of compressed data is acquired from the area in the FM 420 specified by the PBA mapped to the area designated by the aforementioned LBA 1 start addresses 1315 through 1317, and (one or two) parity/parities is/are generated using the parity generation unit 419 in the cache memory 26. Thereafter, the generated parity is stored in the area of the FM 420. Similar to the data write via a write command, PBAs are dynamically mapped to the LBA 1 space specified by the LBA 1 start address (for XOR parity) 1318 and/or the LBA 1 start address (for RAID 6 parity) 1319, and the parities are written into the area specified by the allocated PBAs.

A full-stripe parity generation response 1320 is composed of the command ID 1021 and the status 1022, which are information common to other commands, so that the descriptions thereof are omitted.

(4) Update Parity Generation Command

The update parity generation executed by the cache memory 26 according to the preferred embodiment of the present invention can be executed if three data, which are update data, data before update (old data) of the area updated by the update data, and old parity corresponding to the old data, are mapped to the LBA 1 space in the cache memory 26, when recording update data to the area of a final storage media (SSD 11 or HDD 12) in which a parity has already been created. As described later, in principle, since the storage controller 10 according to the present embodiment performs parity generation via the full-stripe parity generation method, there is no change that parity generation is performed via the update parity generation method, but the cache memory 26 is equipped with a function to perform update parity generation just in case. In order to perform update parity generation, it reads the old data and the old parity from the final storage media having a RAID configuration, stores them in the LBA 1 space of the cache memory 26, and thereafter, issues an update parity generation command designating the update data, the old data of the area updated by the update data, the old parity protecting the old data, and the LBA 1 address of the update parity.

Figure 8:
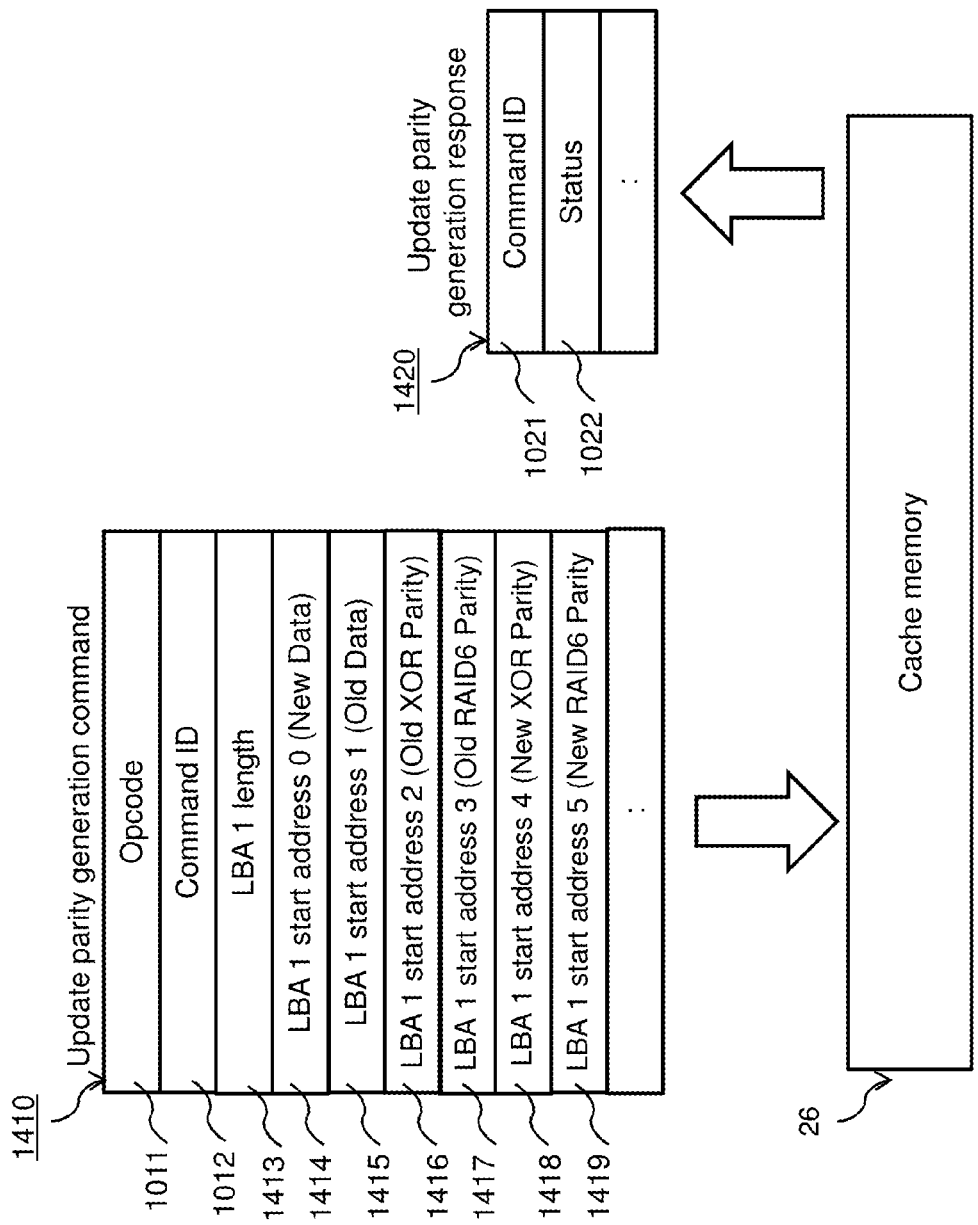
FIG. 8 is a view showing an update parity generation command and response information to the update parity generation command supported by a cache memory 26 according to the preferred embodiment.

FIG. 8 is a view showing an update parity generation command and a response information to the update parity generation command supported by the cache memory 26 according to the present embodiment. An update parity command 1410 is composed of, as command information, an operation code 1011, a command ID 1012, an LBA 1 length 1413, an LBA 1 start address 0 (1414), an LBA 1 start address 1 (1415), an LBA 1 start address 2 (1416), an LBA 1 start address 3 (1417), an LBA 1 start address 4 (1418), and an LBA 1 start address 5 (1419). The present embodiment describes an example of a command composed of the above information, but additional information can be added thereto.

The operation code 1011 is a field for notifying the command classification to the cache memory 26, and the cache memory 26 having acquired this command recognizes that the command notified through this field is the update parity generation command. Further, similar to the full-stripe parity generation command, the type of the parity to be generated varies according to the content of the Opcode 1011.

The LBA 1 length 1413 is a field designating the length of the parity being generated (in the RAID parity, the lengths of the parity and the parity generation source data are the same). The LBA 1 start address 0 (1414) is a field denoting a start address of the area of the LBA 1 to which new data for updating parity is mapped. The storage controller 10 uses this field to notify the cache memory 26 that the data in the area from the LBA 1 start address 0 (1414) to the length specified by the LBA 1 length 1413 is new data. The LBA 1 start address 1 (1415) is a field denoting the start address of the area of LBA 1 to which old data for updating parity is mapped. The storage controller 10 uses this field to notify the cache memory 26 that the data in the area from the LBA 1 start address 1 (1415) to the length specified by the LBA 1 length 1413 is old data.

The LBA 1 start address 2 (1416) is a field denoting a start address of the area of LBA 1 to which the XOR parity before update is mapped for updating parity. The storage device uses this field to notify the cache memory 26 that the data in the area from the LBA 1 start address 2 (1416) to the length specified by the LBA 1 length 1413 is an XOR parity. The LBA 1 start address 3 (1417) is a field denoting a start address of an area of the LBA 1 to which parity for RAID 6 before update is mapped for updating parity. The storage device 1 uses this field to notify the cache memory 26 that the data of the area from the LBA 1 start address 3 (1417) to the length specified by the LBA 1 length 1413 is a parity for RAID 6 before update.

The LBA 1 start address 4 (1418) is a field denoting the start address of the area of the LBA 1 to which the XOR parity newly created is mapped. The storage device uses this field to instruct the cache memory 26 to map the new XOR parity to the area from the LBA 1 start address 4 (1418) to the length specified by the LBA 1 length 1413. The LBA 1 start address 5 (1419) is a field denoting the start address of the area of LBA 1 to which the parity for RAID 6 newly created is mapped. The storage device uses this field to instruct the cache memory 26 to map the new parity for RAID 6 to the area from the LBA 1 start address 5 (1419) to the length specified by the LBA 1 length 1413. Incidentally, there is no need to designate the LBA 1 start address 3 (1417) and the LBA 1 start address 5 (1419) when generating a parity for RAID 5, so that the values stored in the relevant fields of the command transmitted from the processor 21 to the cache memory 26 will be ignored.

The process performed when the cache memory 26 of the present embodiment receives an update parity generation command is similar to the process performed when it receives a full-stripe parity generation command. A plurality of compressed data are acquired from the storage area in the FM 420 shown by the PBA mapped to the area designated by the aforementioned LBA 1 start addresses 1414 through 1417, and by using the parity generation unit 419 in the cache memory 26, one or two parities are generated. Thereafter, the generated parities are recorded in the area specified by the LBA 1 start address 4 (1418) and the LBA 1 start address 5 (1419).

(5) LBA 1 Mapping Command

In the cache memory 26 of the present embodiment, the data written by designating the area of the LBA 0 is compressed by the cache memory 26 and recorded in the FM 420. Thereafter, to generate RAID regarding this compressed data, and to write the compressed data in the compressed state to the final storage media, the compressed data is mapped to the LBA 1 that differs from LBA 0. The LBA 1 mapping command is used at this time.

Figure 9:
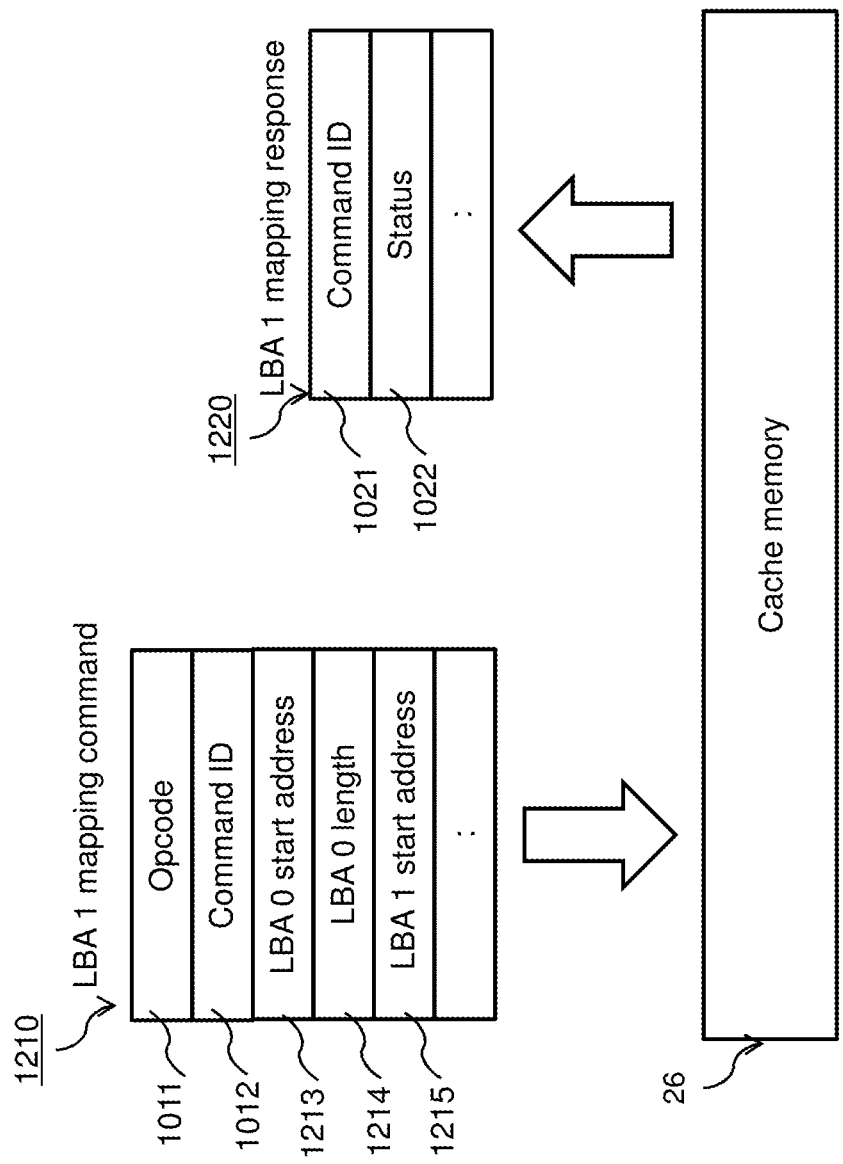
FIG. 9 is a view showing an LBA 1 mapping command and a response information to the LBA 1 mapping command supported by the cache memory 26 of the present embodiment.

FIG. 9 is a view showing a format of an LBA 1 mapping command and a response information to the LBA 1 mapping command supported by the cache memory 26 according to the present embodiment. An LBA 1 mapping command 1210 is composed of, as command information, an operation code 1011, a command ID 1012, an LBA 0 start address 1213, an LBA 0 length 1214, and an LBA 1 start address 1215. In the present embodiment, an example of a command configured of the above information is described, but additional information other than the above can be included.

The LBA 0 start address 1213 is a field designating a head address of an LBA 0 area of the target data, the compressed data of which is to be mapped to LBA 1. The LBA 0 length 1214 is a field designating a range of the LBA 0 starting from LBA 0 start address 1213 being the mapping target to the LBA 1. Further, the LBA 0 start address 1213 and the LBA 0 length 1214 are restricted to multiples of 8 sectors (4 KB).

The LBA 1 start address 1215 is a field designating a start address of the LBA 1 to be mapped. The processor 21 of the storage controller 10 recognizes the size of the data to be mapped in advance, allocates the area of the LBA 1 capable of mapping this data size, stores this head address in the LBA 1 start address 1215 field, and issues the relevant command to the cache memory 26.

The cache memory 26 according to the present embodiment performs mapping of the compressed data mapped to the LBA 0 area in the range denoted by the aforementioned LBA 0 start address 1213 and LBA 0 length 1214 to an area having a size corresponding to the compressed data starting from the LBA 1 start address 1215. Thus, when the processor 21 issues a read command designating the LBA 1 address mapped by the relevant command to the cache memory thereafter, the compressed data mapped to the relevant LBA 1 address can be read.

An LBA 1 mapping response 1220 is composed of a command ID 1021 and a status 1022. The present embodiment illustrates an example of a response information including the above information, but additional information other than the above can also be included.

(6) LBA 0 Mapping Command

When the storage device 1 of the present embodiment reads data (compressed data) from the final storage media, it stores the compressed data in (the FM 420 of) the cache memory 26 by issuing a write command designating the area of LBA 1 to the cache memory 26. Further, when a read request and the like is received from the host computer 3, the compressed data stored in the FM 420 must be sent to the host computer 3 in a decompressed state. The LBA 0 mapping command is used to do this.

Figure 10:
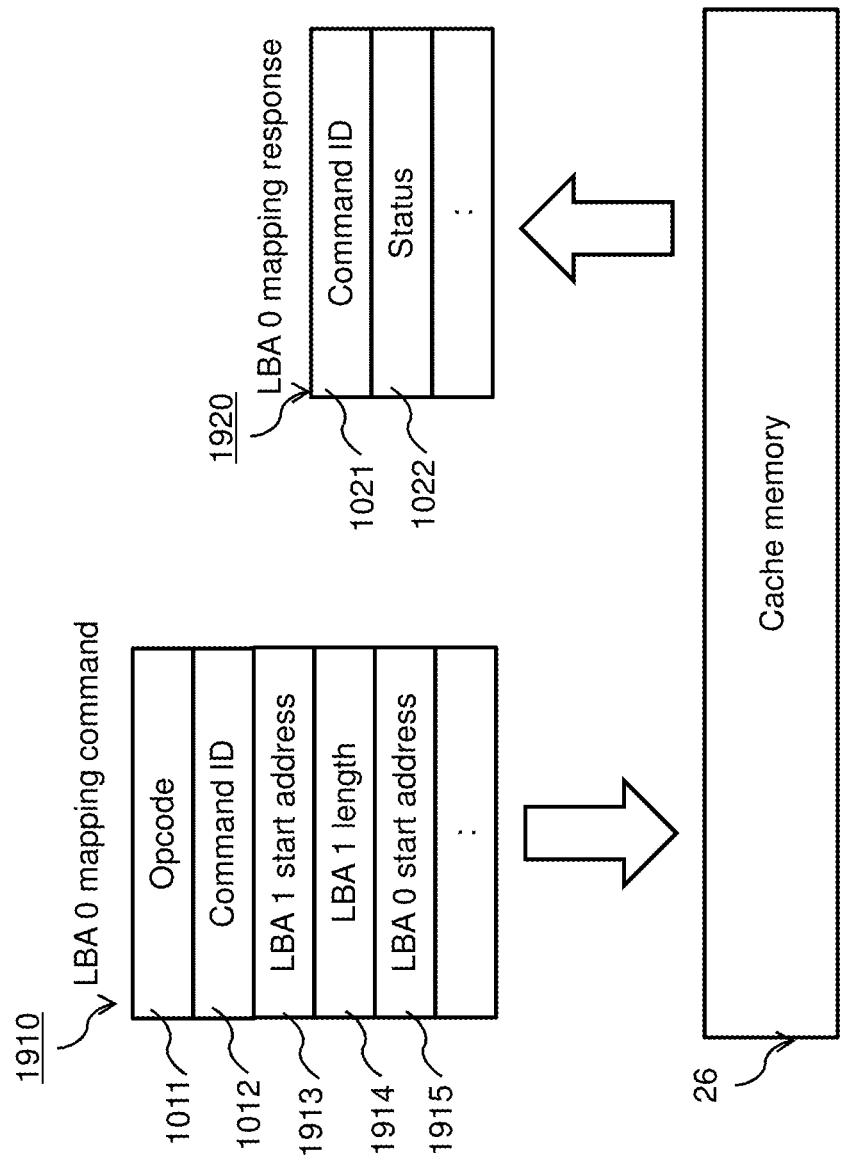
FIG. 10 is an LBA 0 mapping command and a response information to the relevant LBA 0 mapping command supported by the cache memory 26 according to the present embodiment.

FIG. 10 is a view showing an LBA 0 mapping command and a response information to the relevant LBA 0 mapping command supported by the cache memory 26 according to the present embodiment. An LBA 0 mapping command 1210 according to the cache memory 26 of the present embodiment is composed of, as command information, an operation code 1011, a command ID 1012, an LBA 1 start address 1913, an LBA 1 length 1914, and an LBA 0 start address 1915. An example of a command including the above information is illustrated in the present embodiment, but additional information other than those described above can also be included.

The LBA 1 start address 1913 is a field for designating a head address of the range in the LBA 1 space of compressed data to be mapped. The LBA 1 length 1914 is a field for designating the range of LBA 1 starting from the LBA 1 start address 1913 to be mapped to LBA 0.

The LBA 0 start address 1915 is a field for designating the start address of LBA 0 being mapped. The storage controller 10 recognizes the data size after decompression of the compressed data recorded in LBA 1 based on the management information managed by the storage device 1, and prior to issuing the LBA 0 mapping command, it allocates an area in LBA 0 to which it can map this data size, and when creating an LBA 0 mapping command, this head address is stored in the LBA 0 start address 1915 field. Further, the address capable of being designated as the LBA 0 start address 1915 is restricted to multiples of 8 sectors (4 KB).

When the cache memory 26 of the present embodiment receives an LBA 0 mapping command from the storage controller 10, it performs mapping of the compressed data mapped to the range in the LBA 1 area denoted by the aforementioned LBA 1 start address 1913 and the LBA 1 length 1914 to the area from the LBA 0 start address 1915 corresponding to the data size after decompression. Thereafter, when the processor 21 issues a read command designating the LBA 0 address mapped by the relevant command to the cache memory, the compressed data mapped to the relevant LBA 0 address can be read in the decompressed state.

An LBA 0 mapping response 1920 only includes information (command ID 1021 and status 1022) common to the response information of other commands, so that the description thereof is omitted. It can also adopt a configuration where additional information other than the common information is included in the LBA 0 mapping response 1920.

(7) Compressed Data Size Acquisition Command

Figure 11:
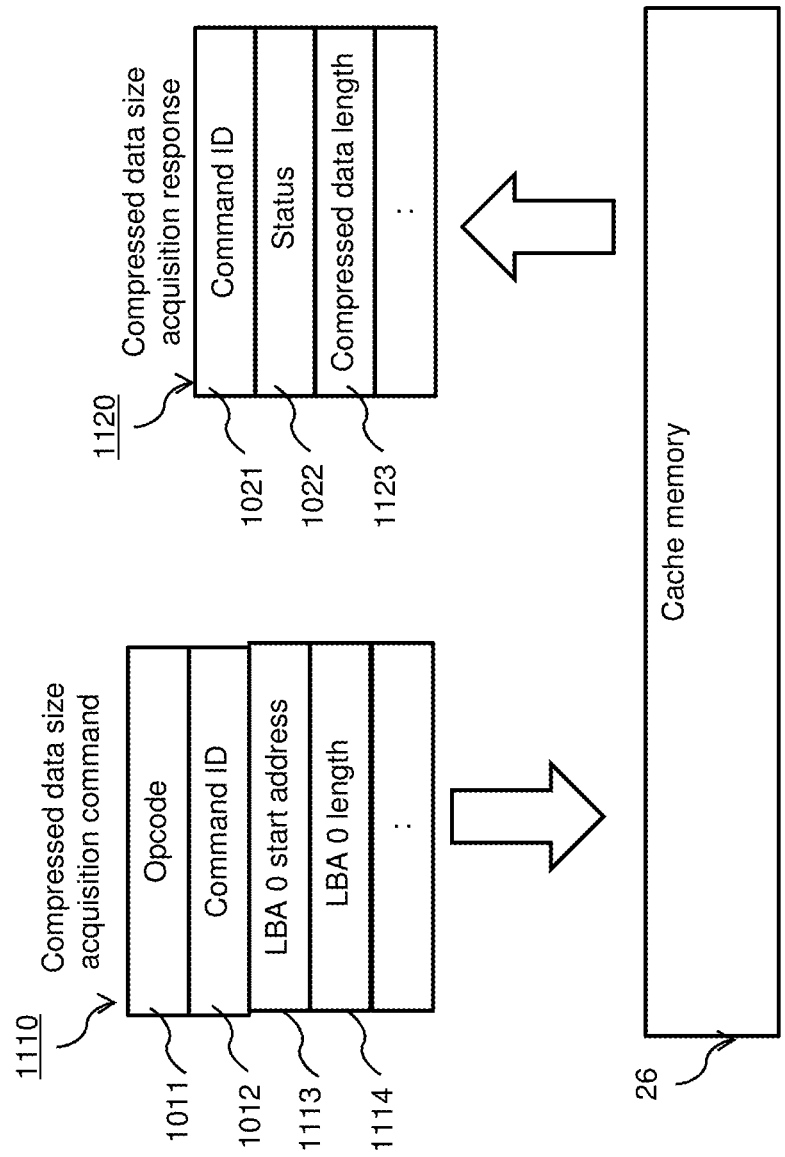
FIG. 11 is a compression data size acquisition command and response information to the compression data size acquisition command supported by the cache memory 26 according to the present embodiment.

FIG. 11 is a view showing a compressed data size acquisition command and response information to that compressed data size acquisition command supported by the cache memory 26 according to the present embodiment. A compressed data size acquisition command 1110 of the cache memory 26 according to the present embodiment is composed of, as command information, an operation code 1011, a command ID 1012, an LBA 0 start address 1113, and an LBA length 1114. An example of a command based on the above information is illustrated in the present embodiment, but additional information other than the above can also be included. Since the contents of the command ID 1012 are the same as the contents of the LBA 0 write command, the description of it will be omitted.

Hereafter, information unique to the compressed data size acquisition command will be described.

The LBA 0 start address 1113 is a field for designating a head address of the LBA 0 area being the target of data size acquisition after compression. The LBA length 1114 is a field for designating the range of the LBA 0 starting from the LBA 0 start address 1113. The cache memory 26 computes a data size (size in the compressed state) mapped to the range in the LBA 0 area denoted by the aforementioned LBA 0 start address 1113 and the LBA length 1114, and notifies it to the storage device. The address that can be designated as the LBA 0 start address 1113 is restricted to multiples of 8 sectors (4 KB). Similarly, the length that can be designated as the LBA length 1114 is also restricted to multiples of 8 sectors (4 KB). If an address (such as 0x000_0000_0001) or length that does not correspond to the 8-sector boundary is designated as the LBA 0 start address 1113 or the LBA length 1114, an error is returned.

A compressed data size acquisition response 1120 is composed of a compressed data length 1123 in addition to the command ID 1021 and the status 1022. In the present embodiment, an example of the response information having the above information is described, but additional information other than the above can also be included. The compressed data length 1123 is a field storing the compressed data size mapped to the LBA 0 area instructed by the compressed data size acquisition command. When transferring data from the decompression VOL to the compression VOL, the storage controller 10 performs a process to acquire the value of this compressed data length.

(8) Mapping Release Command

According to the present embodiment, the storage controller 10 maps data to LBA 1 in order to acquire the compressed and recorded write data in the compressed state, or to generate a parity with respect to the compressed data. Further, it maps the data recorded in the cache memory 26 designating LBA 1 to LBA 0, in order to acquire the compressed information in a decompressed state. Thereafter, when a process is ended and the area mapped as described becomes unnecessary, mapping is released. The storage device according to the present embodiment uses the mapping release command to release the mapping of the area in LBA 0 or LBA 1 mapped to the PBA.

Figure 12:
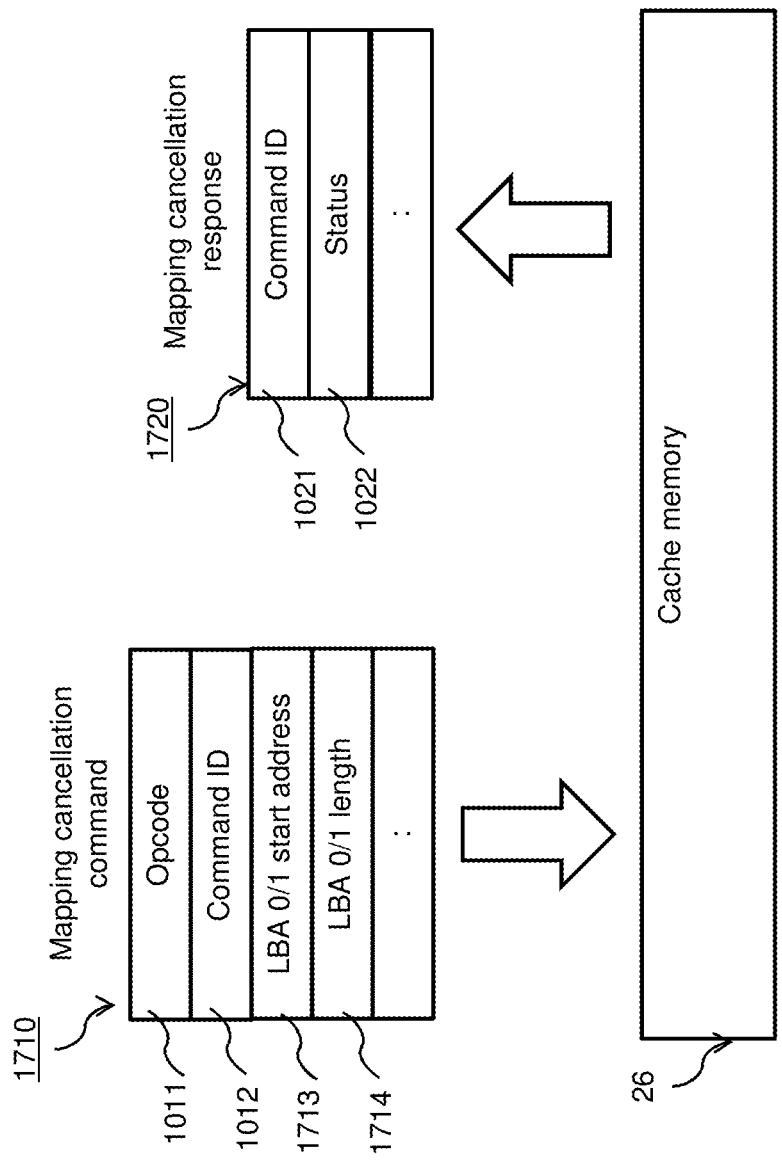
FIG. 12 is a mapping release command and a response information to the mapping release command supported by the cache memory 26 according to the present embodiment.

FIG. 12 is a view showing a mapping release command and response information to the mapping release command supported by the cache memory 26 according to the present embodiment. A mapping release command 1710 according to the cache memory 26 of the present embodiment is configured of, as command information, an operation code 1011, a command ID 1012, an LBA 0/1 start address 1713, and an LBA 0/1 length 1714. The present embodiment illustrates an example of a command having the above information, but additional information other than the above can also be included. Hereafter, the contents of the parameter unique to the mapping release command and processing performed when the cache memory 26 receives the mapping release command will be described.

The LBA 0/1 start address 1713 is a field for designating the head address in a logical space whose mapping is released, and both the address of LBA 0 space and LBA 1 space can be designated. However, if the address of LBA 0 space is designated, the address must be an address of a 4-KB (8-sector) boundary, and if an address that does not correspond to the 4-KB (8-sector) boundary is designated, the cache memory 26 returns an error. The LBA 0/1 length 1714 is a field for designating the range of record destination LBA 0 or LBA 1 starting from the LBA 0/1 start address 1713.

Next, we will describe a cache management data structure according to the preferred embodiment of the present invention, but prior thereto, the outline of a volume managed by the storage device 1 of the present invention and the relationship between the volume (logical volume) and cache management data will be illustrated.

According to the storage device 1 of the present invention, the data written from the host computer 3 is stored in the SSD 11 or the HDD 12 which are final storage media, but the storage space of SSD 11 or the HDD 12 as final storage media is not directly provided to the host computer 3. A logical volume having a logical storage space is provided to the host computer 3. Further, the data written from the host computer 3 is stored in a compressed state to the final storage media, but the host computer 3 is not made to recognize that the data is stored in the compressed state, and the host computer 3 simply recognizes as if uncompressed data is stored in the logical volume (that can be recognized from the host computer 3). In order to realize such state, as described at the beginning, the storage device 1 creates and manages two types of logical volumes. One type of logical volume is the logical volume provided to the host computer 3 as mentioned earlier, which is a decompression VOL recognized from the host computer 3 as if uncompressed data is stored. The second type of logical volume is the compression VOL.

The storage device 1 maintains and manages a decompression VOL management table 500 as shown in FIG. 13 for providing a decompression VOL to the host computer 3. The storage device 1 is capable of providing a plurality of decompression VOLs to the host computer 3, and a unique identification number (logical volume number) is assigned to each decompression VOL for management. A VVOL #503 shows an identification number assigned to the decompression VOL. A size 504 shows a capacity of the relevant decompression VOL. Further, when identifying each decompression VOL in the host computer 3, a logical volume number will not be used, but an identifier of a host interface (port) 24 (such as a WWN (World Wide Name) of the FC if the host interface 24 is an FC interface) and a logical unit number (LUN) are used, so that it is necessary to manage the association between the logical unit number and a set of (port identifier and LUN). A port identifier (WWN) and a LUN which are used for the host computer 3 to identify each decompression VOL are stored in a port #501 and a LUN 502, which are associated with the VVOL #503. When newly creating a volume (decompression VOL), the administrator of the storage device 1 uses the GUI of the management device 4 to designate the port #, the LUN and the size of the decompression VOL to be created newly. When the storage device 1 receives this designation, it creates a new entry within the decompression VOL management table 500, and stores the information designated by the administrator in the fields of the port #501, the LUN 502 and the size 504 of the newly created entry. At the same time, it automatically generates an unused VVOL #503 and stores the same in the field of the VVOL #503, to create (define) the decompression VOL.

Next, a compression VOL will be described. The decompression VOL described earlier is for providing a logical (virtual) storage area to the host computer 3, and at the point of time when it is defined, physical storage areas (storage area of SSD 11 or HDD 12 which are final storage media) corresponding to the respective addresses of the decompression VOL do not exist. On the other hand, a compression VOL is a volume whose respective storage areas (in the compression VOL) have a one-to-one correspondence with the storage areas of the SSD 11 or the HDD 12 at the point of time when it is defined. The storage device 1 according to the present invention manages a plurality of (such as four) final storage media as a RAID group, and data recovery is made possible even when failure occurs to one or two final storage media in the RAID group, and the storage device 1 of the present invention manages one RAID group as one compression VOL.

FIG. 14 shows a compression VOL management table 550 managed by the storage device 1. An LDEV #551 is an identification number of a compression VOL defined in the storage device 1, and a PDEV #552, a RAID level 553 and a size 554 respectively show an identification number of final storage media (SSD 11 or HDD 12) configuring the compression VOL, a RAID level of a RAID group configured by the final storage media specified by the PDEV #552, and a capacity of the compression VOL (excluding the capacity of the area consumed by the RAID parity). In the embodiment of the present invention, one compression VOL corresponds to one RAID group, so that the capacity of the compression VOL is the capacity having excluded the storage capacity of parity data from the total capacity of all final storage media constituting the RAID group. The present invention is not restricted to a configuration where one RAID group and one compression VOL have a one-to-one correspondence. It is also possible to adopt a configuration where one RAID group is divided, and wherein each divided RAID group area is made to correspond to one compression VOL, or a plurality of RAID groups is made to correspond to one compression VOL. When newly creating a volume (compression VOL), the administrator of the storage device 1 uses a GUI that the management device 4 provides to designate (the identification number of) a final storage media for constituting a compression VOL (RAID group) to be newly created, and the RAID level. When the storage device 1 receives this designation, it creates a new entry within the compression VOL management table 550, and stores information designated by the administrator in the fields of the PDEV #52 and the RAID level 553 of the newly created entry. At the same time, an unused identification number for a compression VOL is automatically generated and stored in the field of the LDEV #551, the RAID group size is computed, and stored in the field of size 554, to thereby create (define) the compression VOL.

Figure 15:
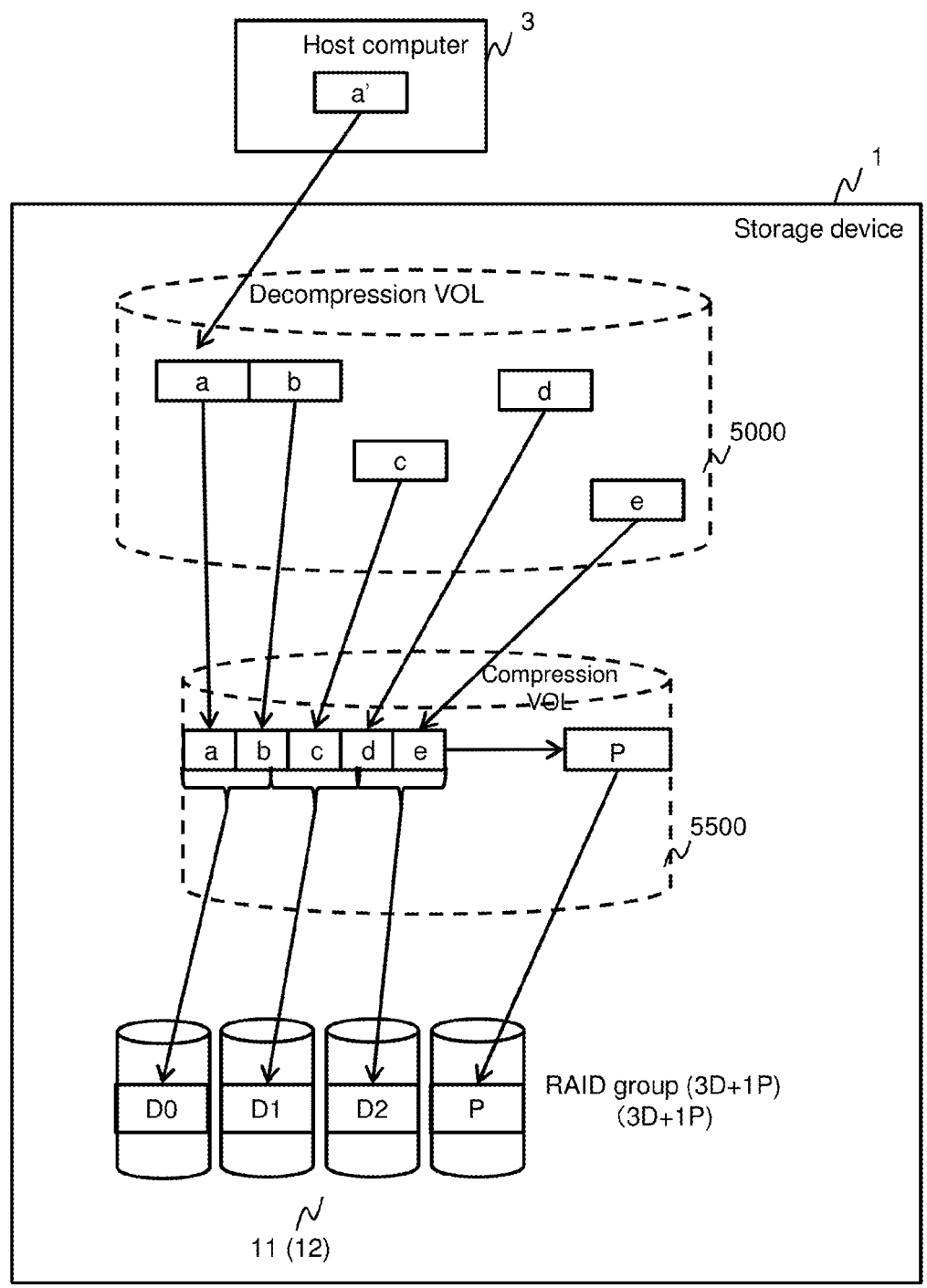
FIG. 15 is a conceptual diagram showing a relationship between decompression VOL and compression VOL.

Next, the relationship between decompression VOL and compression VOL will be described with reference to FIG. 15. When a write request designating the decompression VOL 5000 as the write target volume and write target data (write data) of the relevant write request is transmitted from the host computer 3, the write data is stored in a compressed state in the cache memory 26 (not shown in FIG. 15). Hereafter, this state is referred to as a state where "data (write data) is written to the decompression VOL". However, the state that data is compressed is not visible (not recognized) from the host computer 3.

According to the storage device 1 of the preferred embodiment of the present invention, in order to store the write data written to the decompression VOL 5000 into the final storage media (SSD 11 and HDD 12), data is transferred (migrated) from the decompression VOL 5000 to the compression VOL 5500. The details of the "migration" process performed here will be described later, wherein "migration" does not refer to a process for physically moving/replicating data, but refers to a process for mapping the address of the storage area in the decompression VOL 5000 where data is written to the address in the storage area in the compression VOL 5500. Further, the mapping between the address in the decompression VOL 5000 where data is written and the address in the compression VOL 5500 to which the address in the decompression VOL 5000 is mapped is not static, and may vary each time data is written to the decompression VOL.

The outline of the method for mapping data written in the decompression VOL 5000 to the compression VOL will be described. We will assume a case where data a, b, c, d and e are written randomly (in non-contiguous areas) in the decompression VOL 5000, and no data is mapped to the compression VOL 5500. After a given amount of data has been written to the decompression VOL 5000, the storage controller 10 performs a process to migrate the data to the compression VOL 5500, that is, a process to map the area in the decompression VOL 5000 to which data a, b, c, d and e have been written to the area of the compression VOL 5500, and during that process, in order to reduce the overhead of the data write processing to the final storage media (SSD 11 and HDD 12), mapping is performed so that data a, b, c, d and e are stored sequentially from the head of the compression VOL 5500 (refer to FIG. 15).

Further, the data in the compression VOL will not be overwritten. For example, as shown in FIG. 15, after data a, b, c, d and e have been migrated (mapped) to the compression VOL, when a write request for updating the content of data to a' to the area in the decompression VOL 5000 where data a is stored arrives from the host computer 3, the data content of the area where data a was written is updated to a' in the decompression VOL, but the update data a' is written to the area in the compression VOL (such as immediately after the area where data e is stored) that differs from the area where (compressed data of) data a is written in an appending manner.

After (compressed data of) data a, b, c, d and e have been mapped to the compression VOL, redundant data (parity) is generated via RAID technique based on these data, and the data (compressed data) and parity are written to the final storage media (SSD 11 or HDD 12) constituting the compression VOL. Hereafter, the process for writing data (or parity) to the final storage media (SSD 11 or HDD 12) is referred to as "destaging".

Figure 16:
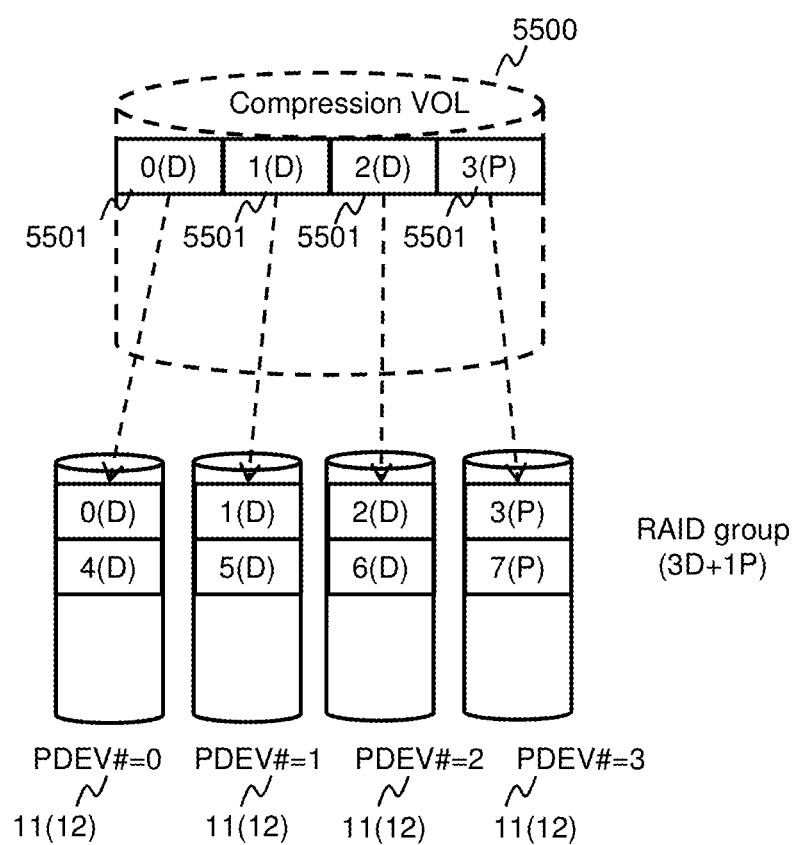
FIG. 16 is a conceptual diagram showing a relationship between compression VOL and final storage media corresponding to compression VOL.

As described earlier, in the process for migrating the data in the decompression VOL to the compression VOL, data is arranged in the compression VOL so that the overhead of the data writing process to the final storage media (SSD 11 or HDD 12) is minimized, and the arrangement method will be described in detail. FIG. 16 is a conceptual diagram showing the mapping between the compression VOL 5500 and the final storage media (SSD 11 or HDD 12) corresponding to the compression VOL. Here, for simplified description, a case is described where the RAID group is composed of four final storage media and the RAID level is 4, but other RAID levels can be realized similarly.

Element 5501 in the drawing is an area having a 16-KB (32-sector) size, as an example, and it is called "slot" according to the embodiment of the present invention. Further, the slot 5501 having "0 (D)" denoted in the slot 5501 shows a slot storing data (hereinafter called data slot), and the slot 5501 having "3 (P)" denoted shows a slot storing parity (that is, an exclusive OR of 0 (D), 1 (D) and 2 (D)) (hereinafter called parity slot). When the storage controller 10 migrates the data written in the decompression VOL 5000 to the compression VOL 5500, a process is performed to migrate the compressed data to the data slot and allocate a parity slot. In the following, the set of data slots required to generate a parity corresponding to one parity slot (for example, the data slots required to generate parity slot "3 (P)" are "0 (D)", "1 (D)" and "2 (D)") are called a "stripe group".

When the storage device 1 generates a parity from a plurality of write data, if data necessary for generating a parity does not exist in the cache memory 26 of the storage controller 10, data must be read from the final storage media (SSD 11 or HDD 12). For example, if data of slot 0 (D) is updated in FIG. 16, in order to generate parity 3 (P) corresponding to slot 0 (D), data 0 (D) before update and parity 3 (P) (or data 1 (D) and data 2 (D)) must be read from the final storage media (SSD 11 or HDD 12) (the overhead during data write is increased). However, if data 0 (D), 1 (D) and 2 (D) all exist in the cache memory 26, it is only necessary to compute the exclusive OR of data 0 (D), 1 (D) and 2 (D) stored in the cache memory 26, so that an overhead of reading data from the final storage media (SSD 11 or HDD 12) will not occur.

Therefore, the storage device 1 of the present invention migrates the data from the decompression VOL 5000 to the compression VOL 5500 is performed after data of an amount corresponding to one stripe group (in the example of FIG. 16, the total size of data 0 (D), 1 (D) and 2 (D), in other words, data corresponding to 48 KB) is written, so that it does not have to read data before update or parity before update from the final storage media. Then, when migrating (mapping) the data to the compression VOL 5500, data is mapped sequentially from the head of the stripe group (in the example of FIG. 16, the location of data 0 (D) or 4 (D)), and at the point of time when mapping of data is completed to the end of the stripe group (in the example of FIG. 16, the location of data 3 (D) or 6 (D)), data migration to the compression VOL is ended, and generation of parity (3 (P) or 7 (P) is performed. When data corresponding to one stripe group (48 KB) is written to the decompression VOL, data migration from the decompression VOL to the compression VOL is performed again. Of course, it is not necessary to perform data migration from the decompression VOL to the compression VOL each time data corresponding to one stripe group (48 KB) is written to the decompression VOL, and data migration from the decompression VOL to the compression VOL can be performed after waiting for an amount corresponding to multiple stripe groups (96 KB, 480 KB etc.) to be written.

FIG. 17 shows the contents of a volume mapping table 600, and FIG. 18 shows the contents of an address mapping table 650. In the present embodiment, the decompression VOL and the compression VOL are in one-to-one relationship, and the destination of data written to one decompression VOL is restricted to only one predetermined compression VOL. The volume mapping table 600 shows that the area in the decompression VOL specified by VVOL #601 is mapped to an area in the compression VOL specified by LDEV #602. Regarding the contents of the volume mapping table 600, by having the administrator of the storage device 1 designate an identification of the compression VOL (LDEV #) mapped to the identification number of the decompression VOL (VVOL #) using the management device 4, the designated identification numbers are stored in the fields of the VVOL #601 and the LDEV #602 of the volume mapping table 600 by the storage device 1. Thereby, the mapping between the decompression VOL and the compression VOL is set. Moreover, the field of a last write location 603 within the volume mapping table 600 is a field for storing the location in the compression VOL (LBA in the compression VOL) of the data which was migrated last when data was migrated (mapped) from the decompression VOL to the compression VOL. the storage device 1 maintains this information so that it can store data from the LBA subsequent to the LBA in the compression VOL stored in the field of the last write location 603 (that is, realizing append write) when migrating data from the decompression VOL to the compression VOL.

The address mapping table 650 of FIG. 18 is a table for managing that the area in the decompression VOL specified by VVOL #651 and LBA 652 is mapped to an area (sector) in the compression VOL specified by an LDEV #653 and an LBA 654. This table is updated when the storage controller 10 maps the data written in the decompression VOL to the compression VOL. Each row (entry) in the address mapping table 650 shows to which sector of the compression VOL the area corresponding to eight sectors in the decompression VOL is mapped (one sector is a minimum access unit of the storage area when the host computer 3 accesses the decompression VOL, which is normally 512 bytes). Further, the number of disk areas (number of sectors) of the compression VOL mapped to each row (entry) of the address mapping table 650 differs according to the compression state of data, but one sector at minimum and eight sectors at maximum is mapped.

By maintaining and managing the address mapping table 650, when the storage controller 10 receives a read request to the decompression VOL from the host computer 3, it refers to the address mapping table 650, converts the area (address) in the decompression VOL designated by the read request to an address in the compression VOL, reads the access target data in the decompression VOL designated by the read request from the final storage media (SSD 11 or HDD 12) configuring the compression VOL, decompresses the data in the cache memory 26, and returns the decompressed data to the host computer 3 to realize the read processing. The details of this process will be described later.

The decompression VOL and the compression VOL do not necessarily have to be the same size. In the storage device 1, data is stored in the compressed state to the compression VOL, so that the present invention can be realized even if the size of the compression VOL is set smaller than the size of the decompression VOL.

Figure 19:
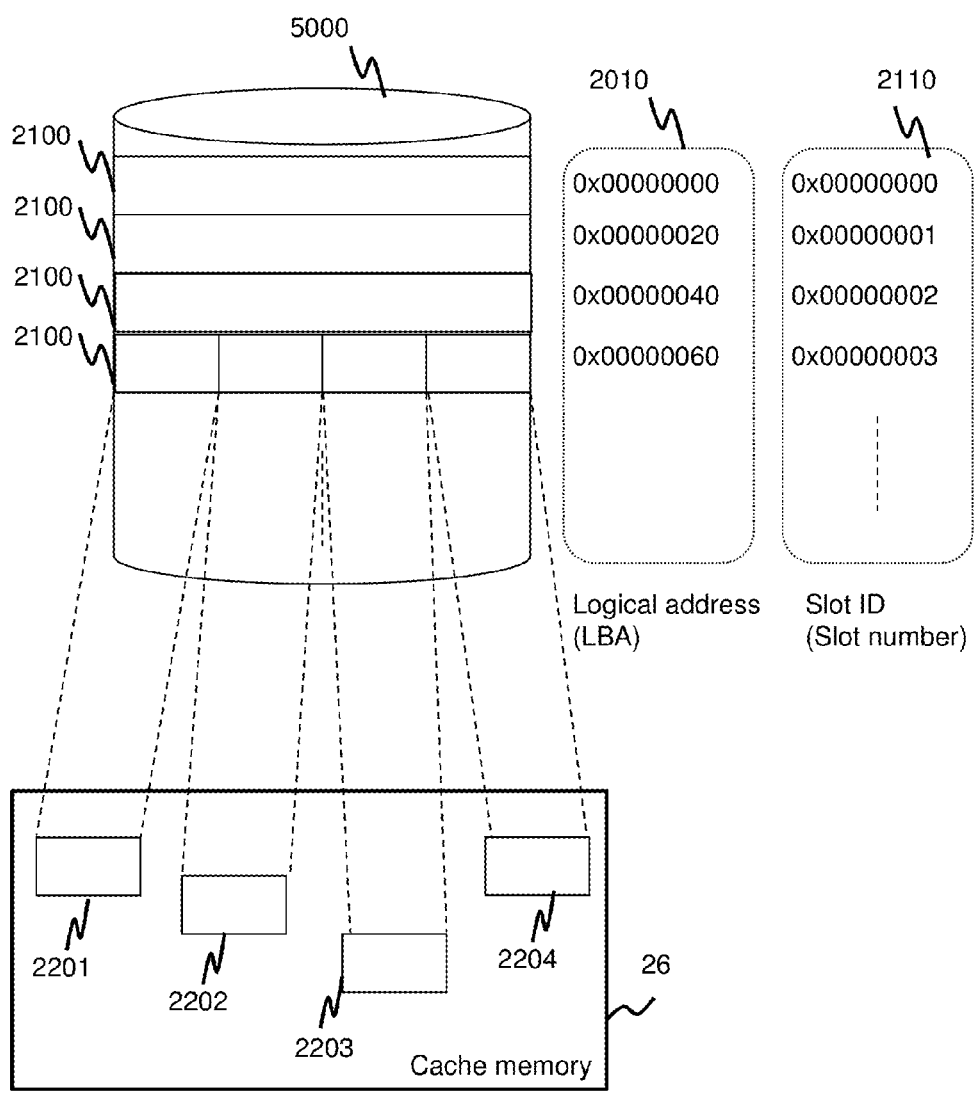
FIG. 19 is a conceptual view of a relationship among volume, slot and cache segment according to the preferred embodiment of the present invention.

Next, the method for managing the cache memory 26 will be described. FIG. 19 is a conceptual diagram illustrating a relationship between volume, slot and cache segment according to the present embodiment. As mentioned earlier, the storage device 1 of the present invention manages two types of volumes, which are a decompression VOL and a compression VOL, wherein the decompression VOL and the compression VOL are managed using a similar data structure. Therefore, in the following description, the data structure of a cache management data used when caching the data in the decompression VOL to the cache memory 26 will mainly be described.

In the preferred embodiment of the present invention, a minimum access unit to a volume is sector (such as 512 bytes), and a logical block address (LBA; which is sometimes referred to as logical address in the present specification) is assigned to each sector of the volume (LBA are shown in element 2010 of FIG. 19). Further according to the storage device 1 of the embodiment of the present invention, exclusive control is performed when accessing the storage area in the volume, and the storage device 1 performs exclusive control in each area called slot 2100. The size of the slot 2100 is 16 KB (that is, 32 sectors) in the present embodiment, but other sizes can also be adopted. A unique identification number is assigned to each slot 2100 in the volume, and the number is called slot ID. Zero is assigned as the slot ID of the slot 2100 at the head of the volume, and sequentially thereafter, slot IDs 1, 2 and so on are assigned to the subsequent slots. In FIG. 19, element 2110 shows the slot ID, and the relationship between the logical block address 2010 and the slot ID 2110 is as shown in FIG. 19. For example, when converting the logical block address designated in the I/O command received from the host computer 3 to a slot ID, the value obtained by dividing the designated logical block address by 32 (number of sectors constituting one slot) becomes the slot ID. Further, when this division is performed, if the remainder is 0, it can be recognized that the logical block address designated in the I/O command is located at the head of the slot (specified by the slot ID), and if the remainder is non-zero value (supposing that this value is R), the remainder R is the information showing that the block specified by the logical block address exists at the (R+1)th position from the head block of the slot (specified by the slot ID) (hereafter, this information R is called a relative address within slot).

Upon storing the data in the volume to the cache memory 26, the processor 21 of the storage controller 10 allocates an area having a given size as cache area among the unused storage areas in the cache memory 26, wherein the cache area is allocated in units of areas called cache segment (or segment) (in FIG. 19, elements 2201, 2202, 2203 and 2204 show cache segments; hereinafter, when collectively referring to cache segments 2201, 2202, 2203 and 2204, they are referred to as "cache segment(s) 2200"). In the preferred embodiment of the present invention, the size of the cache segment 2200 used for managing the data written to the decompression VOL in the cache memory 26 is eight sectors, that is, 4 KB (in uncompressed size), and four cache segments 2201, 2202, 2203 and 2204 are mapped to each slot. FIG. 19 illustrates the concept of having the areas (cache segments 2200) in the cache memory 26 mapped to the slot 2100. The details how the storage device 1 manages this mapping will be described later, but the storage device 1 has a slot control table 110 as information for managing slots (the details of which will be described later; one slot control table 110 exists in each slot 2100), and in the slot control table 110, the information of the cache segments 2200 mapped to the relevant slot (more precisely, pointers to information for managing the cache segments 2200) is stored. The storage device 1 manages the mapping between the slots 2100 and the cache segments 2200 by creating and managing this slot control table 110. In the present embodiment, the size of the cache segment 2200 is set to 4 KB as an example, but sizes other than 4 KB can also be adopted. However, in the cache memory 26 according to the preferred embodiment of the present invention, uncompressed data is compressed in 4-KB units via compression function, and the setting of the size of the cache segment 2200 (in uncompressed state) to 4 KB has an advantage in that the management will not be complicated, so that the 4-KB cache segment size is adopted. Also, the number of the cache segments 2200 mapped to a slot 2100 can be other than four.

The outline of the processing related to the management of the cache area when the host computer 3 accesses (such as reads or writes) an area in a volume 5000 is as follows. The host computer 3 issues an I/O command designating a LUN and an LBA (corresponding to element 2010 in FIG. 19) to the storage device 1. The storage device 1 converts the LBA included in the received I/O command to a set of a slot ID 2110 and a relative address within the slot, and refers to the slot control table 110 specified by the slot ID 2110 obtained by the conversion. Then, based on the information in the slot control table 110, it determines whether a cache segment 2200 has been allocated to the area in the volume designated by the I/O command (area specified by LBA) or not, and if the cache segment 2200 is not allocated, it performs a process to newly allocate a cache segment 2200.

Figure 20:
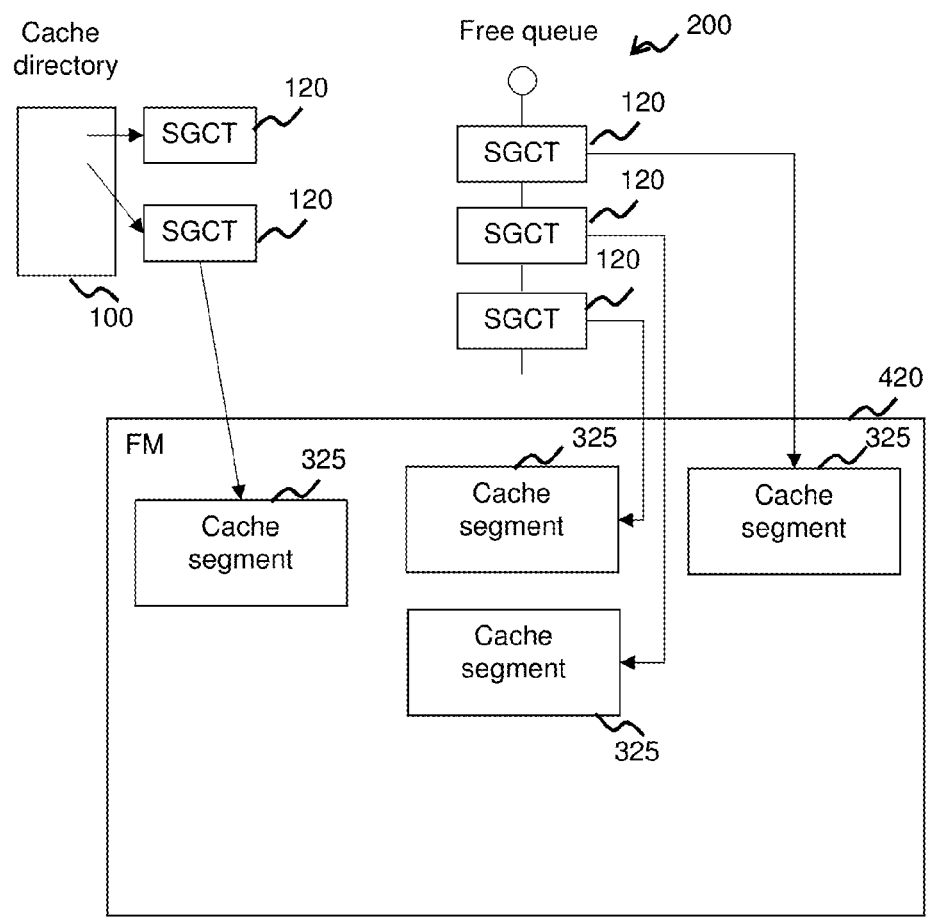
FIG. 20 is a conceptual view of a cache management data structure managed by the storage device.

Next, we will describe the cache management data structure. FIG. 20 is a conceptual diagram of the cache management data structure managed by the storage device 1.

Figure 21:
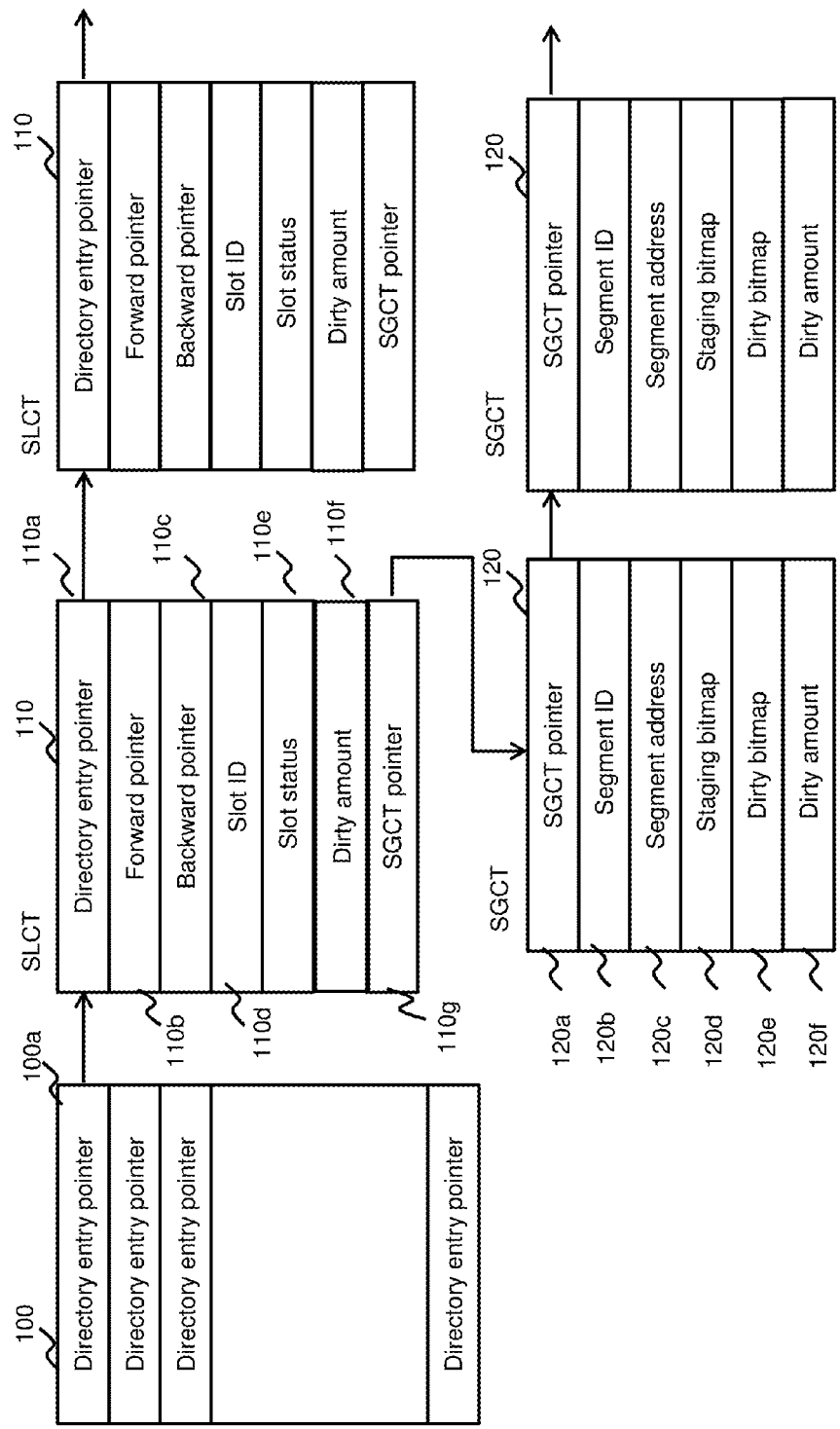
FIG. 21 is a view showing a relationship between cache directory, SLCT and SGCT.
Figure 22:
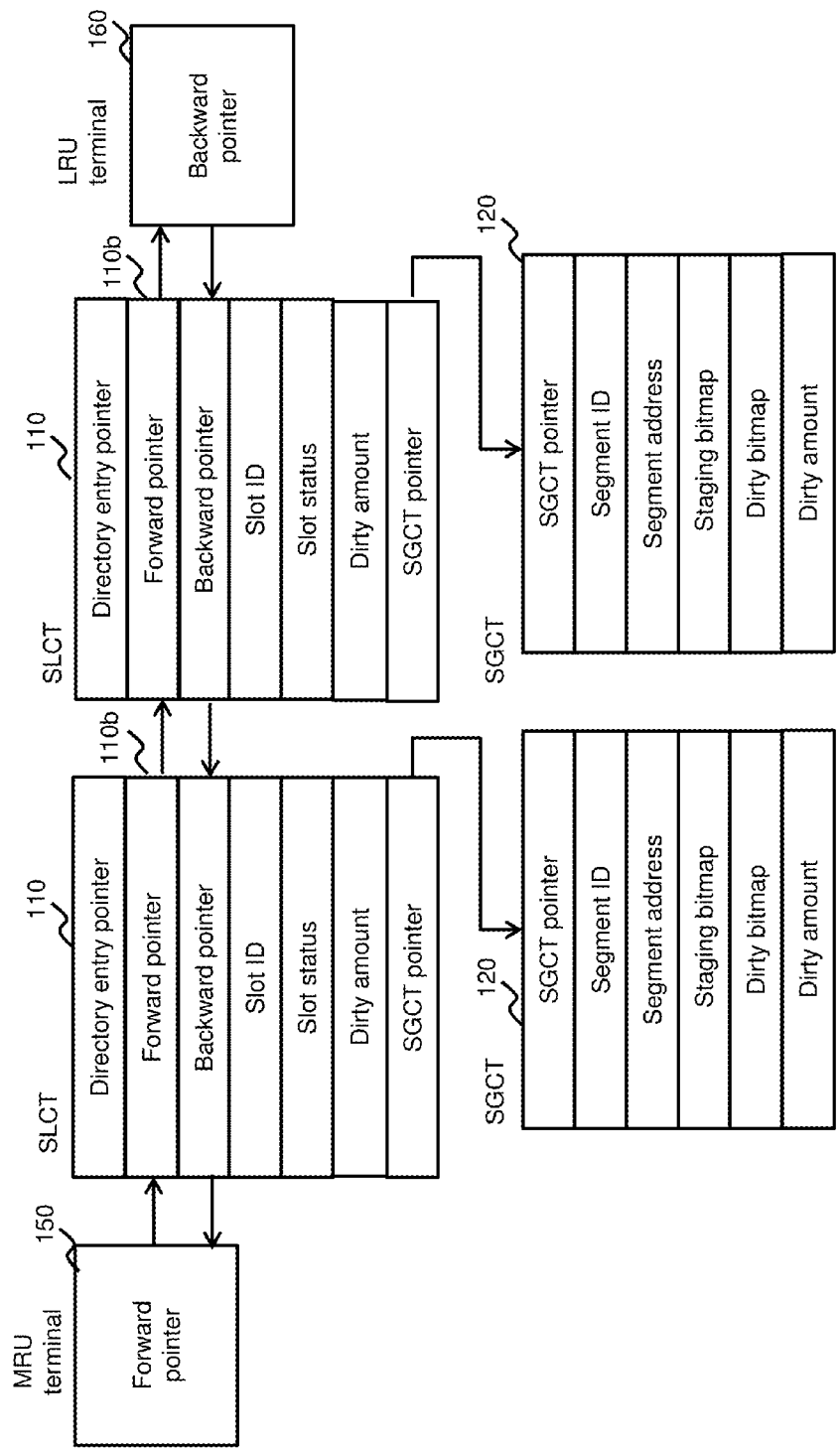
FIG. 22 is a view showing a data structure of a dirty queue or a clean queue.

The cache management data structure includes a cache directory 100 (described in detail in FIG. 21), a free queue 200, and a dirty queue and clean queue (described in detail in FIG. 22). The respective cache segments are managed by a segment control table 120 (SGCT). One SGCT 120 exists in each of the cache segments (4-KB area in uncompressed state) in the LBA 0 space in the cache memory 26.

The cache directory 100 is a data structure managing a mapping between a logical block address (LBA) in the volume and an address in the cache memory (address in LBA 0 space) to which the data in the relevant logical block address is cached, wherein one cache directory 100 exists for one decompression VOL. The cache directory 100 is, for example, a hash table having an LBA (or information derived from LBA, such as a slot ID) in the volume where the cache target data is stored as the key, and it has a pointer for pointing to the SGCT 120 as an entry. The SGCT 120 manages the pointer to a cache segment 325 (address in cache memory 126 [address in LBA 0 space]) corresponding to the SGCT 120. Therefore, by searching the information in the cache directory 100 using the LBA in the volume, the cache segment in which data corresponding to the relevant logical block address is cached can be specified. The detailed configuration of the SGCT 120 will be described later.

The free queue 200 is a control information for managing a free segment in the cache memory 26, that is, a cache segment 325 where no data is stored. According to the present embodiment, the free queue 200 is configured as a bidirectional link list having the SGCT 120 corresponding to the free segment in the cache memory 26 as an entry, but it is not restricted thereto.

The SGCT 120 adopts a state where it is connected to either the cache directory 100 or the free queue 200 according to the state and type of the cache segment corresponding to the SGCT 120. The SGCT 120 corresponding to an unused cache segment 325 is connected to the free queue 200, and when the relevant cache segment 325 is allocated for storing data, it is connected to the cache directory 100.

FIG. 21 is a view showing a relationship between cache directory, SLCT and SGCT.

The cache directory 100 is composed of a set of directory entry pointers 100a. Each directory entry pointer 100a stores a pointer (address information) pointing to a slot control table 110 (SLCT) corresponding to a slot ID. As mentioned earlier, the cache directory 100 is a hash table having the slot ID as the key, and for example, an SLCT 110 of a slot whose result of hash calculation of a slot ID is 3 is pointed to, either directly or indirectly, by a third directory entry pointer 100*a* in the cache directory 100.

An SLCT 110 is a data structure including a directory entry pointer 110*a*, a forward pointer 110*b*, a backward pointer 110*c*, a slot ID 110*d*, a slot status 110*e*, a dirty amount 110*f*, and an SGCT pointer 110*g*. The directory entry pointer 110*a* is a pointer pointing to the SLCT 110 corresponding to the next entry in the hash table. The forward pointer 110*b* is information used when the SLCT 110 is connected to a clean queue or a dirty queue, and points to the previous SLCT 110 in the clean queue or the dirty queue. The backward pointer 110*c* is information used when the SLCT 110 is connected to a clean queue or a dirty queue, and points to the next SLCT 110 in the clean queue or the dirty queue. The slot ID 110*d* is an identification information of a slot (slot ID) corresponding to the SLCT 110. The slot status 110*e* is information showing the status of the slot. A "locked" indicating that the relevant slot is locked and the like can be one of the examples of the state of the slot. The dirty amount 110*f* stores an amount of data (dirty data) not yet reflected to the final storage media (SSD 11 or HDD 12) among the data stored in the cache segments included in the relevant slot. The SGCT pointer 110*g* is a pointer pointing to the SGCT 120 corresponding to the cache segment included in the relevant slot. When a cache segment is not allocated to the relevant slot, the SGCT pointer 110*g* is set to a value showing that the pointer (address) is invalid (such as NULL). Further, if there are multiple cache segments included in the slot, each SGCT 120 is managed as a link list, and the SGCT pointer 110*g* is a pointer pointing to the SGCT 120 corresponding to the cache segment at the head of the link list.

The SGCT 120 includes an SGCT pointer 120*a*, a segment ID 120*b*, a segment address 120*c*, a staging bitmap 120*d*, a dirty bitmap 120*e*, and a dirty amount 120*f*.

The SGCT pointer 120*a* is a pointer pointing to the SGCT 120 corresponding to the next cache segment included in the same slot. The segment ID 120*b* is an identification information of the cache segment, and it is information showing which area in the slot the cache segment is positioned at. In the present embodiment, a maximum of four cache segments are allocated to a slot, so that either value of 0, 1, 2 or 3 is stored in the segment ID 120*b* of each cache segment (the segment ID 120*b* of the cache segment positioned at the head of the slot is set to 0, and as for the subsequent segments, 1, 2 or 3 is assigned sequentially as the segment ID 120*b*; By taking cache segments 2201 through 2204 in FIG. 19 as an example, the segment ID 120*b* of the cache segment 2201 mapped to the head of the slot 2100 is set to 0, and subsequently, the segment ID 120*b* of each of the cache segments 2202, 2203 and 2204 is set to 1, 2 and 3).

The segment address 120*c* is an address of the cache segment mapped to the relevant SGCT 120, that is, an address in the LBA 0 space of the cache memory 26. (The processor 21 of) the storage controller 10 according to the embodiment of the present invention uses an address in the LBA 0 space as the address of each cache segment to manage the cache area (cache segment) storing the data written to the decompression VOL 5000. In other words, each cache segment is managed as existing in the LBA 0 space. Thereby, (the processor 21 of) the storage controller 10 does not have to consider the size of the data stored in a compressed state in the cache memory 26, and can manage the data in the cache memory 26 as if the data in the uncompressed state is stored in the cache memory 26. Further, an address in the LBA 1 space is used to manage the cache area (cache segment) caching the data in the compression VOL 5500.

The staging bitmap 120*d* is a bitmap showing the area where clean data, that is, the same data as the data in the final storage media (SSD 11 or HDD 12), is cached in the cache segment. The bit of the staging bitmap 120*d* corresponding to the area where clean data (data equal to the data stored in the final storage media) is cached is set to ON (1), and the bit corresponding to the area where clean data is not cached is set to OFF (0). The dirty bitmap 120*e* is a bitmap showing the area where dirty data is cached in the cache segment. Similar to the staging bitmap 120*d*, in the dirty bitmap 120*e*, each bit corresponds to the respective areas (sectors) in the cache segment, wherein the bit corresponding the area where dirty data is cached is set to ON (1), and the bit corresponding to the area where dirty data is not cached is set to OFF (0). In the embodiment of the present invention, the staging bitmap 120*d* and the dirty bitmap 120*e* is one bit, respectively. That is, each sector (eight sectors) within one cache segment is managed as being in dirty or clean state, but a configuration can also be adopted where the number of bits of the staging bitmap 120*d* and the dirty bitmap 120*e* is set equal to the number of sectors in one segment (to eight bits).

The amount of data (dirty data) not reflected to the final storage media (SSD 11 or HDD 12) among the data stored in the cache segment mapped to the relevant SGCT 120 is stored in the dirty amount 120*f*. In the example of the cache SLCT and SGCT described above, a structure is adopted where the information of the amount of (dirty) data after compression is managed both in the SLCT 110 and the SGCT 120, and the total amount of dirty data (120*f*) of the SGCTs 120 connected to the relevant SLCT 110 is stored in the SLCT 110. However, it is possible to have the information on the amount of dirty data after compression stored only in each SGCT 120.

FIG. 22 is a view showing a data structure of a dirty queue or a clean queue.

As mentioned earlier, each SLCT 110 is connected to the directory entry pointer 100*a* of the cache directory 100, and may also be connected to the dirty queue or the clean queue depending on the state of the slot corresponding to the SLCT 110. The dirty queue is a queue connecting the SLCT 110 corresponding to the slot including the dirty data. The clean queue is a queue connecting the SLCT 110 corresponding to a slot including only clean data. The dirty queue is used to search dirty data when migrating the data (cache data) in the decompression VOL to the compression VOL, or to destage the dirty data in the compression VOL (write to the final storage media). When allocating a cache segment, if unused cache segments (SGCT) (connected to free queue) does not exist, a cache segment storing only clean data is used instead (cache replace), and the clean queue is used at that time to search cache.

The present embodiment describes the case that the algorithm used for cache replacement or destaging scheduling is LRU (Least Recently Used), but other configuration can also be adopted. The dirty queue and clean queue only differ in that they connect to different SLCTs 110, and the basic configuration of these queues are similar, so that the dirty queue is taken as an example here for description. The dirty queue is configured as a bidirectional link list. That is, the dirty queue connects an SLCT 110 corresponding to the slot including the most recently used dirty data (the slot of the newest last used time) to a forward pointer of an MRU (Most Recently Used) terminal 150, and thereafter, it connects the SLCT 110 of the slot of the next order (slot including the next most recently used dirty data) sequentially to the forward pointer 110b of the SLCT 110, finally connects an LRU terminal 160 to the forward pointer 110b of the last SCLT 110, while connecting the last SCLT 110 to a backward pointer of an LRU terminal 160, and subsequently, connects the SLCT 110 of a slot of a previous order sequentially to the backward pointer 110c of the SLCT 110 of the subsequent order, and connects the SLCT 110 at the first order to the MRU terminal 150. In the dirty queue, the SLCT 110 will be arranged in the order starting from the one having the newest last used time from the MRU terminal 150 side. Similar to the cache directory 100, there is one dirty queue for each decompression VOL. There is one clean queue within the storage controller 10 (more accurately, one clean queue for the decompression VOLs (in other words, for cache memory management in the LBA 0 space) exists, and one clean queue for the compression VOLs (in other words, for cache memory management in the LBA 1 space) exists).

Figure 23:
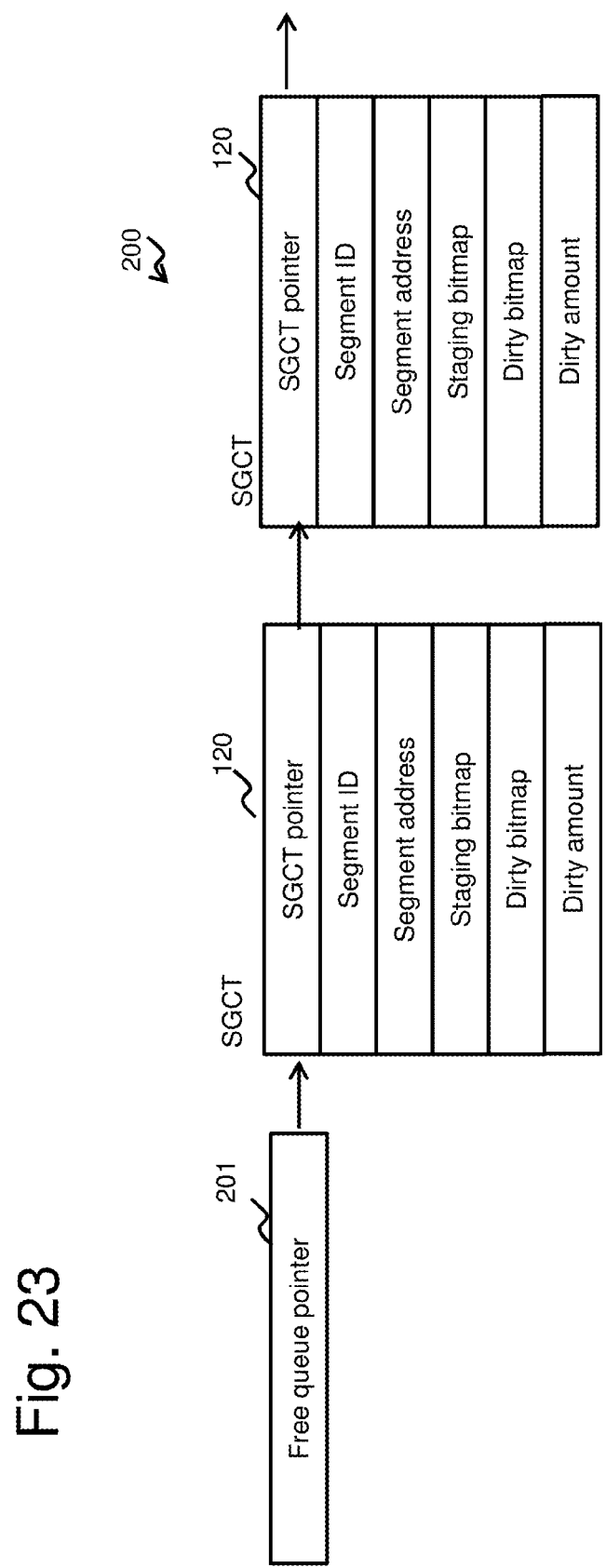
FIG. 23 is a view showing a data structure of a free queue.

Next, the data structure of the free queue 200 will be described with reference to FIG. 23. The free queue 200 is a queue for managing the free (unused) cache segment 325 in the cache memory 26, and it is a link list where the SGCTs 120 of free cache segments are connected via a pointer. One free queue exists within the storage controller 10. A free queue pointer 201 of the free queue 200 points to the head SGCT 120 of the queue. The SGCT pointer 120a of the SGCT 120 points to the SGCT 120 of the next free cache segment.

The above has described the contents of the cache management data for managing the data of the decompression VOL in the cache memory 26, and the cache management data structure for managing the data of the compression VOL in the cache memory 26 has a similar structure. However, according to the embodiment of the present invention, the size of the cache area (cache segment) used for managing the data of the compression VOL in the cache memory 26 uses a different size as the size (4 KB) in the decompression VOL, so that the contents of the information stored in the cache management data structure somewhat differ. Only the major differences will be described below.

In the compression VOL, exclusive control is performed per slot, similar to the decompression VOL, and one or more cache segments are mapped to the slot. However, the size of the cache segment used for managing the cache data of the compression VOL is one sector (512 bytes; which is the compressed size), and the slot size is 16 KB. Therefore, the number of cache segments mapped to one slot is 32, which differs from the case of the decompression VOL. Of course, the present invention is also effective when the slot size is set to a size different from 16 KB, or when the segment size is set to a size other than one sector.

Further, the cache management data structure (cache directory, SLCT, SGCT, free queue, dirty queue and clean queue) for managing the cache data of the decompression VOL has been described with reference to FIGS. 20 through 23, but basically, a cache management data structure similar to the one described with reference to FIGS. 20 through 23 is used for managing the cache data of the compression VOL. The following points are the differences. At first, in cache management of the compression VOL, since 32 segments are mapped to one slot, the maximum number of SGCT connected to one SLCT is 32. Also, a value between 0 and 31 is stored in the segment ID 120b in the SGCT.

Further, in cache management of the compression VOL, the address of LBA 1 space is used to perform cache segment management. Therefore, an address of the LBA 1 space is stored in the segment address 120c in the SGCT 120. Further, in cache management of the decompression VOL, one dirty queue has existed for one decompression VOL, but in cache management of the compression VOL, one dirty queue is defined for one final storage media (SSD 11 or HDD 12). This is because destage processing of dirty data is performed in SSD 11 or HDD 12 units.

In any case, the cache data management structure of the decompression VOL and the cache data management structure of the compression VOL only differ somewhat in the contents of information stored in the SGCT 120 and the number of the dirty queue, so that the data structure for managing the cache data of the compression VOL uses the same structure as that described in FIGS. 20 through 23.

Further, as the difference between the decompression VOL and the compression VOL, the contents or types of data stored in the slots differ. In each slot for the decompression VOL, only the write data from the host computer 3 is stored, but in the slots for the compression VOL, in addition to having compressed data stored, a parity generated via RAID technique from a plurality of slots (slots storing compressed data) is stored in some slots.

Figure 24:
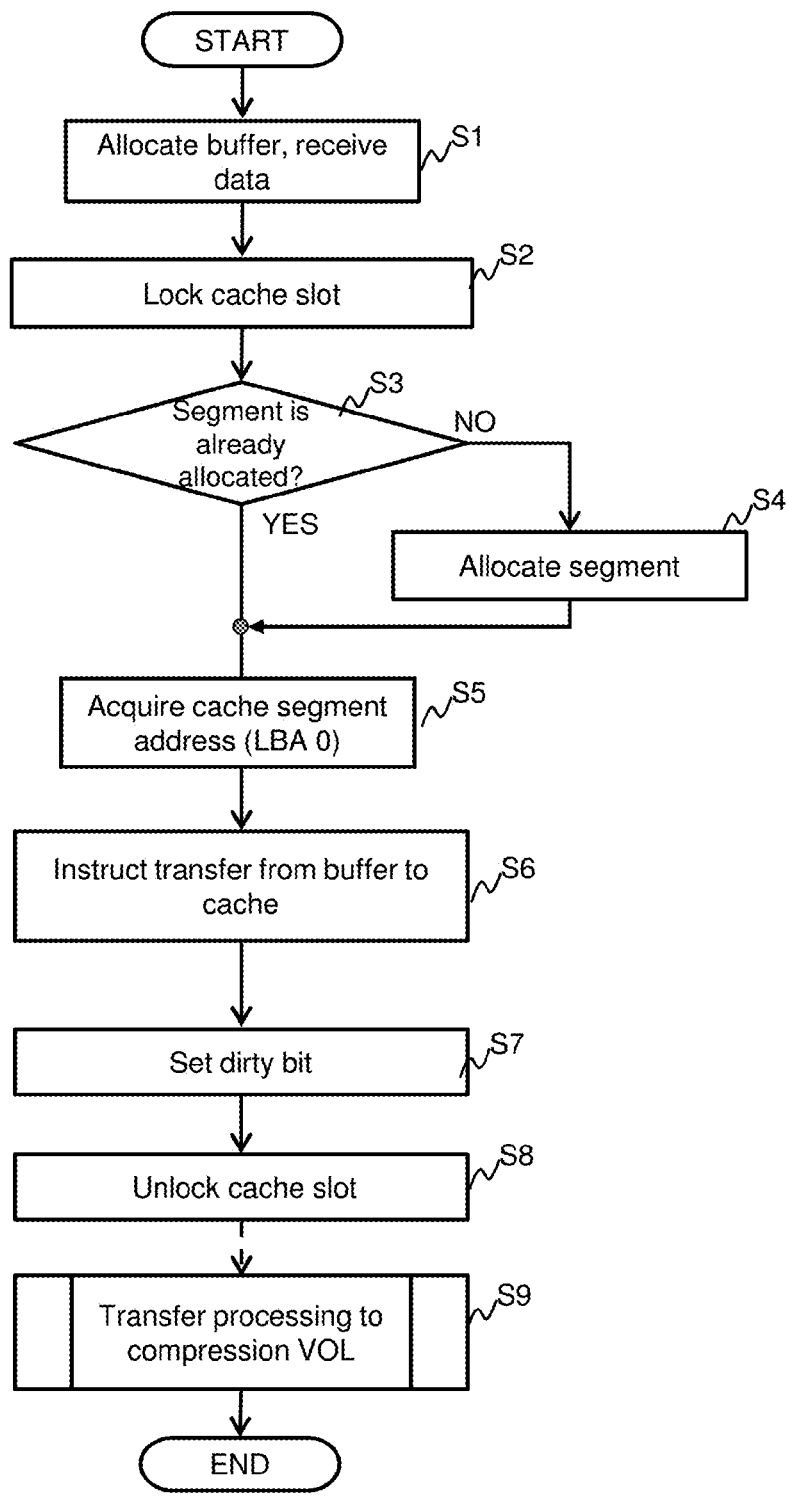
FIG. 24 is a view showing a process flow of storing a write data received from a host computer to a cache memory in a write processing according to the present embodiment.

Next, the data write processing performed in the storage device 1 will be described with reference to FIGS. 24, 25 and 26. In FIG. 24, a process for receiving a write request and write data regarding the decompression VOL 5000 from the host computer 3 and storing the received write data to the cache memory 26 will be described. In the write processing of FIG. 24, we will describe a case where the write address (LBA) designated by the host corresponds to the 4-KB boundary, and that the write data size is 4 KB.

In S1, the storage device 1 receives a write request from the host computer 3 via the host interface 24. The write request includes information for specifying the port of the storage device 1 (information for deriving the port #501 of FIG. 13), the LUN of the decompression VOL, and the LBA of the decompression VOL. The processor 21 of the storage controller 10 allocates a buffer area for temporarily storing the write data to the DRAM 25, receives the write data from the host computer 3, and stores the same in the buffer area (S1).

In S2, the processor 21 specifies the VVOL # of the decompression VOL (information corresponding to the VVOL #503 of FIG. 13) based on the information for specifying the port and the LUN included in the write request received in S1 and the decompression VOL management table 500. Further, the LBA is converted to slot ID. Next, based on the specified VVOL # and the cache directory 100 associated with the decompression VOL being the current write target is selected, and the slot to which the current access target LBA belongs is locked (the SLCT 110 corresponding to the slot to which the current access target LBA belongs is searched for by following the cache directory 100, and information showing "locked" is stored in the slot status 110e of the searched SLCT 110).

In S3, the processor 21 judges whether the cache segment corresponding to the LBA in the decompression VOL (being designated by the write request) is already allocated or not. Specifically, determination is performed by referring to an SGCT pointer 110f within the SLCT 110 having the slot ID 110d obtained by the conversion performed in S2. If the SGCT pointer 110f is an invalid (such as NULL) value, it is determined that the cache segment is not allocated. If a valid value is included in the SGCT pointer 110f, it is determined that at least one cache segment is allocated, so that it is confirmed whether the cache segment is allocated to the position within the slot specified by the relative address within slot by following the SGCT pointer 110f. Specifically, it can be confirmed that a cache segment is allocated by confirming whether there is an SGCT 120 having the same segment ID 120b as the result obtained by "relative address within slot÷8" (integer) (by calculating relative address within slot÷8, an integer between 0 and 3 can be obtained, so that which segment ID from 0 to 3 is assigned to the cache segment to which the relative address within slot corresponds can be recognized). As a result, if the cache segment is already allocated (step S3: Yes), the processor 21 advances the process to step S5. On the other hand, if the cache segment is not allocated (step S3: No), it executes a segment allocation process (step S4), and proceeds to step S5. In the segment allocation process of step S4, an unused cache segment is allocated by acquiring the SGCT 120 connected to the head of the free queue 200. Further, if there is no unused cache segment, that is, if there is no SGCT 120 connected to the free queue 200, the SGCT 120 connected to the SLCT 110 connected to the clean queue is acquired.

In S5 and S6, data transfer is performed from the buffer area to the allocated cache segment. The processor 21 acquires the address of the cache segment (address of the LBA 0 space stored in the segment address 120c of the SGCT 120 corresponding to the allocated segment) is acquired as the transfer destination address (S5). Then, it creates a data transfer (write) command designating the address of the buffer area as the transfer source address and the address acquired in S5 as the transfer destination address, and instructs data transfer by sending the write command to the cache memory 26. After sending the write command to the cache memory 26, it waits for a process complete notice to arrive from the cache memory 26.

When a process complete notice is received from the cache memory 26, the dirty bitmap 120e of the SGCT 120 corresponding to the write target cache segment is set to ON to record that the write target cache segment has become a dirty state, and the SLCT 110 of the slot to which the write target cache segment belongs is connected to the dirty queue (S7). Further, since the size information after compression of data written to the cache memory 26 is included in the notice of completion of the write command processing received from the cache memory 26, the received size information is stored in the dirty amount 120f of the SGCT 120, and the relevant size information received from the cache memory 26 is added to the dirty amount 110f of the SLCT 110. Incidentally, if the amount of write data subjected to the write request from the host computer 3 is other than 4 KB, that is, a size exceeding 4 KB, the information on data amount (after compression) of each cache segment cannot be obtained only by the notice of completion of the write command process received from the cache memory 26, so that a compressed data size acquisition command 1110 is issued, the information on the compressed data amount per cache segment is acquired, and the information on the compressed data amount is reflected to the dirty amount 120f of the SGCT 120 and the dirty amount 110f of the SLCT 110. Thereafter, the lock of the cache slot is released (S8), a notice that write processing has been completed is sent to the host computer 3, and the process is ended.

After S8 is ended, the data transfer (migration) processing to the compression VOL of S9 may be performed, but this process is not indispensable, and the data transfer processing to the compression VOL is performed when the state of the cache memory 26 satisfies a predetermined condition. This process will be described below.

Next, with reference to FIG. 25, the data transfer processing to the compression VOL will be described with reference to FIG. 25. The data transfer processing is a processing corresponding to S9 of FIG. 24, that is, a processing performed immediately after the data write processing from the host computer 3, but the timing for the data transfer processing to the compression VOL is not restricted to immediately after the data write processing. For example, the processing can also be executed when the state of the cache memory 26 satisfies a given condition by monitoring the state of the cache memory 26 periodically. Further, the data transfer processing to the compression VOL is performed per decompression VOL.

In S21, the processor 21 determines whether a given condition has been satisfied or not. In one example, regarding a certain decompression VOL, the dirty amount 110f included in the SLCT 110 of each slot connected to the cache directory 100 of the relevant decompression VOL (or the dirty amount 120f of the SGCT 120) is checked to determine whether the amount of dirty data stored in the cache memory 26 has exceeded the amount required to generate a RAID parity. Here, the amount required to generate a RAID parity is, as mentioned earlier, the same or greater amount of data as the set of slots constituting the stripe group. Taking the RAID configuration of FIG. 16 as an example, if an amount corresponding to three slots within one decompression VOL, that is, an amount of dirty data of 16 KB×3=48 KB exists in the cache memory 26, it is determined that parity can be generated. If this condition is satisfied (S21: Yes), the procedure advances to S22, but if this condition is not satisfied (S21: No), the procedure advances to S31.

In S22, a slot is selected as the target of the transfer processing, and the selected slot is locked. Various methods can be adopted to select a slot. For example, the dirty amount 110f of each SLCT 110 connected to the dirty queue is referred to, and slots (SLCTs) are selected sequentially from those having greater dirty amounts 110f until the total dirty amount 110f of the selected slots (SLCTs) reaches a predetermined amount (48 KB, or multiples of 48 KB). As another example, the slots can be selected based on the LRU (Least Recently Used) algorithm. The following description assumes that slots are selected so that the total dirty amount (of compressed data) becomes equal to one stripe group (48 KB) in the process of S22, but the present invention is not restricted thereto. At the same time, among the SLCTs 110 of the slots selected here and the SGCT 120 connected to the SLCT 110, by referring to the contents of the SGCT 120 whose dirty bitmap is set to ON, the segment address 120c (that is, the LBA 0 of the cache memory 26) of the cache segment being the target of the transfer processing is specified. Further, based on the slot ID 110d of the SLCT corresponding to the cache segment being the target of performing transfer processing and the segment ID 120b of the SGCT 120, the LBA of the area of the decompression VOL corresponding to the cache segment being the target of transfer processing is computed.

Next, in S23, disk area allocation of the compression VOL is performed. At first, by referring to the volume mapping table 600, a compression VOL 602 corresponding to a decompression VOL 601 being the current processing target and the last write location 603 are selected. Then, an area corresponding to one stripe group from the LBA subsequent to the last write location 603 of the compression VOL 602 is selected. Next, the location of the compression VOL to which the respective areas (areas storing dirty data within the slot selected in S22) of the current processing target decompression VOL should be mapped is determined, and the determined contents are stored in the address mapping table 650.

In S24, the slots corresponding to one stripe group selected in S23 and the parity slot corresponding to this stripe group are locked, and segments are allocated to each slot. This process is similar to S3. By this process, cache segments (or addresses thereof, in other words, LBA 1) corresponding to the data slot and parity slot corresponding to the stripe group selected in S23 is determined.

In S25, data transfer is performed, that is, the address (LBA 0) in the cache memory 26 of the dirty data in the decompression VOL selected in S22 is mapped to the address (LBA 1) in the cache memory 26 corresponding to the area of the stripe group in the compression VOL determined in S24. Since the LBA of the compression VOL to which the LBA of each area in the decompression VOL should be mapped is determined in the process of S23, mapping is performed based on the processing result of S23. The processor 21 issues LBA 1 mapping command(s) to the cache memory 26, and maps the address(es) (LBA 0) in the cache memory 26 of the dirty data in the decompression VOL to the address(es) (LBA 1) in the cache memory 26 corresponding to the area of one stripe group of the compression VOL. After issuing the LBA 1 mapping command, the processor 21 waits for a response of processing complete from the cache memory 26.

When the procedure receives a processing complete response from the cache memory 26, it advances to S26, and sets the cache segment mapped to the slot of the compression VOL allocated in S24 to a dirty state. Specifically, a dirty bit 120e of the SGCT 120 corresponding to each cache segment is set to ON, and the SLCT 110 is connected to the dirty queue. Since the dirty queue of the compression VOL exists in each final storage media, when connecting the SLCT 110 to the dirty queue, the final storage media to which the slot corresponding to the SLCT 110 is mapped is specified. For example, as shown in FIG. 16, each slot of the compression VOL is mapped statically to a predetermined location of any one of the final storage media of the RAID group mapped to the compression VOL, and by computing the conversion of the logical volume address and the address of the physical disk (the SSD 11 or the HDD 12 being the final storage media) performed in a conventional storage device, the final storage media to which each slot of the compression VOL is mapped can be specified easily. Then, the SLCT 110 is connected to the dirty queue corresponding to the specified final storage media.

Next, in S27, the cache segment on the decompression VOL side is cancelled. In this process, the dirty bit 120e of the SGCT corresponding to the cache segment on the decompression VOL side is set to OFF, and the SGCT 120 is separated from the SLCT 110. Thereafter, a mapping release command designating the segment address 120c of the SGCT 120 separated from the SLCT 110 is issued to the cache memory 26, and the mapping between LBA 0 and PBA is released in the cache memory 26. Thereafter, the SGCT 120 is reconnected to a free queue 201.

In S28, parity generation of the compression VOL is performed. The processor 21 issues a full-stripe parity generation command designating the segment address (LBA 1) of the cache segment allocated to the data slot in S24 and the cache segment address (LBA 1) allocated to the parity slot to the cache memory 26. The cache memory 26 having received this command generates a parity to the cache segment allocated to the parity slot. When parity generation is completed, the cache memory 26 sends a processing complete notice to the processor 21. When this processing complete notice is received, the processor 21 sets the cache segment of the parity slot to a dirty state. This process is similar to S26.

In S29, the lock of the slots of the compression VOL and the decompression VOL is released. Further, the last write location 603 of the volume mapping table 600 is updated. For example, when data corresponding to one stripe group is transferred to the compression VOL in the processing of S22 through S28, the number of sectors corresponding to the size of the slots configuring a stripe group and the parity slot corresponding to the stripe group (if one slot is 16 KB in a 3D+1P RAID configuration, the number of sectors is 64 KB, that is, 128 sectors) is added to the information in the last write location 603.

In S31, it is determined whether transfer processing (S21 through S29) has been performed for all decompression VOLs, and if transfer processing has been performed to all decompression VOLs (S31: Yes), the processing is completed, but if a decompression VOL not yet subjected to transfer processing remains (S31: Yes), the procedure returns to S21 to perform the processes of S21 through S29 for the remaining decompression VOLs.

As another embodiment, conditions other than the example described above can be used as the given condition of S21. For example, a condition can be set so that if it is determined that a request to contiguously write data having a given size or greater has arrived successively from the host computer 3 to the decompression VOL (that is, when a sequential write is request), data transfer processing to the compression VOL is performed when data is written to the cache segment positioned at the end of the slot of the decompression VOL.

Further, it is necessary to destage the dirty data of the compression VOL, which can be performed at an arbitrary timing. For example, the process can be executed when the cache memory 26 usage exceeds a given threshold, or it can be executed periodically (such as once every ten minutes). The destage processing itself is similar to the processing performed in a conventional storage device, so that only the outline thereof will be described with reference to FIG. 26.

At first, in S31, the processor 21 selects a dirty queue among the dirty queues provided for each final storage media. Next, in S32, the processor 21 determines whether a slot (SLCT 110) is connected to the dirty queue selected in S31. If a slot is not connected, the procedure advances to S37, but if a slot is connected, it advances to S33.

In S33, the processor 21 selects a slot connected to the dirty queue as the current destage target slot, and locks the relevant slot. If a plurality of slots are connected to the dirty queue, various well-known techniques can be applied as the method for selecting the slot and for determining the number of slots to be selected, but in order to simplify the description, it is assumed that one SLCT 110 designated by the LRU terminal 160 is selected. Of course, methods can be adopted such as selecting a given number (fixed number) of slots connected to the dirty queue, selecting a plurality of slots adjacent (in the final storage media) to the slot of the SLCT 110 designated by the LRU terminal 160, or a method for selecting all slots connected to the dirty queue.

In S34, the processor 21 converts the slot ID 110d of the destage target slot, that is, the slot (SLCT 110) selected in S33, to an address of the final storage media. This address conversion is a well-known art, as mentioned earlier, so that the description of the conversion method will be omitted.

In S35, the processor 21 writes the data stored in the cache segment belonging to the destage target slot (SLCT 110) to the final storage media. At first, the processor 21 allocates an area in the DRAM 25 as a buffer area, and using the read command of the cache memory 26 described earlier, reads data from the cache memory 26 to the buffer area. Then, the data read to the buffer area is written to the address of the final storage media (SSD 11 or HDD 12) computed in the conversion processing of S34. As another embodiment, it is possible to have the LBA 1 address of the cache memory 26 directly designated as the write source data address in the write command (SCSI write command) issued to the final storage media (SSD 11 or HDD 12), and in that case, there is no need to read the data from the cache memory 26 temporarily to the DRAM 25.

In S36, the destage target slot is connected to the clean queue, and the lock of the slot is released. Simultaneously, the dirty amount 110f of the destage target slot (SLCT 110) is set to 0, and as for all SGCTs 120 connected to the relevant SLCT 110, the dirty bitmap 120e is set to OFF, the staging bitmap 120d is set to ON, and the dirty amount 120f is set to 0.

Thereafter, whether an unprocessed dirty queue exists or not is determined (S37), and if an unprocessed dirty queue remains (S37: Yes), the procedure returns to S31. When the processes of S31 through S36 are performed for all dirty queues, the destage processing is ended.

The above is the data write processing executed by the storage device 1 according to the preferred embodiment of the present invention. As can be seen from this process flow, all the data written from the host computer 3 to the decompression VOL is appended to the compression VOL. Therefore, the data before update written to the compression VOL is left remaining in the compression VOL, even though it will not be accessed from the host computer 3 again. Since new data cannot be written to the area where data before update is stored, it will meaninglessly consume the storage area of the compression VOL. In order to solve such problem, it is necessary to perform a process to delete non-accessed data periodically from the compression VOL, and to leave only accessed data (specifically, leave only the area in the compression VOL mapped to the LBA of the decompression VOL managed by the address mapping table 650), which is so-called garbage collection. This process can be achieved by utilizing a process adopted in a storage media performing append process when writing data, such as a flash memory and the like.

Figure 27:
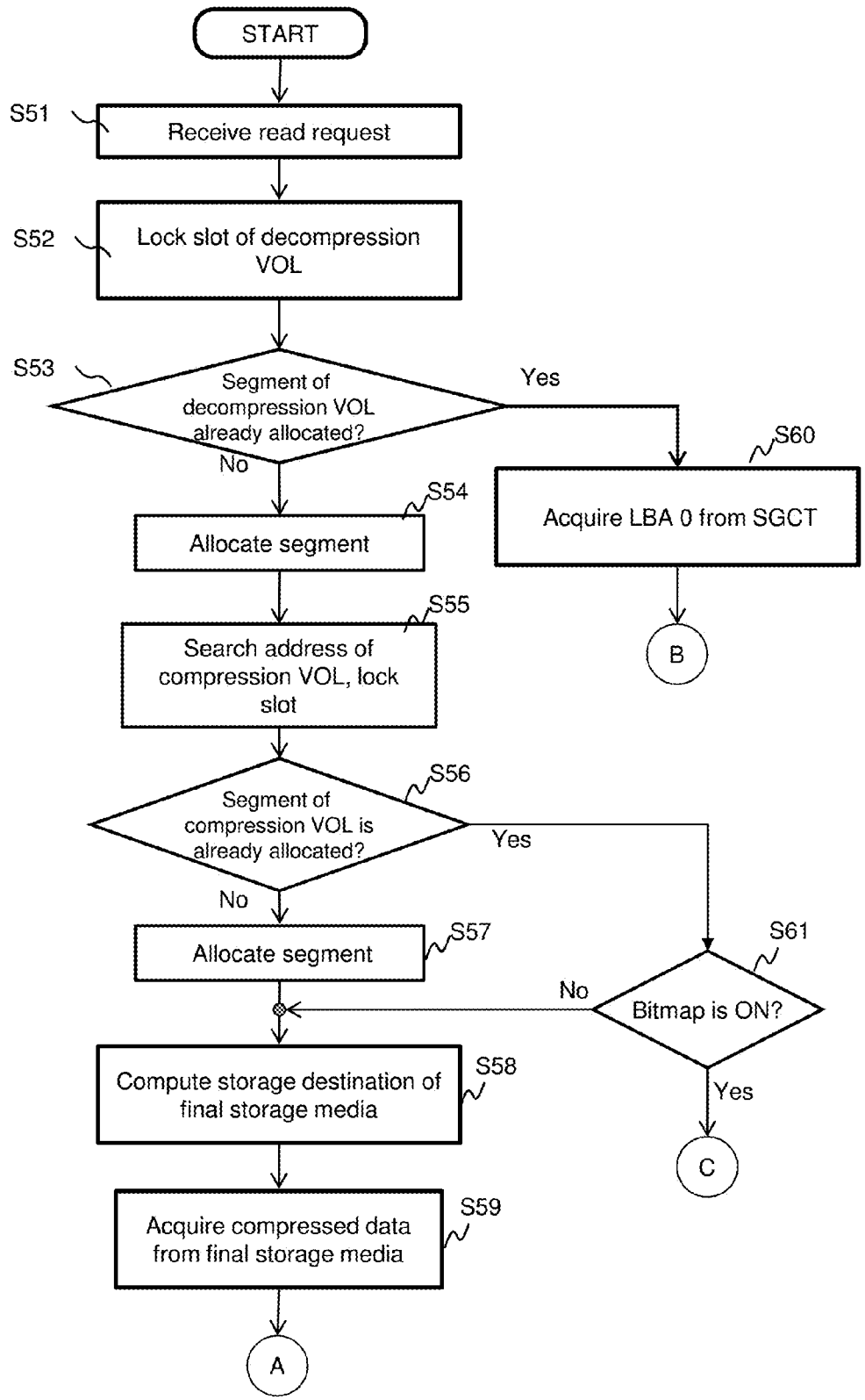
FIG. 27 is a view showing a flow of processing when a read request to a volume (decompression VOL) is received from a host computer.
Figure 28:
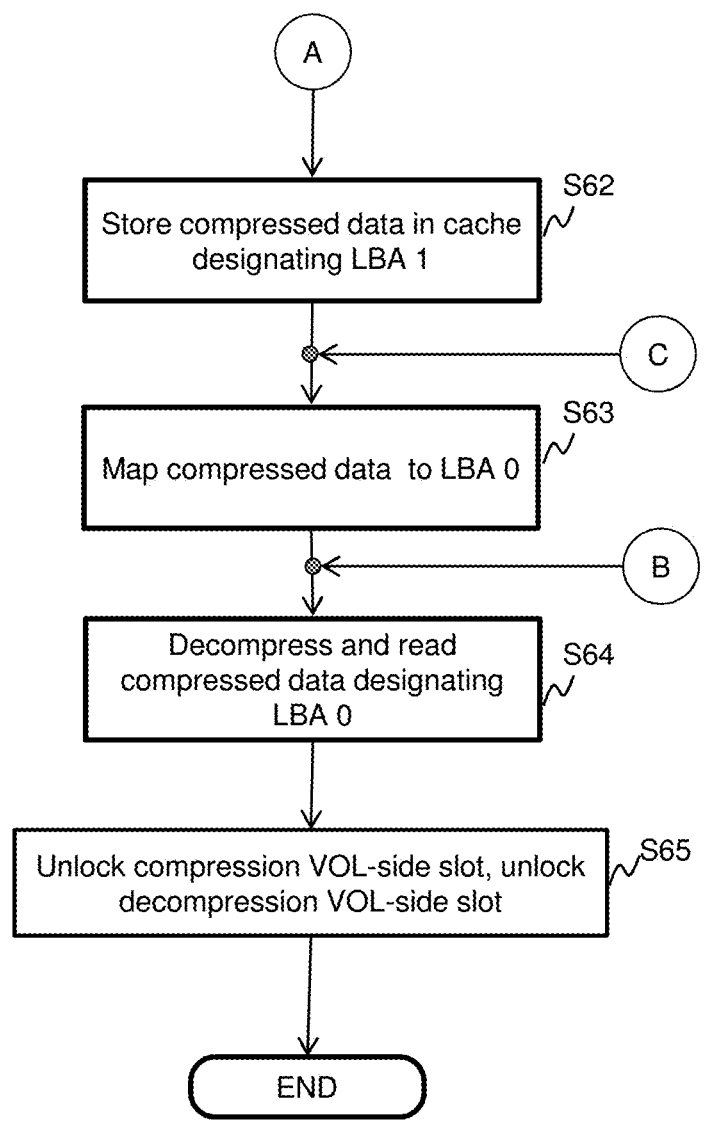
FIG. 28 is a view showing a flow of processing when a read request to a volume (decompression VOL) is received from a host computer.

Next, with reference to FIGS. 27 and 28, the flow of the process performed when a read request to a volume (decompression VOL) has been received from the host computer 3 will be described. In the following description, and example is illustrated where the access address range (head address and end address) of the volume designated by the read request corresponds to the 4-KB boundary. Further, the read data length is assumed to be 4 KB.

In S51, the storage controller 10 receives a read request (command) from the host computer 3. The read request includes information for specifying a port of the storage device 1 (information capable of deriving the port #501 of FIG. 13), the LUN of the decompression VOL, the LBA of the decompression VOL, and read data length.

In S52, a process similar to S2 in FIG. 24 is performed. Based on the information for specifying the port received in S51 and the LUN, and the decompression VOL management table 500, the VVOL # of the decompression VOL (information corresponding to VVOL #503 in FIG. 13) is specified. Further, the LBA is converted to a slot ID. Next, the cache directory 100 mapped to the current read target decompression VOL is selected based on the specified VVOL #, and the slot to which the current access target LBA belongs is locked.

In S53, the processor 21 determines whether a cache segment corresponding to the LBA of the decompression VOL is already allocated or not. This determination is a process similar to the write processing of S3. If a segment is not allocated, the procedure advances to S54, and performs segment allocation in S54. The process of S54 is similar to S4.

In S55, the LBA of the compression VOL corresponding to the read target LBA of the decompression VOL is identified by referring to the address mapping table 650. Then, the specified LBA is converted to a slot ID, the SLCT 110 of the slot corresponding to the LBA of the compression VOL is found by following a directory entry 100 of the compression VOL, and the slot is locked.

In S56, the processor 21 determines whether the cache segment corresponding to the LBA of the compression VOL is already allocated or not, and if the cache segment is not allocated, it performs segment allocation (S57). This process is similar to S53 and S54. When a cache segment is already allocated, the procedure advances to S61.

In S58, the LBA of the compression VOL is converted to the address of the final storage media (SSD 11 or HDD 12). Since the respective areas (sectors) in the compression VOL is mapped to the sectors in the final storage media based on a given rule, the location of the final storage media to which each storage area in the compression VOL is mapped can be computed using the LBA of the compression VOL. Since this process is similar to the process that a conventional storage device storing data using the RAID technique does in reading or writing data, detailed description is omitted.

In S59, the processor 21 allocates an area for temporarily storing the read data in the DRAM 25. Next, it reads the compressed data by issuing a read command designating the address of the final storage area computed in S58 to the final storage media (SSD 11 or HDD 12), and transfers to the DRAM 25.

When it is determined in S53 that a segment has already been allocated, then in S60, the segment address 120c (in which LBA 0 is stored) in the SGCT 120 of the cache segment corresponding to the LBA in the compression VOL is referred to, and the LBA 0 is acquired.

When it is determined that a segment is already allocated in S56, the staging bitmap 120d and the dirty bitmap 120e of the SGCT 120 corresponding to the relevant segment is referred to in S61, and whether any of the bits is ON or not is judged. If any of the bits is ON (S61: Yes), the procedure advances to S63, but if all bits are OFF (S61: No), the procedure advances to S58.

In S62, in order to transfer the data transferred to the DRAM 25 in S59 to the cache memory 26, the processor 21 performs data transfer to the cache memory 26 by issuing a data transfer command designating the address of the DRAM 25 as the transfer source address and the segment address of the cache memory 26 as the transfer destination address to the cache memory 26. Regarding the information on the transfer destination address in the cache memory 26, since LBA 1 is stored in the segment address 120c of the SGCT 120 corresponding to the cache segment allocated in S57 (if it is determined in S56 that a segment is already allocated, the already-allocated segment), this address is the transfer destination address. As a different example of S59 and S62, it is possible to store the read data from the final storage media directly into the area designated by the LBA 1 address of the cache memory 26 without passing the DRAM 25.

In S63, a process to map the address in the LBA 0 space to the area in the cache memory where data was stored in S62 is performed to enable the compressed data stored in the cache memory 26 to be transmitted to the host computer 3 as uncompressed data (decompressed data). The processor 21 issues an LBA 0 mapping command to the cache memory 26, and maps LBA 1 storing the compressed data in the cache memory 26 (segment address 120c of the SGCT 120 used in S62) to a segment address (LBA 0) of the cache segment allocated in S54.

In S64, the processor 21 reads decompressed data from the cache memory 26 by issuing a read command designating the LBA 0 mapped to LBA 1 in S62 or the LBA 0 acquired in S60 to the cache memory, and transfers the same to the host computer 3.

Lastly, in S65, the lock of the slots of the decompression VOL and the compression VOL is released, but prior thereto, whether the SLCT 110 of the decompression VOL (the SLCT 110 of the slot allocated in S52) and the SLCT 110 of the compression VOL (the SLCT 110 of the slot allocated in S55) are connected to the clean queue or not is confirmed, and if they are not connected to the clean queue, they are connected to the clean queue. Then, the staging bitmap 120d of the SGCT 120 connected to each SLCT 110 is set to ON. Thereafter, the lock of each slot is released (the value of the slot status 110e is set to 0), and the read processing is ended.

In the above, an example has been described of a case where the access address range of the volume designated by the read request corresponds to the 4 KB boundary, but if the access address range does not correspond to the 4-KB boundary, such as when a data read request of a size smaller than 4 KB has arrived, the data in the 4-KB area (in the uncompressed state) should be read from the final storage media and stored in the cache memory 26, and only the data within the range requested from the host computer 3 should be selected and transmitted to the host computer 3. Furthermore, an example has been described where the access address range of the volume designated by the write request corresponds to the 4-KB boundary, but if the access address range of the write request does not correspond to the 4-KB boundary, such as when a data write request of a size smaller than 4 KB has arrived, the data in the 4-KB area (in the uncompressed state) including the relevant write access address should be temporarily read from the final storage media to the cache memory 26, and the write data should be overwritten to the read data in the cache memory 26. In that case, if the storage media constituting the cache memory 26 is a flash memory, overwrite cannot be performed, but overwrite of the data in the cache memory 26 can seemingly be achieved by performing an overwrite processing adopted in well-known flash memories, that is, merging the data read from the final storage media and the write data on a buffer 416, and performing a process to write the same to an unwritten (flash memory) page, so that the detailed description of this process will not be described here.

<Modified Example 1>

In the preferred embodiment described above, a configuration has been illustrated where the compression VOL is mapped statically to one RAID group, and the relationship between the compression VOL address and the address of respective storage media configuring the RAID group is also static. However, the compression VOL of the present invention can utilize various volumes provided in a conventional storage device. Hereafter, as one example, an example is described where a virtual volume created by using a so-called thin provisioning technique disclosed for example in US Patent Application Publication 2013/0036250 or US Patent Application Publication 2010/0205390 is used as a compression VOL of the present invention.

In the initial state, a virtual volume (hereinafter, this virtual volume is called [HVOL]) created via thin provisioning technique does not have a specific storage area allocated to each area of the HVOL. When the storage device receives an access request designating a location (LBA) in the HVOL, it confirms whether a storage area is allocated to the relevant location, and if an area is not allocated, a storage area is allocated to that location.

Figure 29:
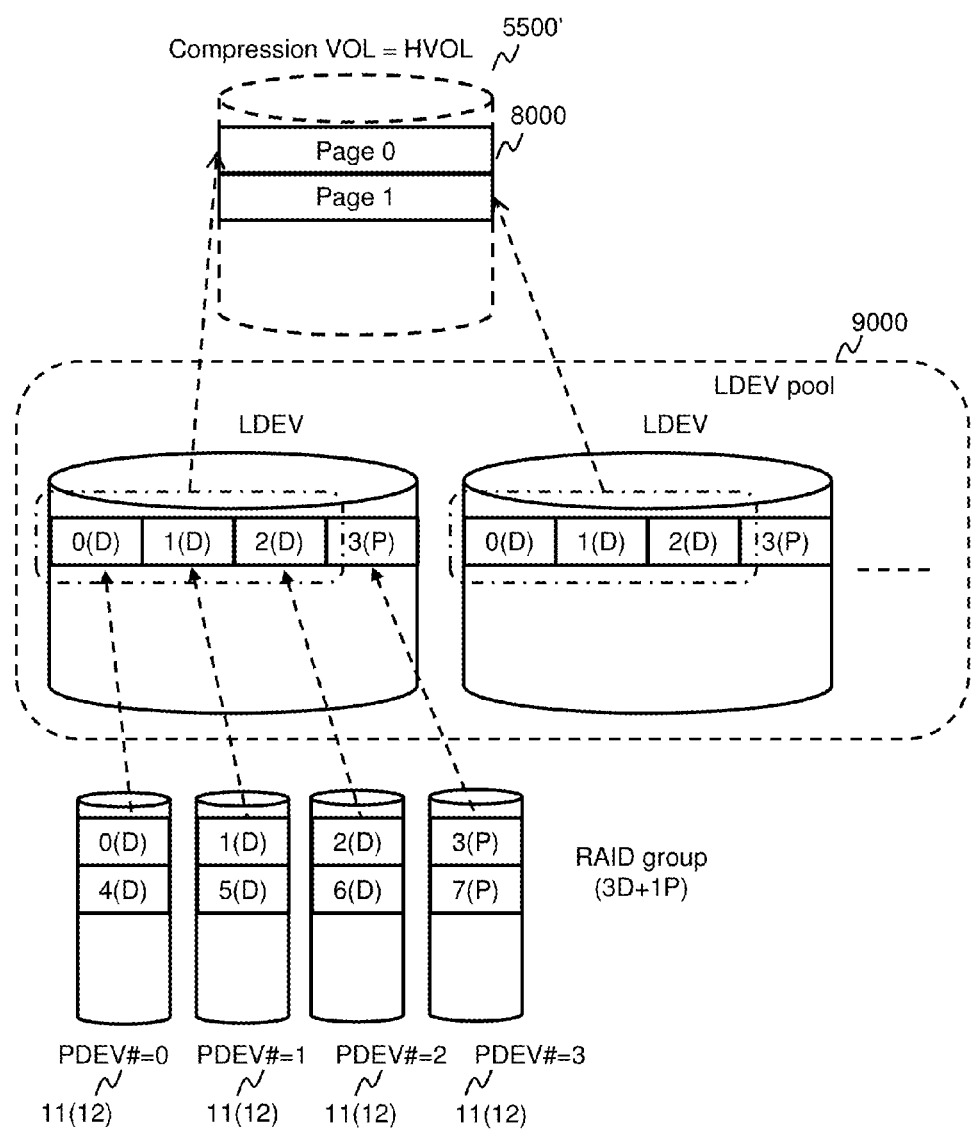
FIG. 29 is a conceptual view showing a relationship among compression VOL, logical volume (LDEV) and final storage media (PDEV) managed by a storage device according to Modified Example 1 of the present invention.

With reference to FIG. 29, the relationship among compression VOL, logical volume (LDEV) and final storage media (PDEV) managed in the storage device 1 according to the Modified Example 1 of the present invention will be described. In the storage device 1 according to the Modified Example 1 of the present invention, an HVOL is used as a compression VOL 5500' according to the preferred embodiment described above. Further, the storage device 1 creates a logical volume (hereinafter referred to as "LDEV") composed of a plurality of final storage media 11 (12) in addition to HVOL. The LDEV is similar to the compression VOL 5500 according to the preferred embodiment described above, wherein one LDEV is configured by one RAID group.

The storage device 1 of Modified Example 1, when data is migrated from the decompression VOL 5000 (not shown in FIG. 29) to the compression VOL 5500' (HVOL), an unused area in the LDEV is allocated to the area in the HVOL where data migration is performed. The storage device 1 divides the storage space in the HVOL into a plurality of fixed size areas, and these fixed size areas are called "pages". Each page has a unique identification number called "page ID" assigned thereto, and the page ID of a page at the head of the HVOL is page 0. Thereafter, page 1, page 2 and so on are assigned to the subsequent pages in order. The storage device 1 according to Modified Example 1 manages the page based on the assumption that the size of a page is equal to the size of a stripe group, but the size of the page is not restricted to the size of the stripe group, and other sizes can be adopted. For example, a configuration can be adopted where the size of one page is equal to a size of multiple stripe groups, or greater.

Further, in order to manage the area in the LDEV allocatable to the page in the HVOL, a concept called LDEV pool 9000 is defined in the storage device 1. When the storage device 1 allocates a storage area to a page in the HVOL, it selects and allocates the storage area corresponding to one page from the area in the LDEV existing in the LDEV pool 9000.

Since the storage area in the LDEV is allocated to the HVOL only after the writing of data from the host computer 3 to the decompression VOL is started and data is migrated to the compression VOL (HVOL), the total capacity (capacity excluding the area storing the parity) of the area storing the data in the LDEV can be smaller than the total capacity of HVOLs at least in the initial state. In other words, the total capacity of the final storage media constituting the LDEV can be smaller than the total capacity of all HVOLs. At the point of time when the storage area (of the LDEV) allocated to the HVOLs is increased and the unused LDEV area is reduced, an operation should be performed to add a final storage media to the storage device 1, define the LDEV from the added final storage media, and add the defined LDEV to the LDEV pool 9000. Therefore, by using an HVOL created via thin provisioning technique for the compression VOL, it becomes possible to even further save the capacity of the final storage media.

Further, compared to the case where one LDEV pool is used by one HVOL, the sharing of an LDEV pool by multiple HVOLs enables effective use of the shared LDEV pool. In further detail, the number of pages requiring allocation of storage areas differs among multiple HVOLs since compressed data is stored, but by sharing an LDEV pool, even if there is an HVOL having a high compression rate (having small number of pages requiring allocation of storage areas), the storage area can be allocated to other HVOLs sharing the LDEV, so that the shared LDEV pool can be used efficiently.

Figure 30:
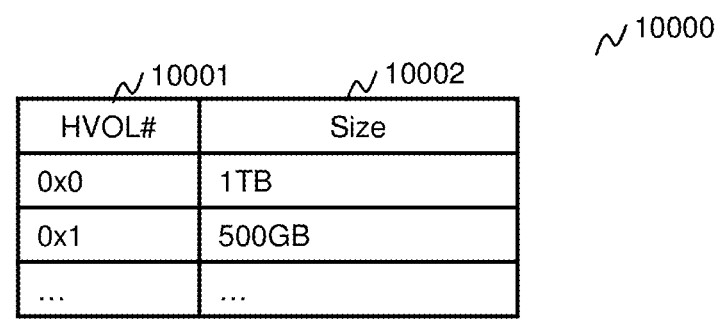

FIG. 30 illustrates an example of an HVOL management information 10000, which is information used by the storage device 1 for managing the HVOL. Each row (entry) of the HVOL management information 10000 is configured of an HVOL #10001 and a size 10002. The HVOL #10001 shows an identification number of HVOL, and the size 10002 represents a size of the HVOL specified by the HVOL #10001.

FIG. 31 illustrates an example of a page mapping table 10010, which is information that the storage device 1 uses to manage the allocation status of storage areas allocated to pages in each HVOL. Each row (entry) of the page mapping table 10000 includes entries of an HVOL #10001, a page ID (P-ID) 10002, an LDEV #10003, and a slot #10004, and it shows that an area corresponding to one stripe group having the slot in the LDEV specified by the LDEV #10003 and the slot #10004 as the head slot is allocated to the area (page) in the HVOL specified by the HVOL #10001 and the page ID (P-ID) 10002.

The HVOL is defined by a user (administrator) of the storage device 1. When the user (administrator) of the storage device 1 instructs to create an HVOL using a management terminal 4, the storage device 1 registers an identification number (HVOL #) and HVOL size of the newly created HVOL to the HVOL management information 10000. Then, the information on respective pages of the newly created HVOL is registered to the page mapping table 10010, wherein initially, only the information on the HVOL #10001 and the page ID (P-ID) 10002 are registered, and an invalid value (such as NULL) is stored in the LDEV #10003 and the slot #10004. When transfer of data to a page in the HVOL (compression VOL) from the decompression VOL is performed, values are stored in the fields of the LDEV #10003 and the slot #10004.

Figure 32:
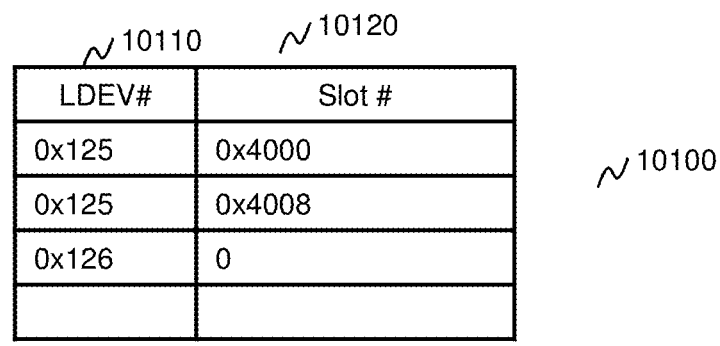
FIG. 32 is a view showing a content of a page free list.

Further, when allocating an area to a page in the HVOL, since it is necessary to allocate an area in the LDEV not yet allocated to any page (called an unused page), the storage device 1 has a management information called page free list 10100 (FIG. 32). The page free list 10100 includes entries of an LDEV #10110 and a slot #10120, showing that an area corresponding to one stripe group having the slot in the LDEV specified by the LDEV #10110 and the slot #10120 in the page free list 10100 as the head slot is an unused page. When the storage device 1 allocates an area to the page in the HVOL, unused slots (corresponding to one stripe group) are acquired from the page free list 10100, and allocated to the page in the HVOL.

Next, we will describe the flow of the processing performed in the storage device 1 according to Modified Example 1 when there is a data write request from the host computer 3, and when there is a data read request. This processing is substantially similar to the processes in FIGS. 24 through 28 according to the embodiment illustrated above. For example, since the process of receiving a write request and write data from the host computer 3 to the decompression VOL 5000 and storing the received write data to the cache memory 26 is the same as the process in FIG. 24, it will not be described below. In the following, the areas that differ from the embodiment described above regarding the data transfer processing and the read processing to the compression VOL (HVOL) will be described.

Figure 33:
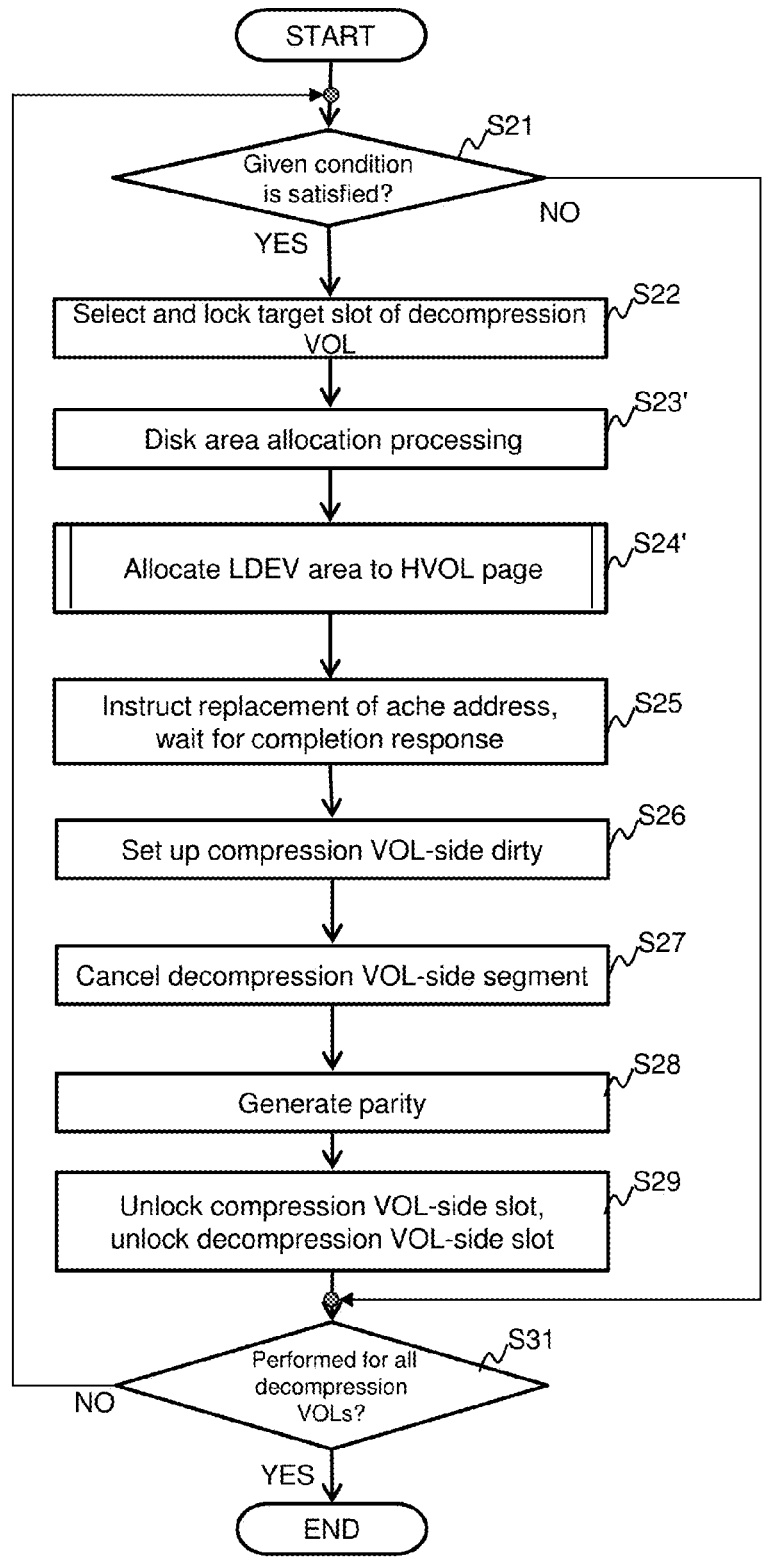
FIG. 33 is a view showing a flow of data transfer processing to compression VOL according to Modified Example 1 of the present invention.

The flow of the data transfer processing to the compression VOL (HVOL) will be described with reference to FIG. 33. The processes of FIG. 25 and FIG. 33 are the same, except that the processes of S23 and S24 in FIG. 25 is changed to S23', S241 and 5242 in FIG. 33.

In S21, the processor 21 determines whether a given condition has been satisfied or not, and in S22, it selects the slot of the decompression VOL being the target of transfer processing and locks the selected slot. In S21 of Modified Example 1, it is determined that a given condition has been satisfied under a condition that regarding a certain decompression VOL, one page or more (that is, corresponding to one or multiple stripe groups) amount of dirty data (in the cache memory 26) that has been written to the relevant decompression VOL exists. In S23', the allocation of disk area in the compression VOL (HVOL) is performed. At first, the compression VOL 602 and the last write location 603 corresponding to the decompression VOL 601 being the current processing target are selected by referring to the volume mapping table 600. Then, it is determined that data should be migrated from the decompression VOL to the area corresponding to one stripe group from the subsequent LBA from the last write location 603 of the compression VOL 602. Thereafter, the location of the compression VOL to which the respective areas of the decompression VOL being the current processing target (areas in which the dirty data in the slot selected in S22 is stored) should be mapped is determined, and the determined contents are stored in the address mapping table 650.

Figure 34:
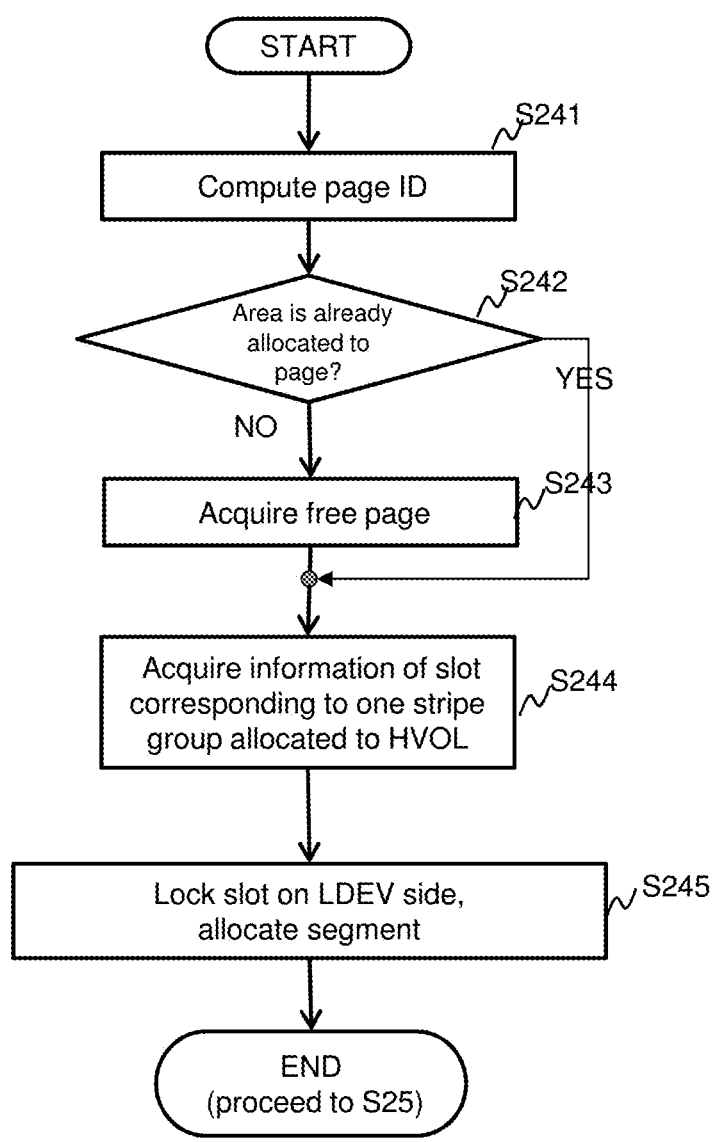
FIG. 34 is a view showing a flow of an area allocation processing to a page in the HVOL according to Modified Example 1 of the present invention.

Thereafter, in S24', the area in the LDEV is allocated to an area corresponding to one page in the HVOL (area corresponding to one or multiple stripe groups) which is the area at the migration destination determined to migrated data in S23'. This process will be described with reference to FIG. 34.

In S241, the head LBA (which is the subsequent LBA to the last write location 603 in the volume mapping table 600) of the area corresponding to one page in the HVOL selected in S23' is converted to a page ID. To compute the page ID from the LBA, the LBA should be divided by the size of a page. For example, if the size of a page is equal to the size of N stripe groups (N≥1), and the size of one stripe group is 48 KB, the LBA should be divided by (48×N) KB to compute the page ID from the LBA.

In S242, it is determined whether an area in the LDEV is allocated to the page having the page ID computed in S241 (whether a value that is not an invalid value is stored in the LDEV #10013 and the slot #10014) by referring to the page mapping table 10010. If an area is already allocated, the procedure advances to S244. If an area is not allocated, an area is allocated to the page in the HVOL by acquiring one stripe group worth of area in the LDEV from the page free list 10100, and registering the information of the acquired area corresponding to one stripe group to the page mapping table 10010 (S243). Thereafter, the procedure advances to the process of S244.

In S244, the page mapping table 10010 is referred to, and the information of the area in the LDEV allocated to the page having the page ID computed in S241 (slot numbers of slots corresponding to one page having the LDEV #10013 and the slot #10014 as the head slot) is acquired. Simultaneously, the slot number of the parity slot corresponding to the one page worth of slots acquired here is computed. S245 performs a similar process as S24 in FIG. 25. That is, a lock is acquired for the slot acquired in S244, and allocation of the cache segment is performed.

Figure 25:
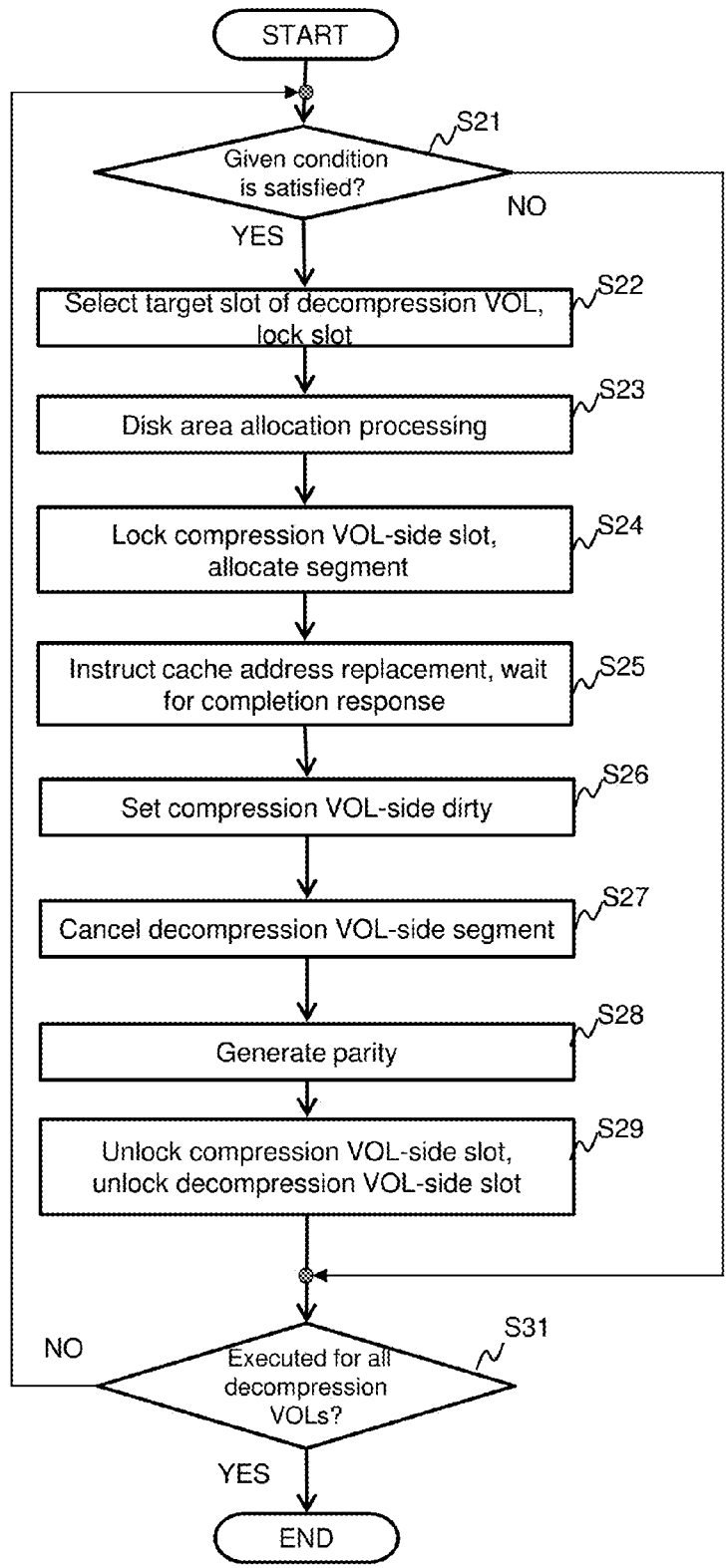
FIG. 25 is a view showing a flow of data transfer processing to a compression VOL according to the present embodiment.
Figure 26:
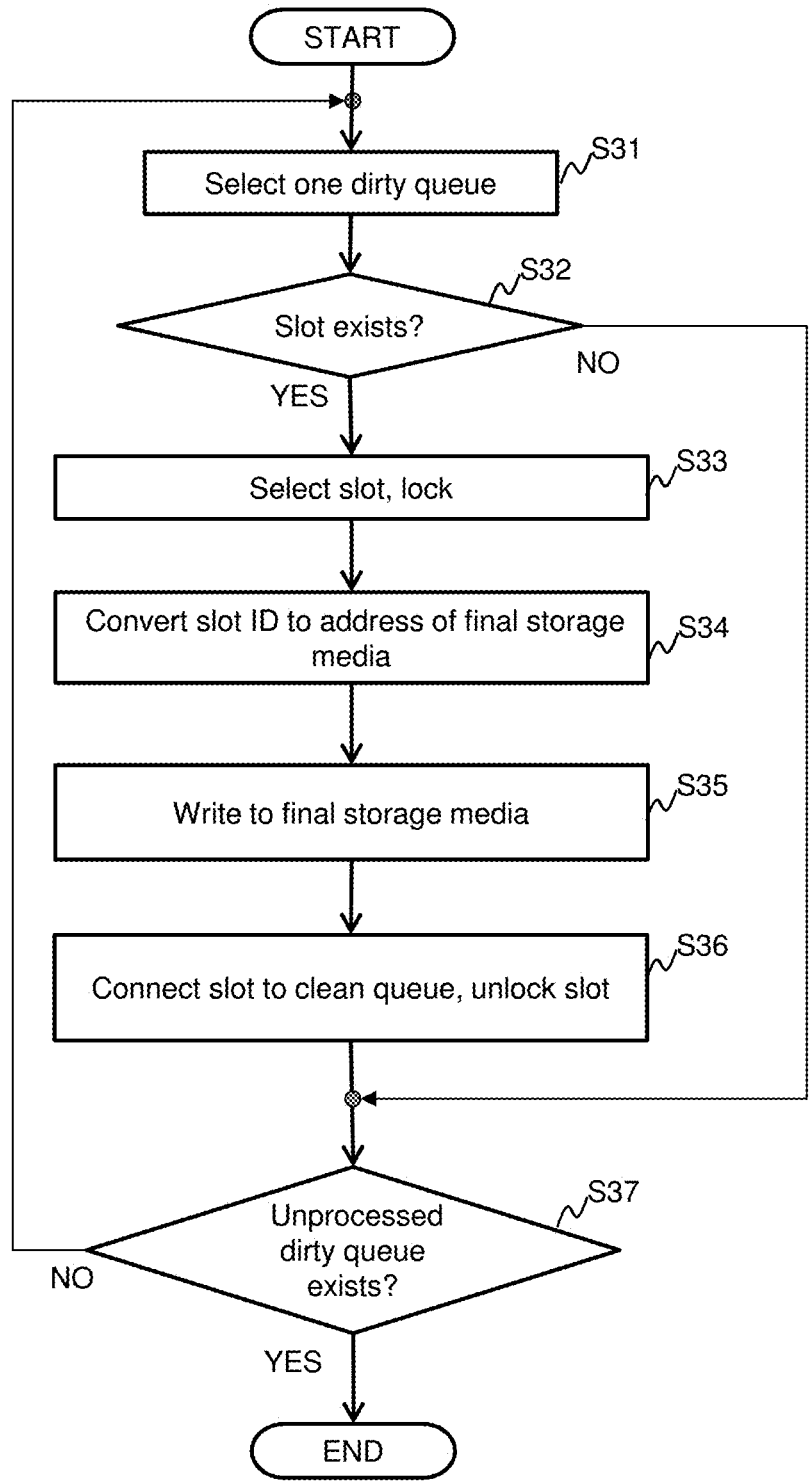
FIG. 26 is a view showing a flow of a destage processing according to the present embodiment.

When the processing of S245 is ended, the procedure advances to S25, but since the processes of S25 and thereafter are the same as the processes of FIG. 25, detailed description thereof is omitted.

As described, by using a compression technique, compressed data having a size that differs from the write data from the host is stored in the final storage media, but by allocating a storage area from the LDEV to the fixed size area having divided HVOL when migrating data to the HVOL, the capacity efficiency can be enhanced. Further, the storage controller comprehends the page size of the HVOL, the stripe group size of the LDEV, and the size after compression of the update data. Therefore, when the storage controller appends update data, the allocation of the area in the HVOL to the page in the HVOL can be performed appropriately according to the size of the appended update data after compression (areas will not be allocated excessively), so that the capacity efficiency can be enhanced.

Next, a flow of the processing performed when a read request has been received from the host computer 3 regarding a volume (decompression VOL) will be described. In this process, only S55 and S56 in FIG. 27 will be changed to S55' and S56' described below, and the other processes are the same as FIG. 27, so that the drawing thereof is omitted.

In S55', the LBA of the compression VOL (HVOL) corresponding to the read target LBA of the decompression VOL will be specified by referring to the address mapping table 650. Next, the LBA of the specified HVOL is converted to page ID, and by referring to the page mapping table 10010, the slot of the LDEV being allocated to the relevant page ID (slot specified by LDEV #10013 and slot #10014) is specified, and the specified slot of the LDEV is locked.

In S56', the processor 21 identifies the cache segment in the LDEV corresponding to the LBA in the compression VOL, determines whether the relevant cache segment is already allocated or not, and if the relevant cache segment is not allocated, it performs segment allocation (S57). The processes subsequent to S57 are the same as FIG. 27. Further, the processing for specifying the cache segment in the LDEV corresponding to the LBA in the compression VOL is a well-known process that has been performed conventionally in the storage device using a thin provisioning technique, so that the detailed description thereof is omitted. When a cache segment is already allocated, the procedure advances to S61, and the subsequent steps are the same as FIG. 27.

<Modified Example 2>

According to the embodiment described above, migration to the compression VOL is performed every time the data written to the decompression VOL is accumulated for an amount corresponding to one stripe group in the cache 26. Further, during migration, the data written to the decompression VOL is appended to the compression VOL (LDEV, and further, to the final storage media) regardless of the location of the relevant data written in the decompression VOL, so that contiguous data (areas) in the decompression VOL may be placed non-contiguously in the compression VOL (LDEV). When such placement is done, the sequential read performance is deteriorated compared to normal storage devices (storage devices storing uncompressed data). In the following, a method for migrating data to the compression VOL considering the data placement in the decompression VOL when migrating data from the decompression VOL to the compression VOL will be described.

In the storage device 1 according to Modified Example 2, similar to Modified Example 1, a virtual volume (HVOL) created via thin provisioning technique is used for the compression VOL. Moreover, the size of a page of the HVOL was a size corresponding to one stripe group in Modified Example 1, but in Modified Example 2, it corresponds to multiple stripe groups (one example of which is 1000 stripe groups). For sake of simplifying description, one stripe group is assumed to have a size corresponding to three slots (48 KB). Therefore, the size of one page is 48×1000 KB.

According to Embodiment 1 described above, the data written to a decompression VOL is appended to an area of a compression VOL mapped to the decompression VOL, but in Modified Example 2, each decompression VOL is divided into page (48×1000 KB) units, similar to the page size of the compression VOL, and a page number is assigned to each page for management. Regarding the page number assigned to each page, a page number 0 is assigned to the page located at the head of the decompression VOL, and thereafter, page numbers 1, 2 and so on are assigned sequentially. The page of the decompression VOL and the page of the compression VOL do not necessarily have the same size, and the present invention is effective even when the page size of the compression VOL is set smaller than the page size of the decompression VOL expecting that the data is stored in a compressed manner.

With reference to FIG. 35, the contents of a volume mapping table 600' according to Modified Example 2 will be described. In the storage device 1 of Modified Example 2, the data written to page 0 of the decompression VOL is written to page 0 of the compression VOL (HVOL), and similarly thereafter, data written to page 1, page 2 and so on in the decompression VOL are respectively written to page 1, page 2 and so on in the compression VOL (HVOL). Therefore, the volume mapping table 600' has entries of a VVOL #601', a page ID (P-ID) 602', an HVOL #603', a P-ID 604', and a last write location 605', and the data written to the area in the decompression VOL specified by the VVOL #601' and the page ID (P-ID) 602' is stored in the page in the compression VOL specified by the HVOL #603' and the P-ID 604'. Moreover, the information of the last write location 605' is also managed for each page of the decompression VOL.

In addition, similar to Modified Example 1, the storage device 1 of Modified Example 2 includes the HVOL management information 10000, the page mapping table 10010 and the page free list 10100 as management information for managing the HVOL, but except for the point that the page size is set to 1000 stripe groups, it is the same as the management information of Modified Example 1, so that the description thereof is omitted. Further, the decompression VOL and the cache management information of the LDEV is also similar to the cache management information described in the preferred embodiment and the Modified Example 1, but in Modified Example 2, regarding the dirty queue for decompression VOL, the point that one dirty queue exists in each page of the decompression VOL is different from the embodiments described above.

Next, the write processing performed in the storage device 1 according to Modified Example 2 will be described. The flow of the write processing performed in Modified Example 2 is basically not much different from the preferred embodiment and Modified Example 1 described above, and since the process for storing the received write data to the cache memory 26 is the same as the process in FIG. 24, detailed description thereof is omitted. Moreover, since the data transfer processing from the decompression VOL to the compression VOL is not much different from FIG. 33, it will be described with reference to FIG. 33. In the preferred embodiment and Modified Example 1 described above, the data transfer processing to the compression VOL is performed in each decompression VOL, but in Modified Example 2, it is performed in each page.

In S21, the processor 21 determines whether a given condition has been satisfied or not, but in Modified Example 2, whether the total amount of dirty data 110f of each slot connected to the dirty queue of each page in the decompression VOL has becomes equal to or greater than a given amount (such as 60% or more of one page size, for example) is determined, and if it has become equal to or greater than the given amount, the procedure advances to steps S22 and thereafter.

The process of S22 is similar to the embodiment described above, but wherein the slots connected to the dirty queue are selected in the order of the slot having smaller slot IDs, and selection is performed so that the total dirty amount of the area of the dirty data of the selected slots becomes multiples of the stripe group size and that the value becomes as high as possible. Therefore, if the dirty data amount becomes multiples of the stripe group size when all dirty data are selected, then all the slots are selected.

The process of S23 is also similar to the embodiment described above, but in Modified Example 2, each area of the processing target decompression VOL is mapped to the area in the compression VOL in ascending order from those having smaller LBAs, so that the order of data placement in the decompression VOL and the order of data placement in the compression VOL become the same. The subsequent processes are similar to the above-described embodiment and Modified Example 1.

By doing this, each data placed contiguously in the decompression VOL will also be placed in ascending order in the compression VOL. Therefore, when a so-called sequential read access for reading contiguous data arrives from the host computer 3 to the decompression VOL thereafter, it becomes possible to read the compressed data substantially sequentially from the compression VOL.

The embodiments of the present invention have been described, but these are mere examples for illustrating the present invention, and are not intended to limit the scope of the invention to the embodiments illustrated above. The present invention can be implemented in various other embodiments. For example, two storage controllers are illustrated in the storage device illustrated in the present embodiment, but the number of storage controllers is not restricted thereto, and an arbitrary number of one or more controllers can be provided. Further, the numbers of processors in the controller or host interfaces are not restricted to the numbers illustrated in the drawings.

Further according to the Modified Example 2 described above, similar to Modified Example 1, the HVOL formed via thin provisioning technique is used as the compression VOL, but similar to the embodiment described first, Embodiment 2 can be realized even by using the logical volume not adopting the thin provisioning technique as the compression VOL.

REFERENCE SIGNS LIST

1: Storage device
2: SAN
3: Host computer
4: Management device
10: Storage controller
11: SSD
12: HDD
21: Processor
22: Internal switch
23: Disk interface
24: Host interface
25: DRAM
26: Cache memory
27: Node I/F

The invention claimed is:

1. A storage device connected to a host computer, and having a processor, a cache device and a plurality of final storage media,
the storage device comprising:
a first volume capable of being accessed from the host computer;
a second volume, which is a volume mapped to the first volume, storing compressed data of data written from the host computer to the first volume,
wherein when the processor receives a write request to the first volume and a write target data regarding the write request from the host computer, the processor:
(1) executes compression of the write target data in the cache device and stores the compressed write target data in a storage area within the cache device;
(2) determines a storage location in the second volume of the compressed write target data;
(3) allocates a storage area in the final storage media to be mapped to the storage location in the second volume of the compressed write target data, in response to the storage location being determined; and
(4) reads the compressed write target data from the cache device, and stores the compressed write target data to an area in the allocated final storage area,
wherein a storage area to be mapped to the storage location in the second volume of the compressed write target data is a storage area within a RAID group configured of a plurality of final storage media, and
wherein when an amount of compressed write target data stored in the cache device becomes equal to or greater than an amount corresponding to one stripe group size of the RAID group, the processor determines a storage location in the second volume of the compressed write target data.

2. The storage device according to claim 1, wherein
the write request includes information of an address in the first volume to which the write target data is to be written;
the storage device has an address mapping table managing a corresponding relationship between an address in the first volume and a storage location in the second volume of the write target data in the compressed state;
wherein the processor:
records a corresponding relationship between the address included in the write request and a storage location in the second volume to the address mapping table, when a storage location of the write target data in the compressed state in the second volume is determined;
refers to the mapping table when a read request designating an address in the first volume is received from the host computer, and specifies a storage location in the second volume corresponding to an address included in the read request;

reads a data in compressed state from the final storage media based on the storage location in the second volume, and stores the data in the cache device; and acquires a data having decompressed the data in the compressed state from the cache device, and transmits the acquired data to the host computer.

3. The storage device according to claim 1, wherein the processor stores information of the determined storage location each time a process is performed to determine a storage location in the second volume of the write target data in the compressed state;

when determining a storage location in the second volume of the write target data in the compressed state, determines a subsequent address of an address specified by an information of the storage location being stored as a storage location of the write target data in the compressed state in the second volume.

4. The storage device according to claim 1, wherein a capacity of the second volume is greater than a total capacity of the plurality of final storage media.

5. The storage device according to claim 1, wherein the cache device provides a first logical storage space and a second logical storage space to the processor;

when the processor issues to the cache device a data storage request for storing the write target data having designated an address in the first logical storage space to the cache device;

the cache device sets the write target data in a compressed state and stores in a storage area in the cache device;

after the processor issues a mapping instruction to map the address in the first logical storage space and the address in the second logical storage space to the cache device, and further issues a data read request for reading the write target data stored in the cache device designating an address in the second logical storage space mapped to an address in the first logical storage space to the cache device;

the cache device reads the write target data in a compressed state.

6. A method for controlling a storage device connected to a host computer, and having a processor, a cache device and a plurality of final storage media, the storage device comprising:

a first volume capable of being accessed from the host computer;

a second volume which is a volume mapped to the first volume, storing compressed data of data written from the host computer to the first volume.

wherein when the processor receives a write request to the first volume and a write target data regarding the write request from the host computer, the processor (1) stores compressed write target data into a storage area in the cache device after compressing the write target data in the cache device;

(2) determines a storage location in the second volume of the compressed write target data;

(3) allocates a storage area in the final storage media to be mapped to the storage location in the second volume of the compressed write target data, in response to the storage location being determined; and (4) reads the compressed write target data from the cache device, and stores the write target data being read in the compressed state to an area in the allocated final storage area, wherein a storage area to be mapped to the storage location in the second volume of the compressed write target data is a storage area within a RAID group configured of a plurality of final storage media, and wherein when an amount of compressed write target data stored in the cache device becomes equal to or greater than an amount corresponding to one stripe group size of the RAID group, the processor determines a storage location in the second volume of the compressed write target data.

7. The method for controlling a storage device according to claim 6, wherein the write request includes an-information of an address in the first volume to which the write target data is to be written;

the storage device has an address mapping table managing a corresponding relationship between an address in the first volume and a storage location in the second volume of the compressed write target data;

wherein the processor:

records a corresponding relationship between the address included in the write request and a storage location in the second volume to the address mapping table, when a storage location of the compressed write target data in the second volume is determined;

refers to the mapping table when a read request designating an address in the first volume is received from the host computer, and specifies a storage location in the second volume corresponding to an address included in the read request;

reads a data in compressed state from the final storage media based on the storage location in the second volume, and stores the data in the cache device; and acquires a data having decompressed the data in the compressed state from the cache device, and transmits the acquired data to the host computer.

8. The method for controlling a storage device according to claim 6, wherein the processor stores information of the determined storage location each time a process is performed to determine a storage location in the second volume of the compressed write target data;

when determining a storage location in the second volume of the compressed write target data, determines a subsequent address of an address specified by an information of the storage location being stored as a storage location of the compressed write target data in the second volume.

9. The method for controlling a storage device according to claim 6, wherein a capacity of the second volume is greater than a total capacity of the plurality of final storage media.

10. The method for controlling a storage device according to claim 6, wherein the cache device provides a first logical storage space and a second logical storage space to the processor;

in said (1), when the processor issues to the cache device a data storage request for storing the write target data having designated an address in the first logical storage space to the cache device;

the cache device stores the write target data into a storage area in the cache device after changing the write target data in a compressed state;

in said (4), after the processor issues a mapping instruction to map the address in the first logical storage space and the address in the second logical storage space to the cache device, and further issues a data read request for reading the write target data stored in the cache device designating an address in the second logical storage space to the cache device; and the write target data is read in a compressed state from the cache device.

11. A storage device connected to a host computer, and having a processor, a cache device having a memory area, and a plurality of final storage media, the storage device comprising:
- a first volume capable of being accessed from the host computer;
- a second volume, which is a volume mapped to the first volume, storing the compressed data of data written from the host computer to the first volume,
- wherein when the processor receives a write request to the first volume and a write target data regarding the write request from the host computer, the processor is configured to:
  (1) execute compression of the write target data in the cache device and stores the compressed write target data in a memory area in the cache device;
  (2) determine a storage location in the second volume of the compressed write target data and store information of the determined storage location;
  (3) allocate a storage area in the final storage media to be mapped to the storage location in the second volume of the compressed write target data, in response to the storage location being determined; and
  (4) read the compressed write target data from the cache device, and store the compressed write target data to an area in the allocated final storage area, and
- in case the processor receives, from the host computer, first write target data to be written to a first area in the first volume, and second write target data to be written to a second area that is a non-contiguous area from the first area, and stores compressed first write target data and compressed second write target data to the memory area of the cache device,
- the processor determines a subsequent address of an address specified by the information of the storage location being stored, as a storage location of the first write target data in the compressed state in the second volume, and stores an information of the storage location, and
- the processor determines a subsequent address of an address specified by the information of the storage location being stored, as a storage location of the compressed second write target data in the second volume, and stores an information of the storage location.

12. A method for controlling a storage device connected to a host computer, and having a processor, a cache device having a memory area, and a plurality of final storage media, the storage device comprising:
- a first volume capable of being accessed from the host computer;
- a second volume, which is a volume mapped to the first volume, storing compressed data of data written from the host computer to the first volume,
- wherein the method comprises:
- a first step in which the processor receives a write request to the first volume and a write target data regarding the write request from the host computer,
- a second step in which the processor stores the write target data into the memory area in the cache device after compressing the write target data in the cache device;
- a third step in which the processor determines a storage location in the second volume of the compressed write target data and stores information of the determined storage location;
- a fourth step in which the processor allocates a storage area in the final storage media to be mapped to the storage location in the second volume of the compressed write target data in response to the storage location being determined; and
- a fifth step in which the processor reads the compressed write target data from the cache device, and stores the compressed write target data to an area in the allocated final storage area, and
- in case the processor receives, from the host computer in the first step, first write target data to be written to a first area in the first volume, and second write target data to be written to a second area that is a non-contiguous area from the first area, and stores compressed first write target data and compressed second write target data to the memory area of the cache device in the second step,
- the method executes, in the third step:
- a step in which the processor determines a subsequent address of an address specified by the information of the storage location being stored, as a storage location of the compressed first write target data in the second volume, and stores an information of the storage location, and
- a step in which the processor determines a subsequent address of an address specified by the information of the storage location being stored, as a storage location of the compressed second write target data in the second volume, and stores an information of the storage location.

* * * * *